United States Patent
Bumberger et al.

(10) Patent No.: US 12,080,291 B2
(45) Date of Patent: *Sep. 3, 2024

(54) SPEECH PROCESSING FOR MULTIPLE INPUTS

(71) Applicant: Amazon Technologies, Inc., Seattle, WA (US)

(72) Inventors: Fabian Andreas Bumberger, Toronto (CA); Sabria Farheen, Toronto (CA); Maciej Makowski, Aurora (CA); Eli Joshua Fidler, Toronto (CA); Sasitheran Shanmugarajah, Pickering (CA)

(73) Assignee: Amazon Technologies, Inc., Seattle, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/708,077

(22) Filed: Mar. 30, 2022

(65) Prior Publication Data

US 2022/0358921 A1    Nov. 10, 2022

Related U.S. Application Data

(63) Continuation of application No. 16/883,379, filed on May 26, 2020, now Pat. No. 11,295,743.

(51) Int. Cl.
*G10L 15/00* (2013.01)
*G10L 15/02* (2006.01)
*G10L 15/22* (2006.01)
*G10L 15/30* (2013.01)

(52) U.S. Cl.
CPC .............. *G10L 15/22* (2013.01); *G10L 15/02* (2013.01); *G10L 2015/223* (2013.01); *G10L 15/30* (2013.01)

(58) Field of Classification Search
CPC ........ G10L 15/07; G10L 15/20; G10L 15/22; G10L 15/26; G10L 15/30; G10L 15/02; G10L 15/063; G10L 15/08; G10L 25/78; G10L 25/87; G06F 40/30; G06F 40/211; G06F 40/40268; G06F 40/268
See application file for complete search history.

(56) References Cited

U.S. PATENT DOCUMENTS 11,295,743 B1 *   4/2022   Bumberger ............. G10L 15/22

\* cited by examiner

*Primary Examiner* — Vu B Hang
(74) *Attorney, Agent, or Firm* — Pierce Atwood LLP

(57) ABSTRACT

This disclosure proposes systems and methods enabling on-device/hybrid processing of speech requests using a hub device. The hub device is capable of receiving audio data from surrounding devices and performing speech processing on the audio data to improve latency and/or provide functionality to other devices within a private network. The hub device may receive multiple requests corresponding to different utterances. If the hub device receives a second utterance while processing a first utterance, the hub device may send an error notification, process the first utterance and the second utterance sequentially, suspend processing of the first utterance to process the second utterance first, send the second utterance to another hub device or remote system, or suspend processing of the first utterance and send the first utterance to the remote system in order to process the second utterance.

20 Claims, 35 Drawing Sheets

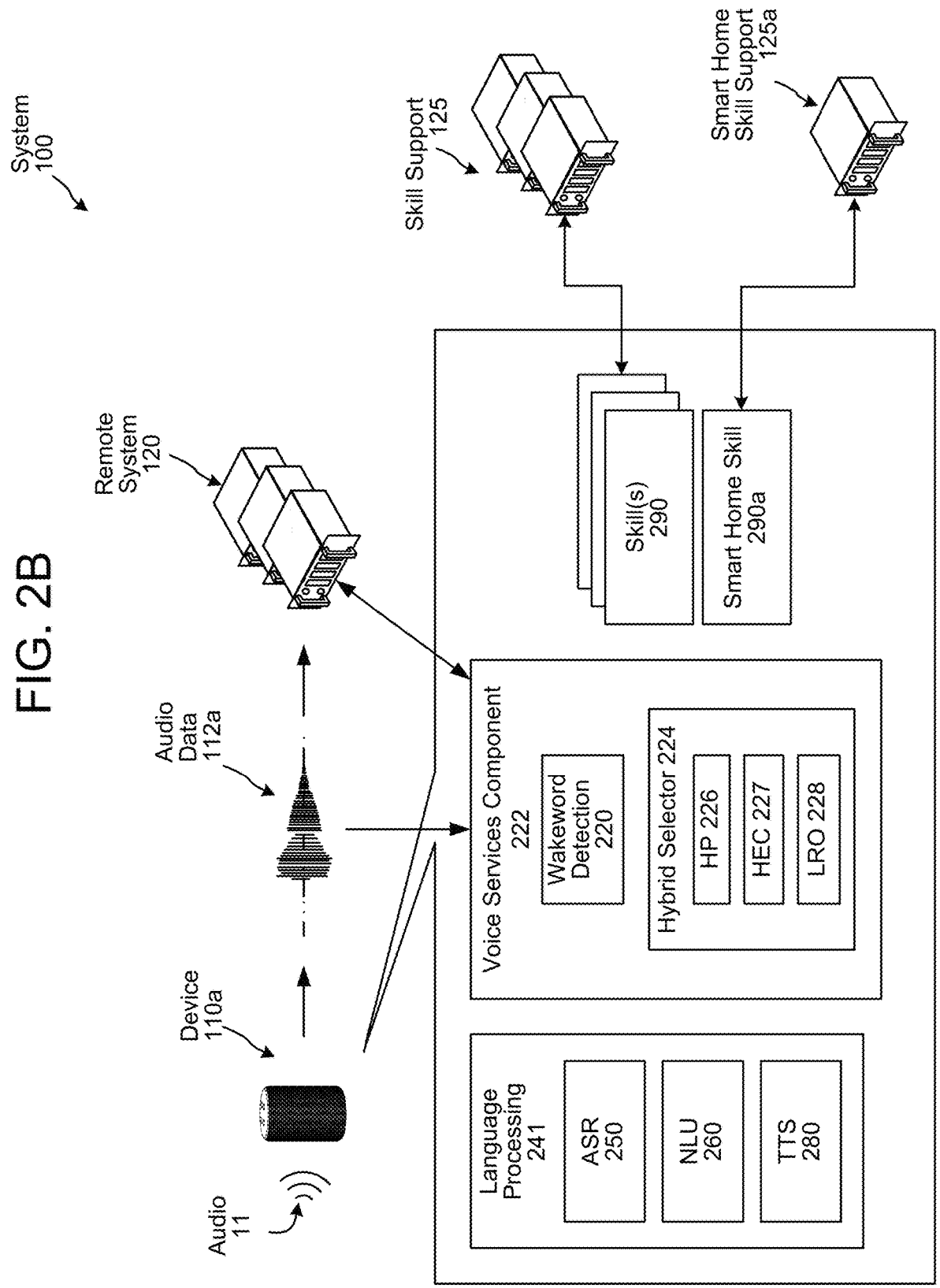

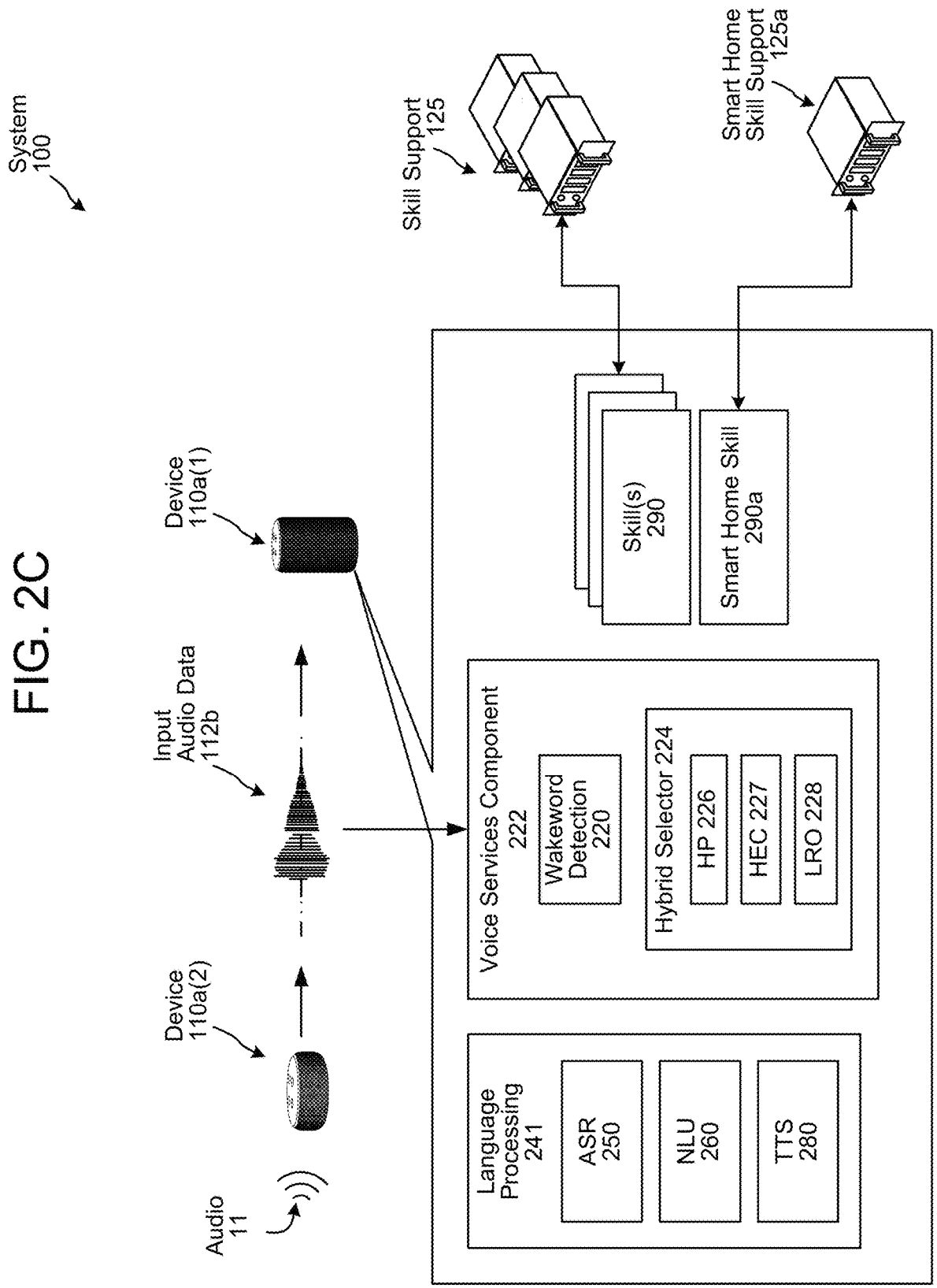

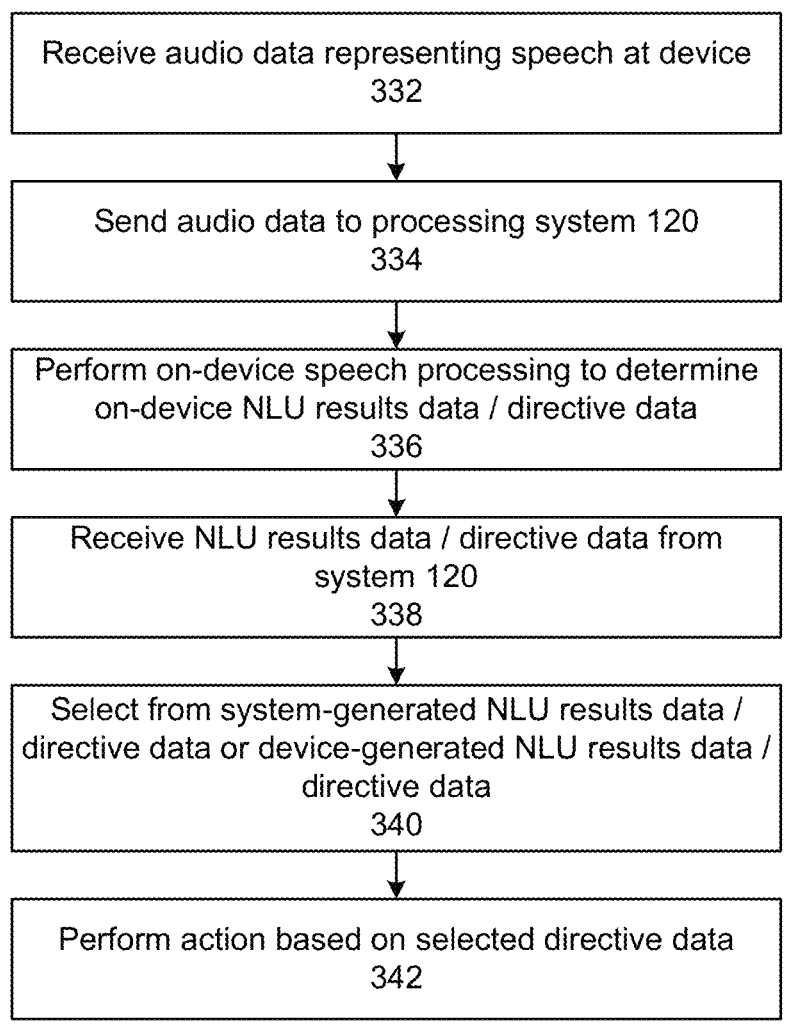

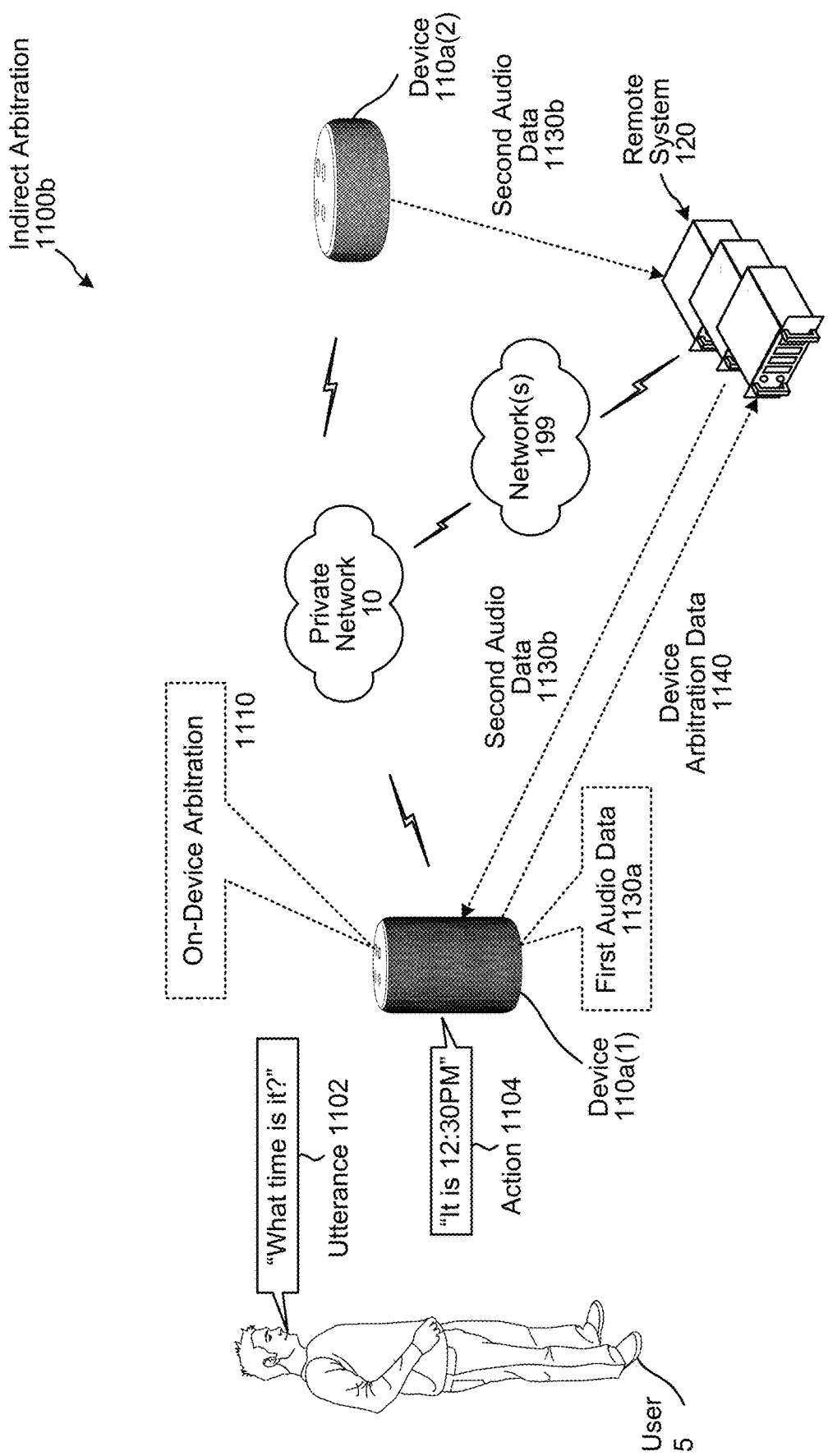

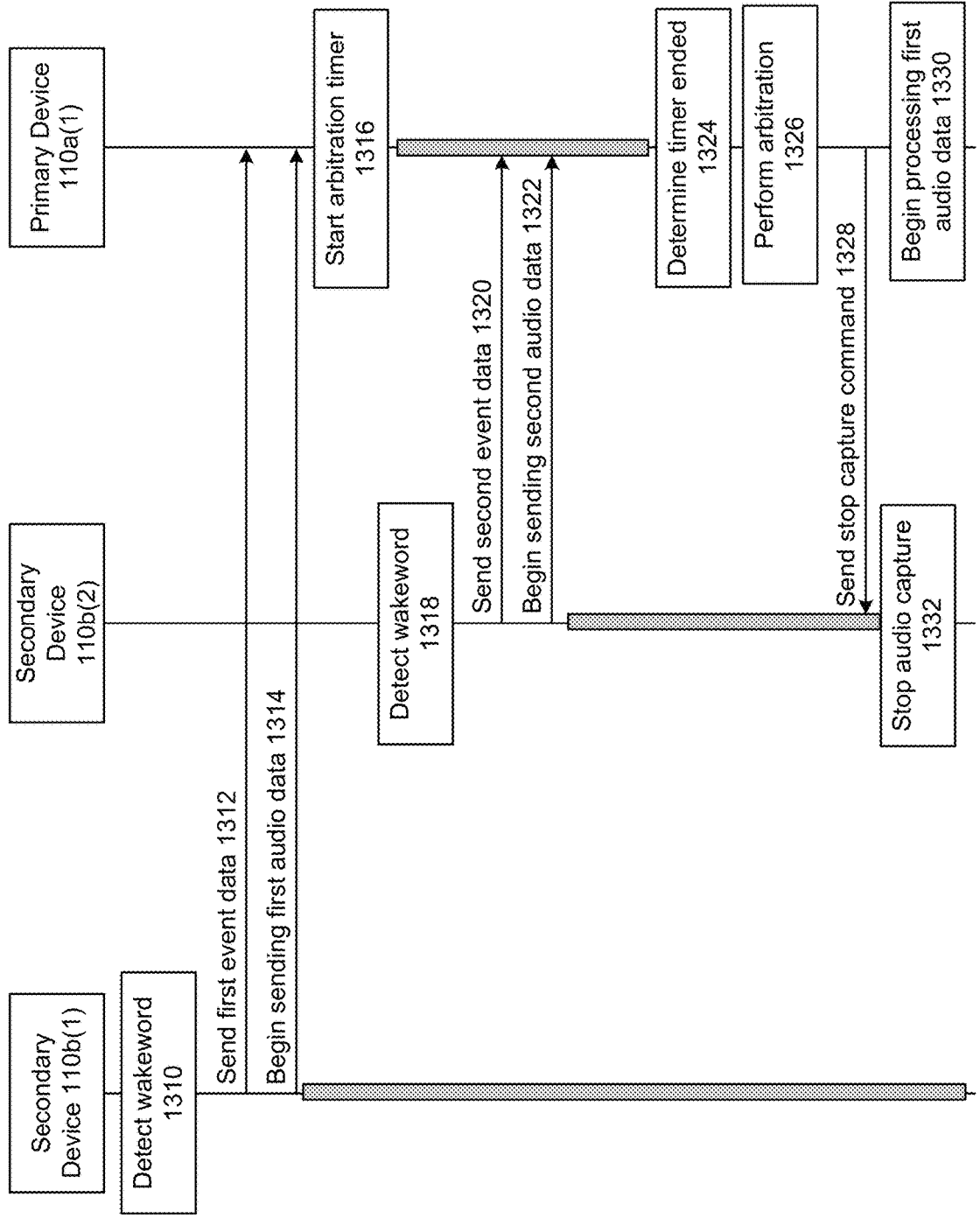

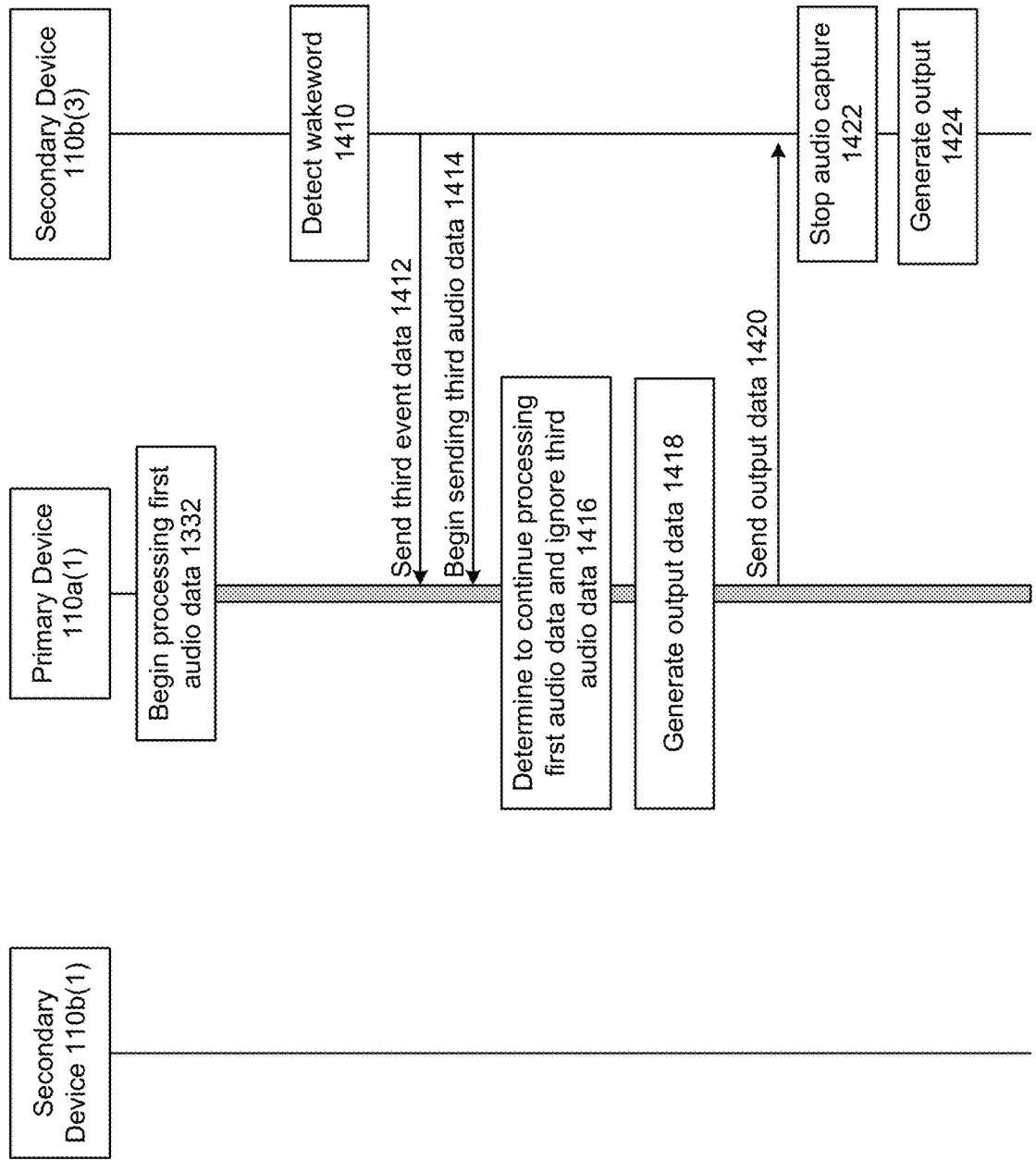

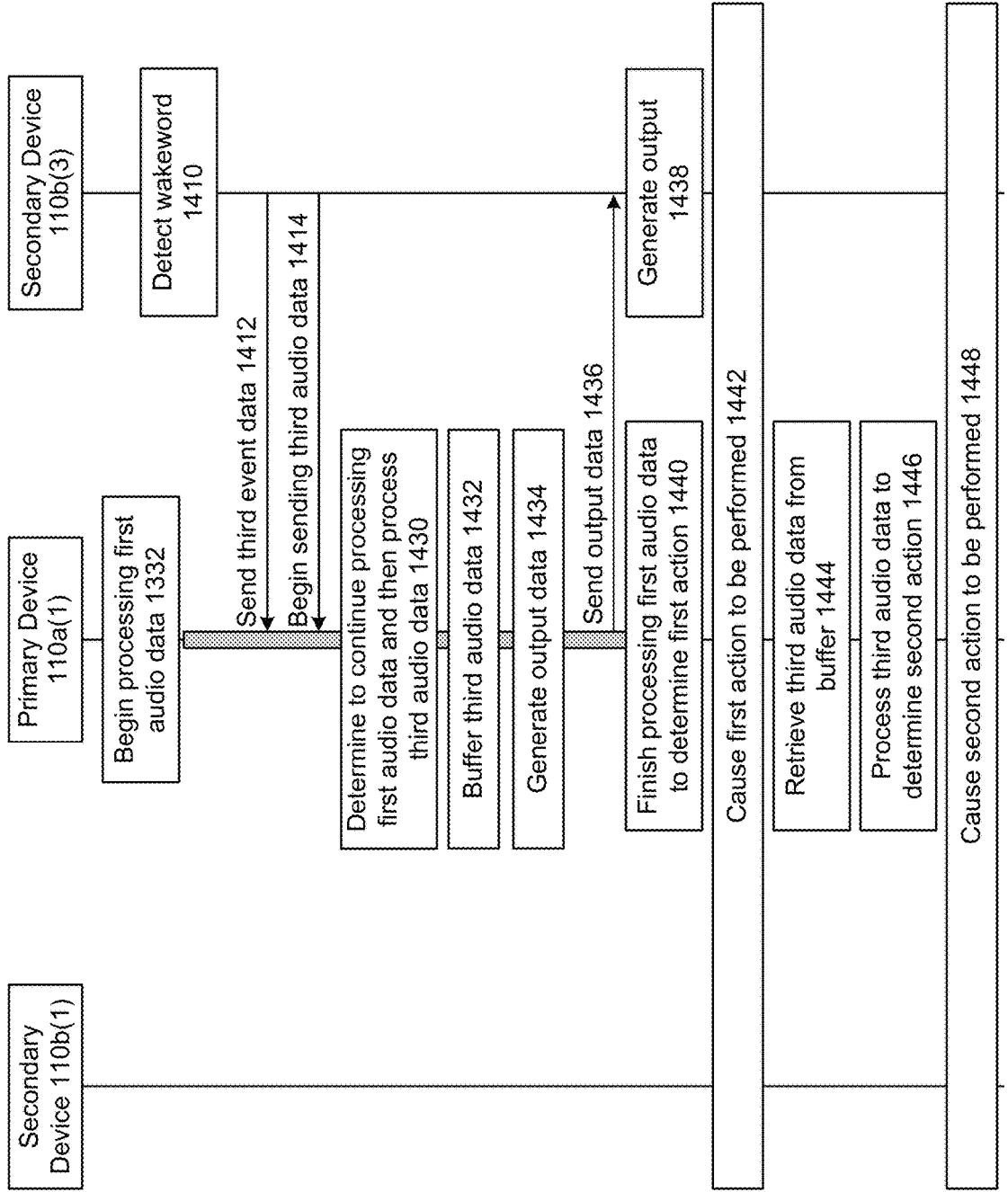

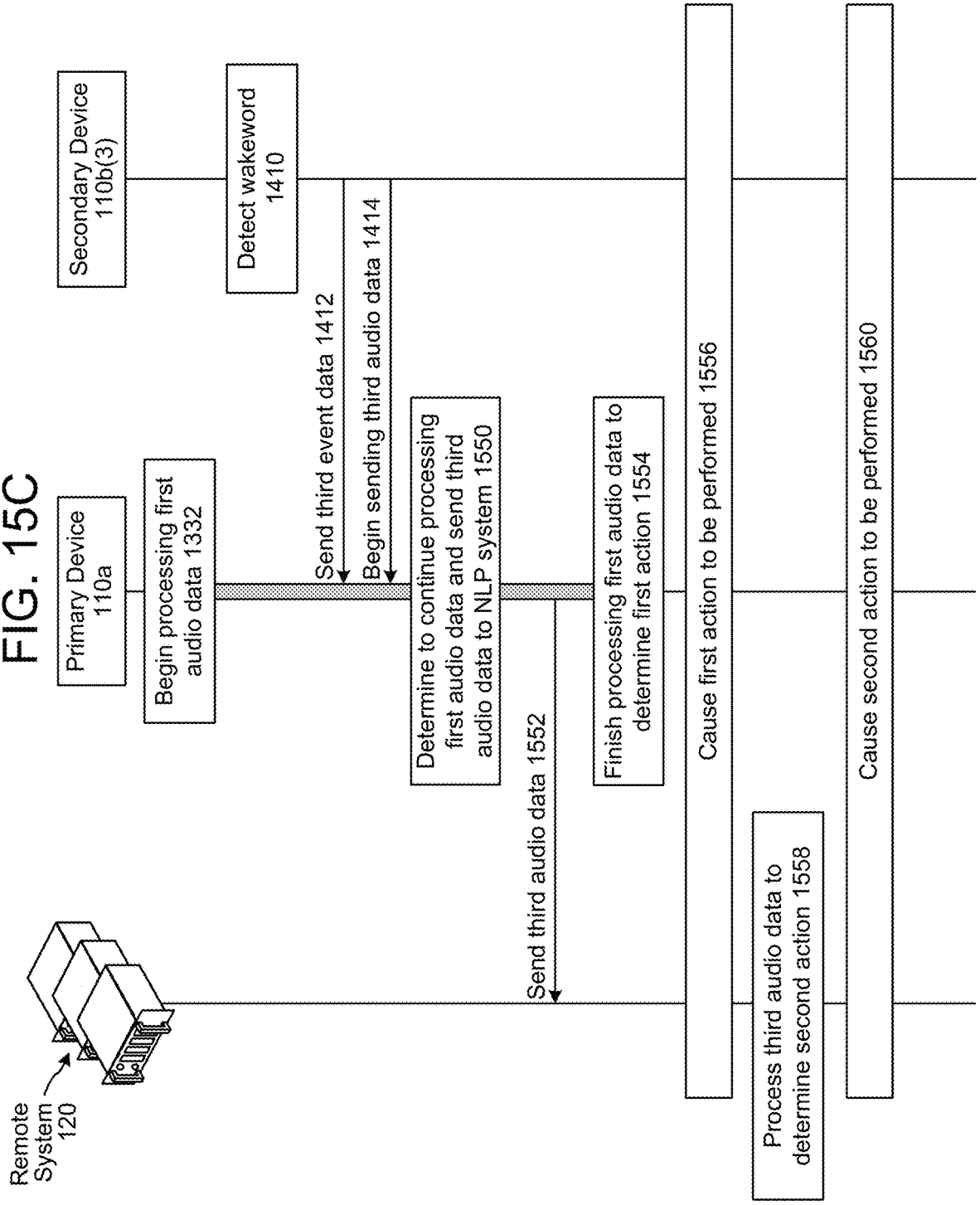

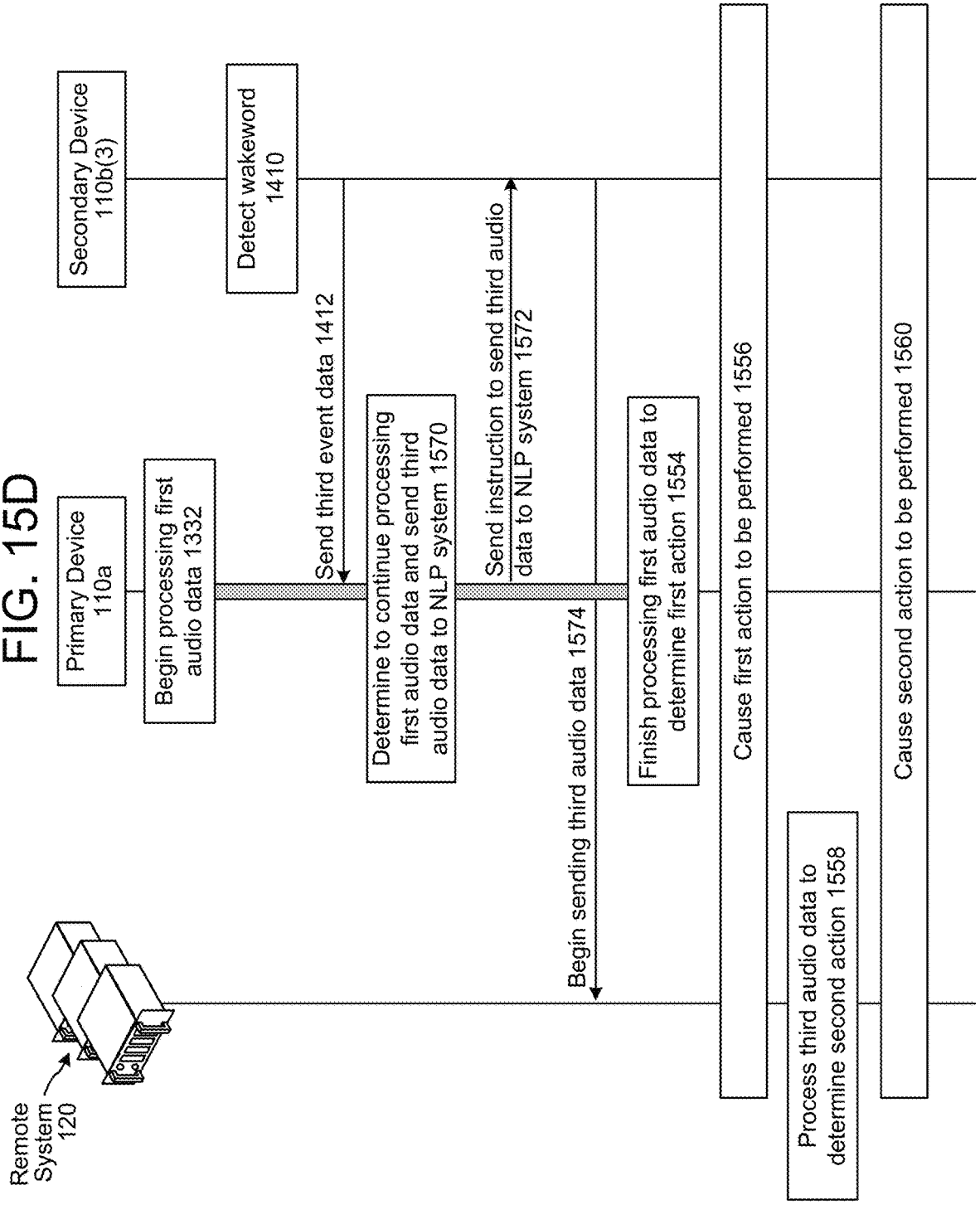

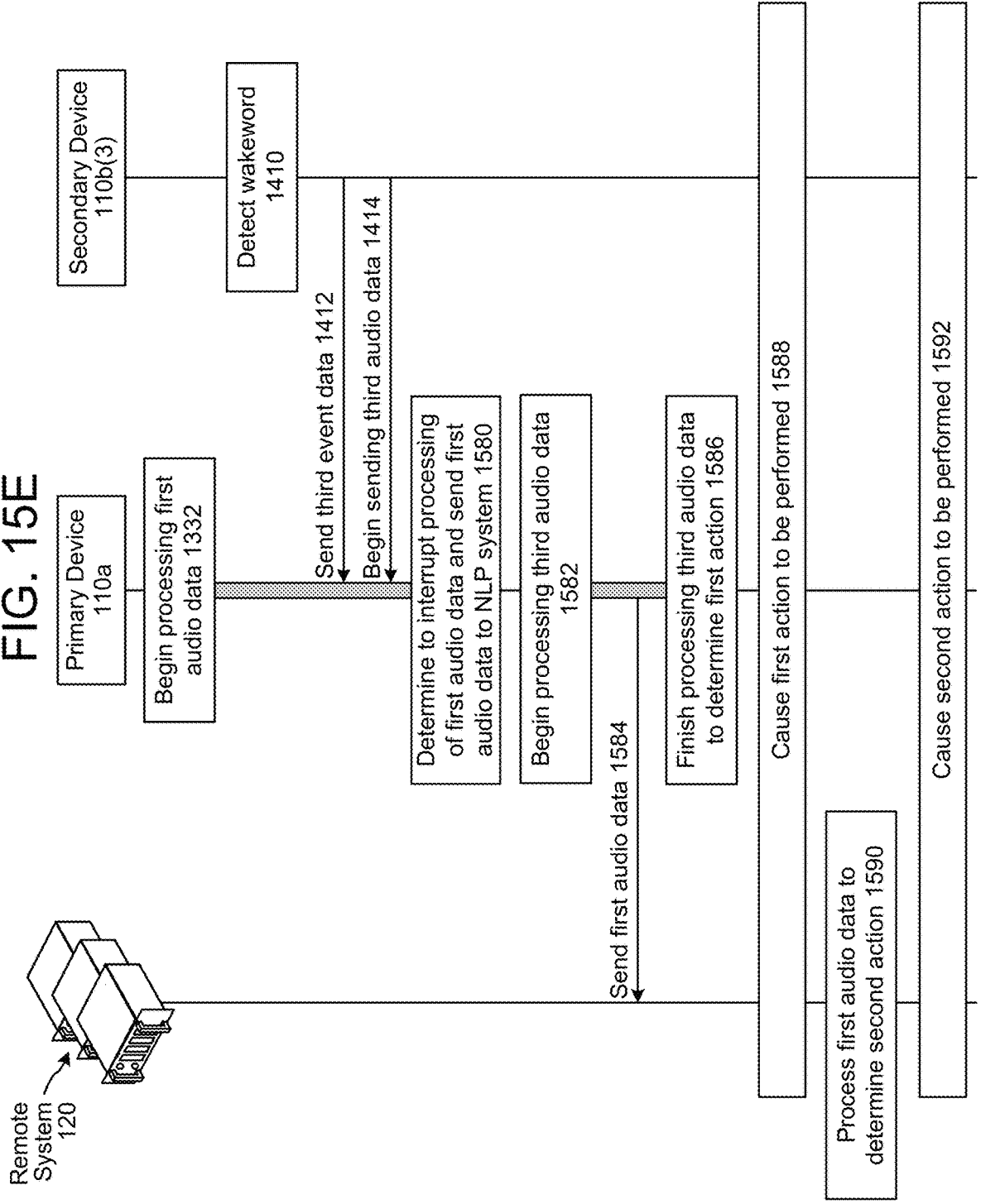

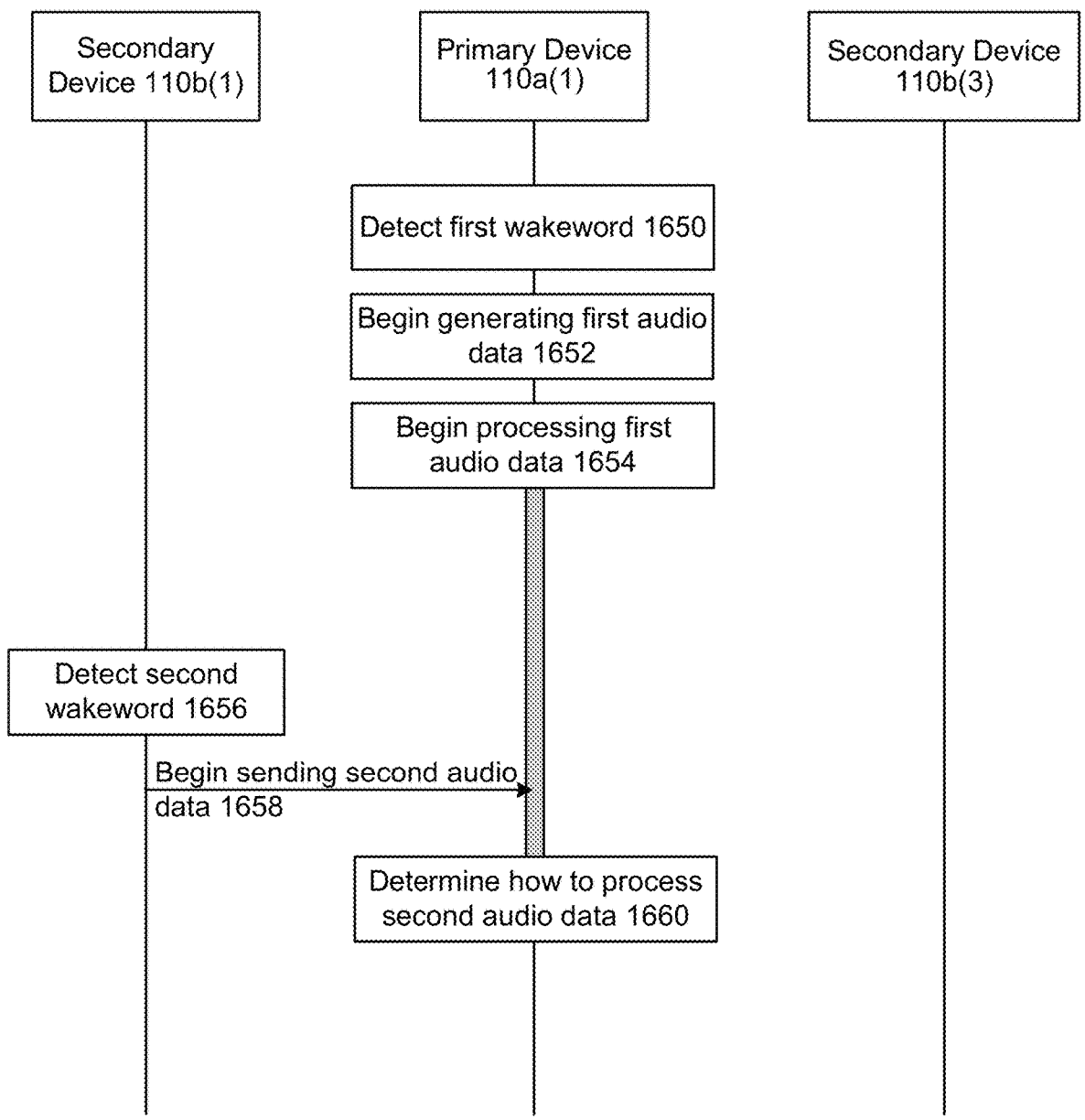

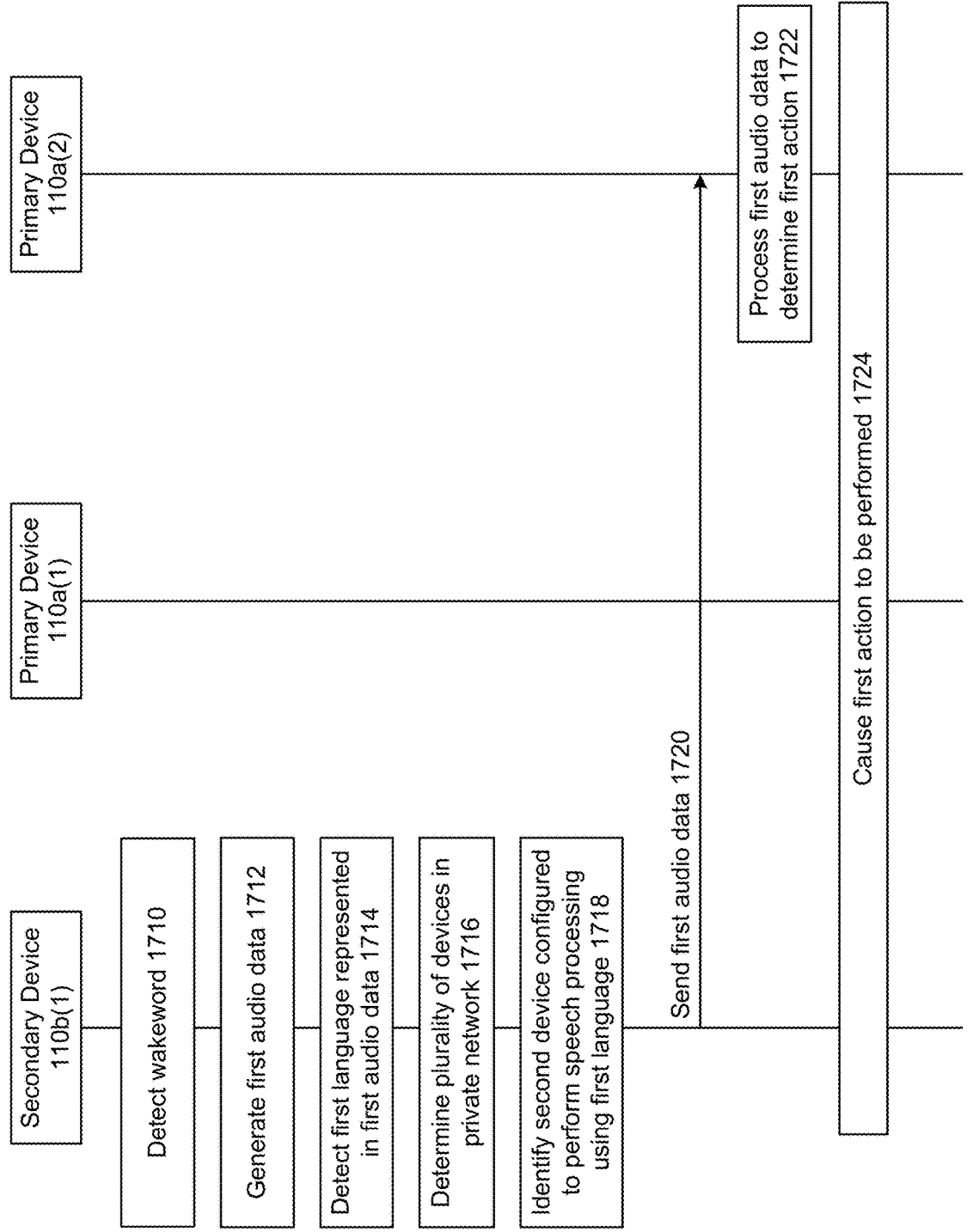

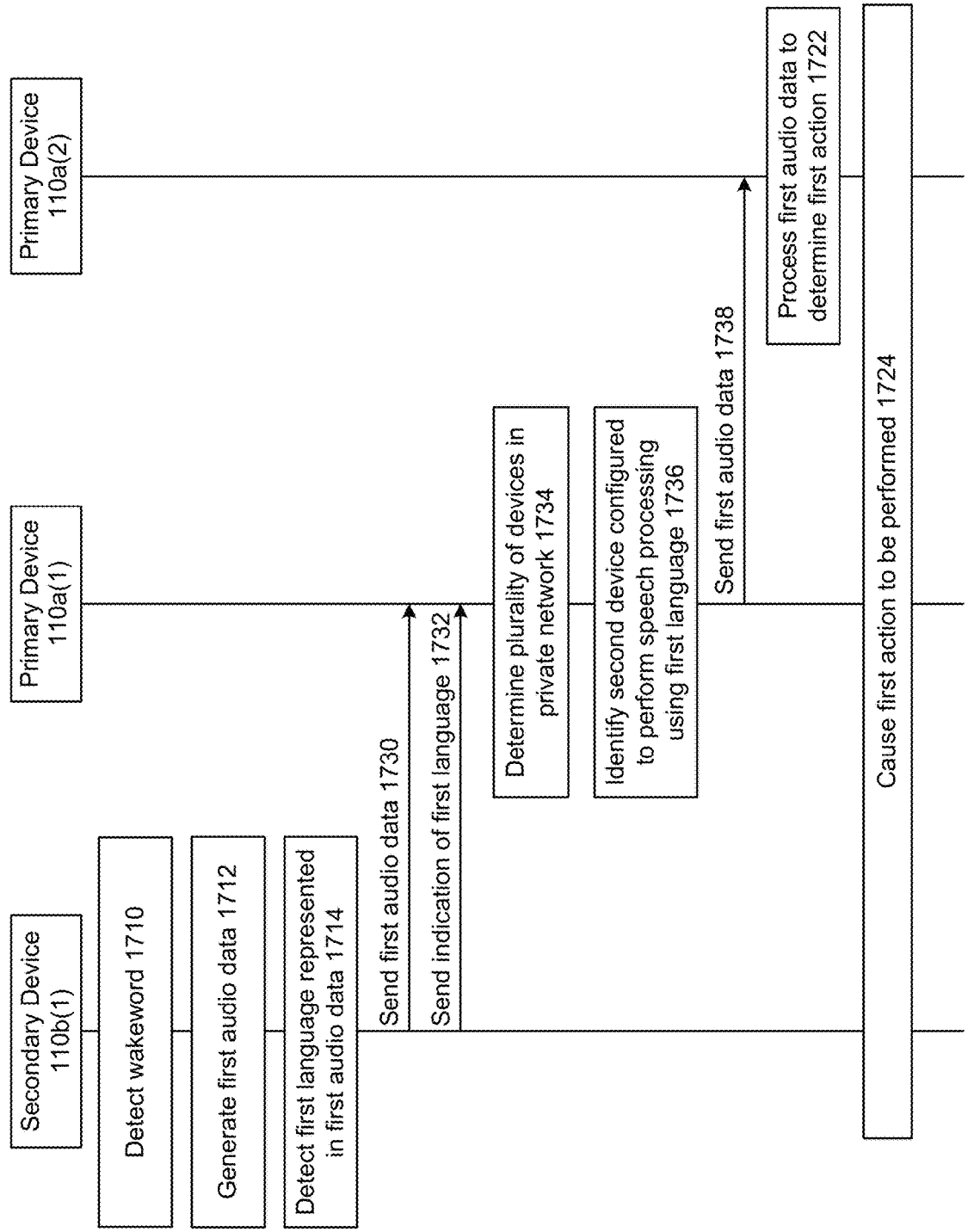

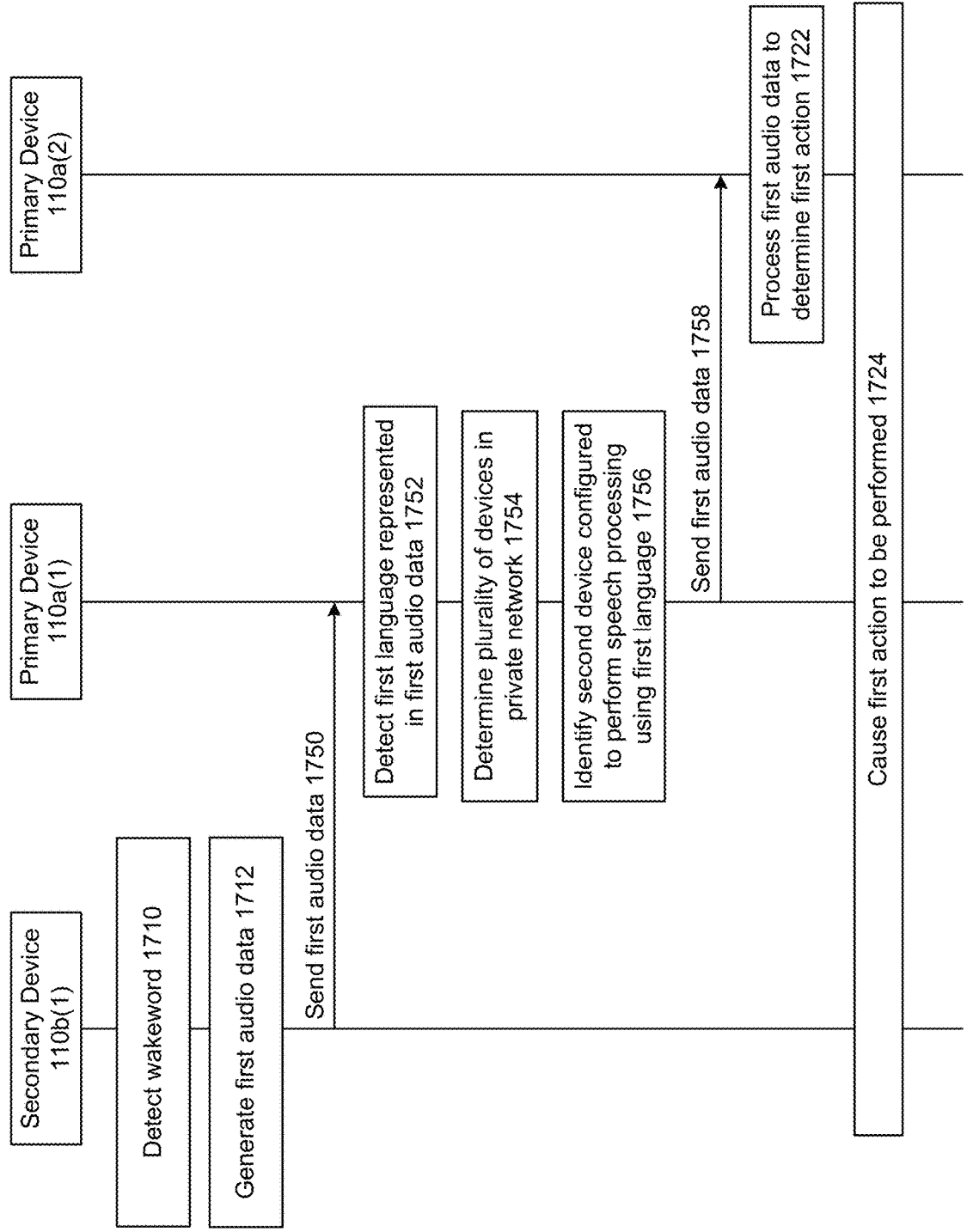

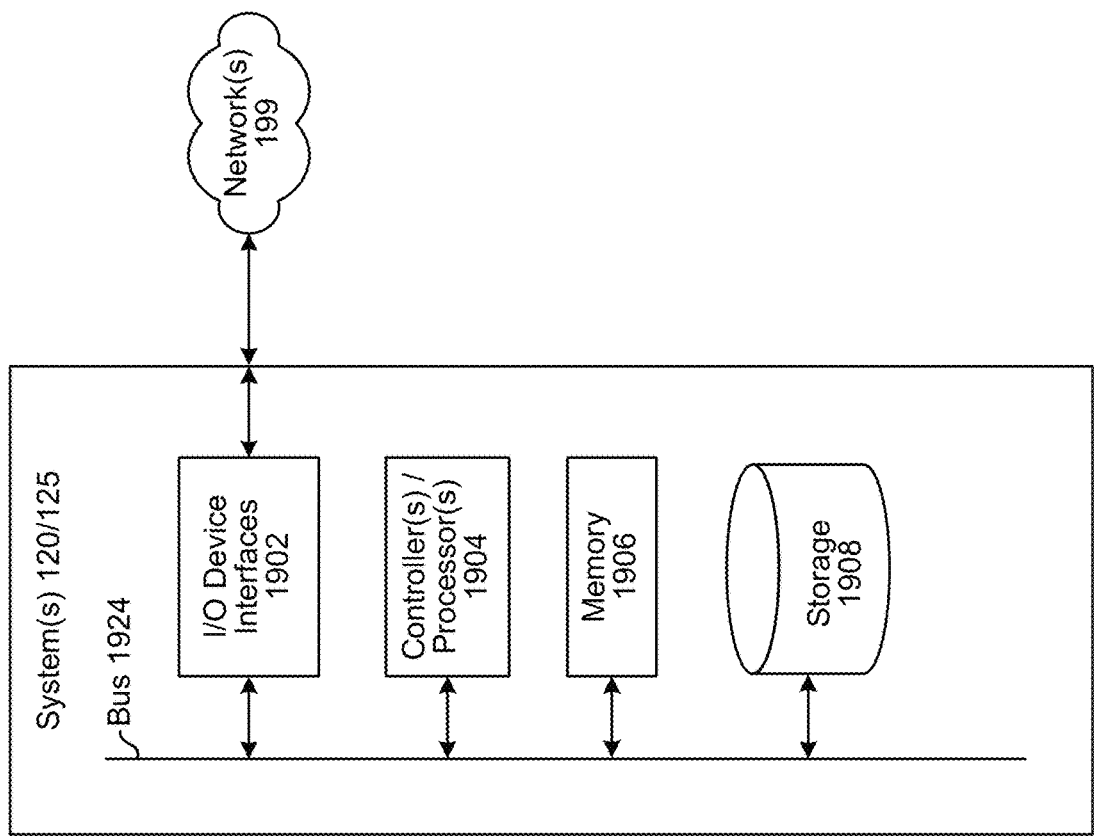

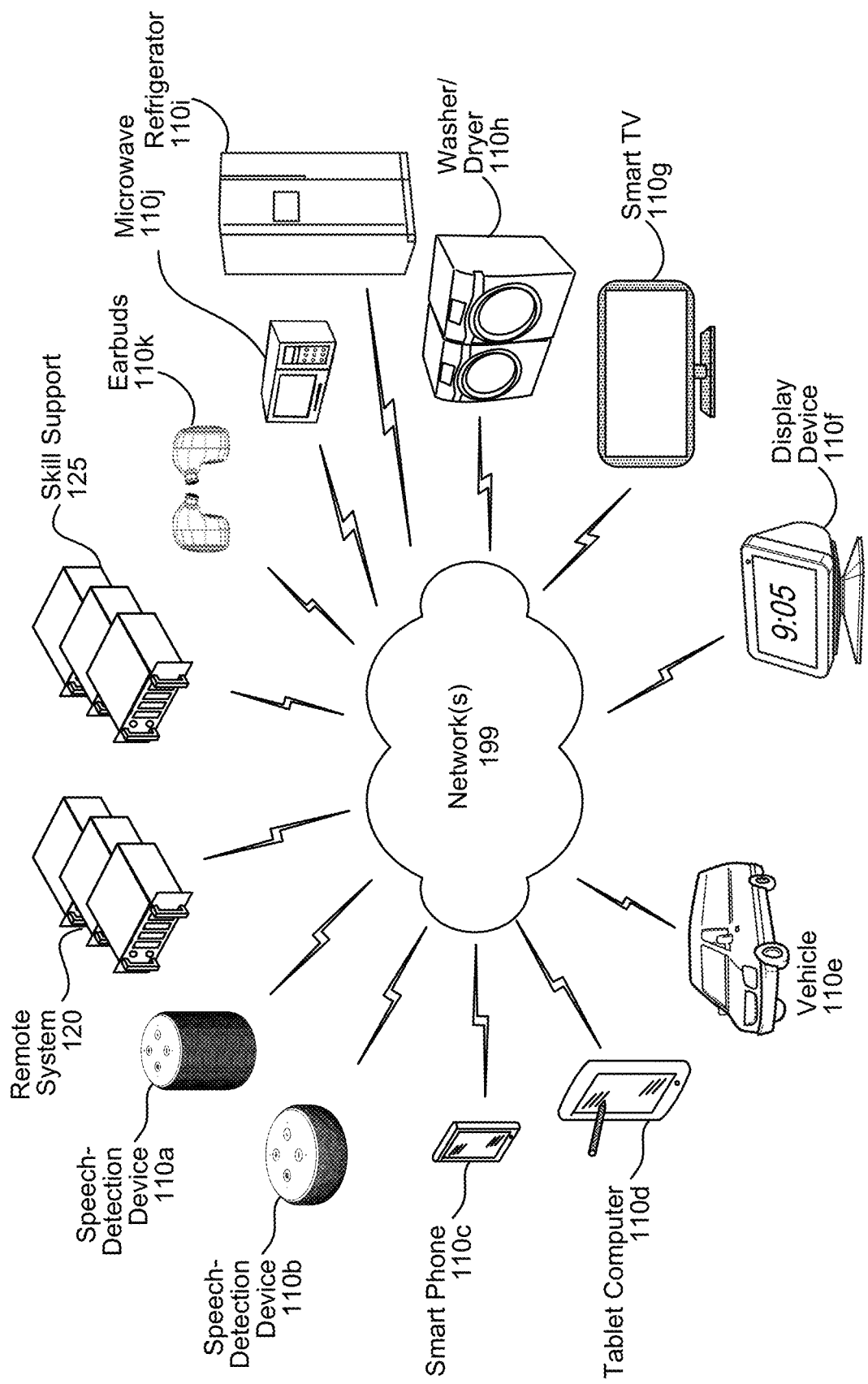

SPEECH PROCESSING FOR MULTIPLE INPUTS

CROSS-REFERENCED TO RELATED APPLICATIONS

This application is a continuation of, and claims the benefit of priority to, U.S. application Ser. No. 16/883,379, filed May 26, 2020, entitled "SPEECH PROCESSING FOR MULTIPLE INPUTS", which is scheduled to issue as U.S. Pat. No. 11,295,743, the entire contents of which are incorporated herein by reference.

BACKGROUND

Natural language processing systems have progressed to the point where humans can interact with computing devices using their voices and natural language textual input. Such systems employ techniques to identify the words spoken and written by a human user based on the various qualities of a received input data. Speech recognition combined with natural language understanding processing techniques enable speech-based user control of a computing device to perform tasks based on the user's spoken commands. Speech recognition and natural language understanding processing techniques may be referred to collectively or separately herein as natural language processing. Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 2B-2C are block diagrams illustrating language processing components that may be included in a language processing device according to embodiments of the present disclosure.

FIG. 3B is a diagram illustrating how a device may select between NLU results determined by the device and determined by the system according to embodiments of the present disclosure.

FIG. 11B is a schematic diagram illustrating a technique for performing time-based indirect arbitration to designate a device to perform an action with respect to user speech.

FIG. 13 illustrates an example of performing arbitration according to embodiments of the present disclosure.

FIGS. 14A-14C illustrate examples of performing language processing for multiple utterances according to embodiments of the present disclosure.

FIGS. 15A-15E illustrate examples of performing language processing for multiple utterances using multiple language processing devices according to embodiments of the present disclosure.

FIGS. 16A-16C illustrate examples of performing language processing for multiple utterances according to embodiments of the present disclosure.

FIGS. 17A-17C illustrate examples of performing language processing using two or more language processing devices configured to process a specific language according to embodiments of the present disclosure.

FIG. 19 is a block diagram conceptually illustrating example components of a system, according to embodiments of the present disclosure.

FIG. 20 illustrates an example of a computer network for use with the overall system, according to embodiments of the present disclosure.

DETAILED DESCRIPTION

Figure 1:
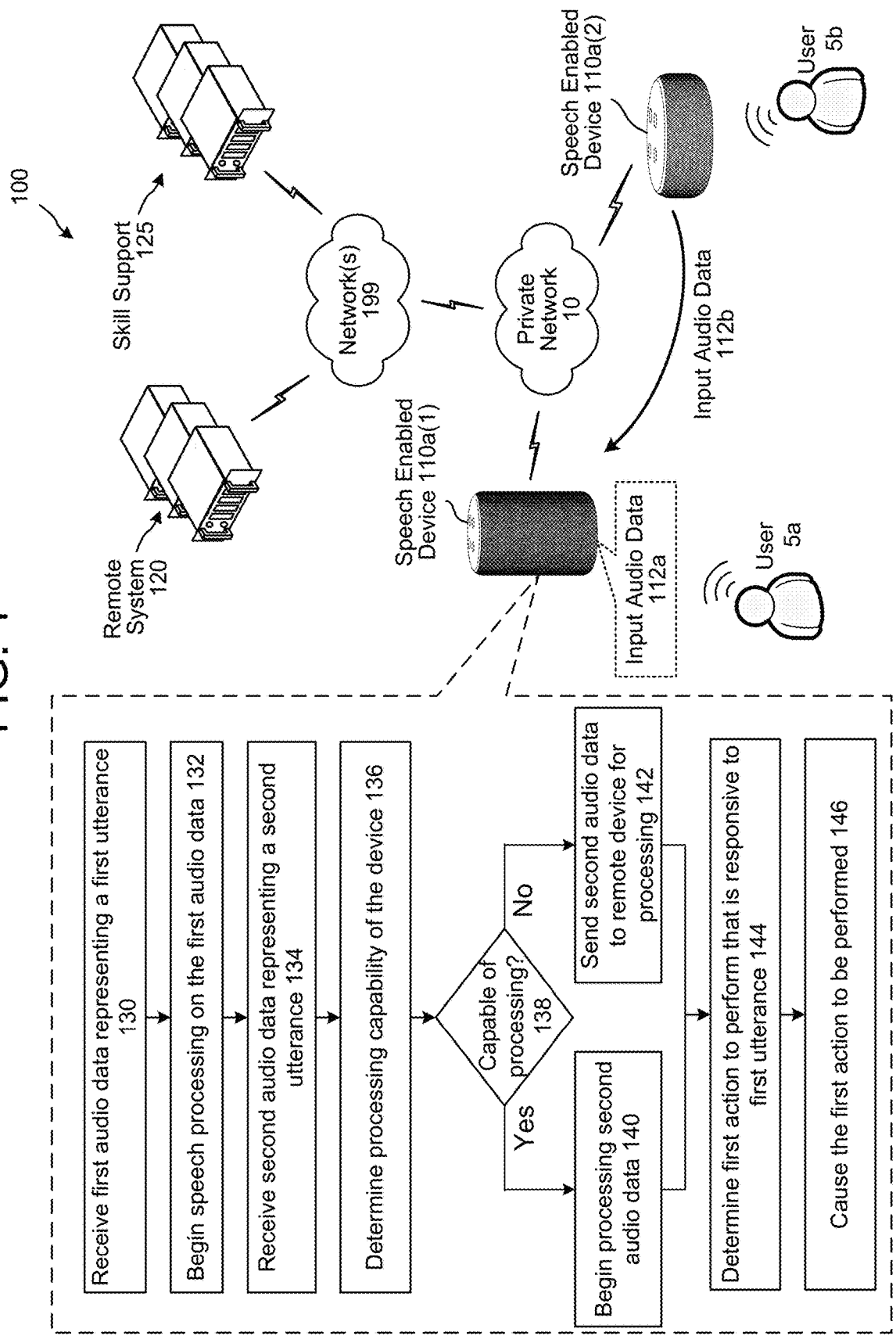
FIG. 1 illustrates a conceptual diagram of a system configured to perform speech processing according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a language processing system to generate NLU output data. The combination of ASR and NLU is one example of how a system can perform spoken language understanding (SLU) processing to transform audio data into NLU output data. Some systems may perform SLU in an end-to-end component without separate or otherwise distinct ASR and NLU components. Text-to-speech (TTS) is a field of computer science concerning transforming textual and/or other data into audio data that is synthesized to resemble human speech.

A system may cause a skill to perform actions in response to natural language inputs (e.g., spoken inputs and/or typed inputs in a language spoken by humans). For example, for the natural language input "play Adele music," a music skill may be invoked to output music sung by an artist named Adele. For further example, for the natural language input "turn on the lights," a smart home skill may be invoked to turn on "smart" lights associated with a user's profile. In another example, for the natural language input "what is the weather," a weather skill may be invoked to output weather information for a geographic location corresponding to the device that captured the natural language input. In the foregoing examples, actions correspond to the outputting of music, turning on "smart" lights, and outputting of weather information in a synthetic voice using TTS. As used herein, an "action" may refer to some result of a skill's processing. In a natural language processing (NLP) system such as Amazon's Alexa, some language processing is performed using a remote system having expandable language processing capability (e.g., capable of processing a large number of requests simultaneously), while other language processing may be performed by individual device(s) having limited processing capability (e.g., resource constrained devices capable of processing a small number of requests simultaneously).

To reduce a latency and/or provide language processing within a private network, this disclosure includes a system that enables voice processing for multiple speech requests. A language processing device is capable of receiving audio data from surrounding devices and performing language processing on the audio data to improve latency and/or provide functionality within a private network (e.g., not connected to a remote system having expandable language processing capability). The language processing device may receive multiple requests corresponding to different utterances. If the language processing device receives a second utterance while processing a first utterance, the language processing device may send an error notification, send a command to send the second utterance to a different language processing device, process the first utterance and the second utterance sequentially, suspend processing of the first utterance to process the second utterance first, send the second utterance to another language processing device within the private network or the remote system, or suspend processing of the first utterance and send the first utterance to the remote system in order to process the second utterance.

FIG. 1 illustrates a conceptual diagram of a system configured to perform language processing according to embodiments of the present disclosure. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices 110 connected to a private network 10 (e.g., local area network (LAN) or the like, although the disclosure is not limited thereto), and the device(s) 110 may optionally communicate with a remote system 120 and/or skill support 125 via one or more network(s) 199.

As illustrated in FIG. 1, a first speech enabled device 110a(1) may capture a first voice command generated by a first user 5a and a second speech enabled device 110a(2) may capture a second voice command generated by a second user 5b. For example, the first device 110a(1) may receive first audio corresponding to a spoken natural language input originating from a first user 5a and may generate first audio data 112a corresponding to the first audio. Similarly, the second device 110a(2) may receive second audio corresponding to a spoken natural language input originating from a second user 5b and may generate second audio data 112b corresponding to the second audio.

The first device 110a(1) and/or the remote system 120 may be configured to perform natural language processing, enabling the system 100 to interpret the first voice command and/or the second voice command using the first device 110a(1), the remote system 120, or a combination thereof. As used herein, the remote system 120 may have expandable language processing capability (e.g., capable of processing a large number of requests simultaneously), while the first device 110a(1) may have limited processing capability (e.g., a resource constrained device capable of processing a small number of requests simultaneously).

As illustrated in FIG. 1, the devices 110 (e.g., first device 110a(1) and second device 110a(2)) may be connected to a private network 10 associated with an environment of the devices 110 (e.g., home, business, etc.). Thus, the devices 110 may communicate with each other using the private network 10, even if the private network 10 is not connected to remote networks (e.g., the internet) via network(s) 199. Thus, in some examples the second device 110a(2) may send the second input audio data 112b to the first device 110a(1) via the private network 10 for language processing without departing from the disclosure. However, the disclosure is not limited thereto, in other examples the second device 110a(2) may send the second input audio data 112b to the remote system 120 for language processing without departing from the disclosure. Additionally or alternatively, the first device 110a(1) may send the first input audio data 112a and/or the second input audio data 112b to the remote system 120 for language processing without departing from the disclosure.

In some examples, the first device 110a(1) may send the first input audio data 112a to the remote system 120 for language processing. For example, the first device 110a(1) may send the first input audio data 112a to the remote system 120 via an application that is installed on the first device 110a(1) and associated with the remote system 120. An example of such an application is the Amazon Alexa application that may be installed on a smart phone, tablet, or the like. Similarly, the second device 110a(2) may send the second input audio data 112b to the remote system 120 for processing.

In other examples, the first device 110a(1) may be configured to perform on-device language processing. For example, the first device 110a(1) may include language processing components that are configured to interpret a voice command to determine an action responsive to the voice command. Thus, the first device 110a(1) may perform language processing on the first audio data 112a generated by the first device 110a(1) to determine a first voice command without departing from the disclosure.

Additionally or alternatively, the first device 110a(1) may extend this functionality to the second device 110a(2) and other devices 110 associated with the private network 10. For example, the first device 110a(1) may perform language processing on the second audio data 112b received from the second device 110a(2) to determine a second voice command without departing from the disclosure. Thus, the first device 110a(1) may receive audio data from one or more devices 110, may determine an action responsive to the audio data, and may cause the action to be performed.

As used herein, on-device language processing and/or local speech processing may refer to the first device 110a(1) performing language processing for itself and other devices 110 associated with the private network 10. Similarly, remote language processing (e.g., remote speech processing) may refer to the remote system 120 performing language processing. Finally, hybrid language processing may refer to the first device 110a(1) and the remote system 120 performing language processing in parallel (e.g., audio data is sent to both the first device 110a(1) and the remote system 120, with the first device 110a(1) performing local speech processing and the remote system 120 performing remote speech processing). As described above, the remote system 120 may have expandable language processing capability (e.g., capable of processing a large number of requests simultaneously), while the first device 110a(1) may have limited processing capability (e.g., a resource constrained device capable of processing a small number of requests simultaneously). Thus, the disclosure may refer to the first device 110a(1) performing local speech processing on the second input audio data 112b even when the first device 110a(1) is physically distant (e.g., remote) from the second device 110a(2).

When multiple devices 110 are in proximity to the first user 5a, a single utterance may be captured by more than one device 110. For example, the first device 110a(1) may capture first audio data 112a representing the utterance and another device in proximity to the first device 110a(1) may capture redundant audio data representing the same utterance. As both the first audio data 112a and the redundant audio data correspond to multiple representations of the same utterance, the first device 110a(1) may perform arbitration processing to select audio data on which to perform language processing. For example, if the first device 110a(1) receives audio data from multiple devices 110 within a short period of time, the first device 110a(1) may perform arbitration processing to select audio data associated with single device (e.g., the first audio data 112a captured by the first device 110a(1)) and may process the selected audio data.

After the first device 110a(1) begins speech processing (e.g., language processing) on the first audio data 112a, however, the first device 110a(1) may receive additional audio data representing a second utterance. For example, the first user 5a may generate an additional voice command or another device 110 associated with the private network 10 may capture a second voice command generated by a second user 5a. FIG. 1 illustrates an example in which the first device 110a(1) receives second audio data 112b from the second device 110a(2), wherein the second audio data 112b represents a second utterance generated by the second user 5b. If the first device 110a(1) has the resources (e.g., processing capability) to process the second utterance, such as if the first device 110a(1) is about to finish processing the first utterance and/or has the capability of processing multiple utterances simultaneously, the first device 110a(1) may simply process the second utterance to determine a second action responsive to the second utterance.

In some examples, however, the first device 110a(1) does not have the resources to process the second utterance immediately. For example, the first device 110a(1) may only be capable of processing a single utterance at a time and is still processing the first utterance, although the disclosure is not limited thereto and the first device 110a(1) may currently be processing multiple utterances without departing from the disclosure.

As illustrated in FIG. 1, the first device 110a(1) may receive (130) first audio data representing a first utterance and may begin (132) speech processing on the first audio data. Later, while still processing the first audio data, the first device 110a(1) may receive (134) second audio data representing a second utterance. In some examples, the first device 110a(1) may generate the first audio data and may receive the second audio data from the second device 110a(2), as illustrated in FIG. 1. However, the disclosure is not limited thereto, and in other examples the first device 110a(1) may receive the first audio data from the second device 110a(2) and may generate the second audio data, the first device 110a(1) may receive the first audio data from the second device 110a(2) and may receive the second audio data from a third device, the first device 110a(1) may receive the first audio data from a third device and may receive the second audio data from the second device 110a(2), and/or the like without departing from the disclosure.

In response to receiving the second audio data, the first device 110a(1) may determine (136) a processing capability of the first device 110a(1) and may determine (138) if the first device 110a(1) is capable of processing the second audio data.

In some examples, the first device 110a(1) may have limited processing capability (e.g., resource constrained) and may only be capable of processing a single utterance at a time. In this case, the first device 110a(1) may determine whether the first device 110a(1) is currently processing the first audio data. If the first device 110a(1) is processing the first audio data and will not finish processing within a short period of time, the first device 110a(1) may determine that it is not capable of processing the second audio data. If the first device 110a(1) has finished processing the first audio data or will finish processing the first audio data within a short period of time, the first device 110a(1) may determine that it is capable of processing the second audio data.

In other examples, the first device 110a(1) may be capable of processing two or more utterances at a time. In this case, the first device 110a(1) may determine whether the first device 110a(1) has any processing capability available, even if the first device 110a(1) is still processing the first audio data. For example, if the first device 110a(1) is configured to process two utterances at a time, the first device 110a(1) may determine whether the first device 110a(1) is currently processing two utterances. If the first device 110a(1) is processing two utterances and will not finish processing within a short period of time, the first device 110a(1) may determine that it is not capable of processing the second audio data. If the first device 110a(1) is only processing the first utterance or is processing two utterances and will finish processing one of the utterances within a short period of time, the first device 110a(1) may determine that it is capable of processing the second audio data.

If the first device 110a(1) determines that it is capable of processing the second audio data, the first device 110a(1) may begin (140) processing the second audio data. For example, the first device 110a(1) may be capable of processing multiple utterances and may begin processing the second audio data while still processing the first audio data. Additionally or alternatively, the first device 110a(1) may determine that current processing on a previous utterance is already completed or will be completed within a short period of time and may potentially store the second audio data in a buffer until the processing is complete.

If the first device 110a(1) is unable to process the second audio data, the first device 110a(1) may send (142) the second audio data to a remote device (e.g., additional device 110a configured to perform language processing, the remote system 120, etc.) for processing.

After beginning language processing on the second audio data in step 140 or sending the second audio data to the remote device in step 142, the first device 110a(1) may determine (144) a first action to perform that is responsive to the first utterance and may cause (146) the first action to be performed. For example, the first device 110a(1) may perform the first action (e.g., generate output audio, generate an image on a display, etc.), may send a command to another device to perform the first action, and/or the like.

While not illustrated in FIG. 1, if the first device 110a(1) begins language processing on the second audio data in step 140, the first device 110a(1) may also determine a second action to perform that is responsive to the second utterance and may cause the second action to be performed. However, if the first device 110a(1) sends the second audio data to the remote device in step 142, the remote device (e.g., device 110a or the remote system 120) may determine a second action to perform that is responsive to the second utterance and may cause the second action to be performed. In some examples, the remote device may cause the second action to be performed by sending a command to the first device 110a(1) to perform the second action, although the disclosure is not limited thereto.

While FIG. 1 illustrates an example in which the first device 110a(1) sends the second audio data to the remote device for processing, the disclosure is not limited thereto. For example, the first device 110a(1) may notify the second device 110a(2) that the first device 110a(1) is unable to process the second utterance at this time, may send a notification to the second device 110a(2) that there will be a brief delay and then process the second utterance after finishing the first utterance (by buffering the second utterance temporarily), may suspend processing of the first utterance and process the second utterance (e.g., prioritizing the second utterance over the first utterance), may suspend processing of the first utterance and send the first utterance to the remote system 120 for processing (e.g., processing the second utterance locally), and/or the like without departing from the disclosure.

In some examples, the first device 110a(1) may determine that it is not capable of processing the second audio data and may send a notification to the second device 110a(2) that there will be a brief delay. In this example, the first device 110a(1) may store the second audio data in a buffer, finish processing the first audio data, and determine the first action to perform that is responsive to the first utterance. After causing the first action to be performed, the first device 110a(1) may retrieve the second audio data from the buffer, process the second audio data, and determine a second action to perform that is responsive to the second utterance. Thus, the first device 110a(1) may process the first utterance and the second utterance sequentially.

In some examples, the first device 110a(1) may suspend speech processing of the first utterance in order to process the second utterance (e.g., prioritizing the second utterance over the first utterance). In this example, the first device 110a(1) may suspend the speech processing of the first audio data, store the first audio data in a buffer, and process the second audio data to determine a second action to perform that is responsive to the second utterance. After causing the second action to be performed, the first device 110a(1) may retrieve the first audio data from the buffer, process the first audio data, and determine the first action to perform that is responsive to the first utterance. Thus, the first device 110a(1) may process the second utterance before processing the first utterance.

In some examples, the first device 110a(1) may send the first utterance to the remote system 120 for processing (e.g., process the second utterance locally). In this example, the first device 110a(1) may suspend the speech processing of the first utterance, send the first audio data to the remote system 120, process the second audio data, determine a second action to perform that is responsive to the second utterance, and cause the second action to be performed. In some examples the first device 110a(1) may receive from the remote system 120 a command to perform the first action responsive to the first utterance, but the disclosure is not limited thereto and the remote system 120 may cause the first action to be performed without departing from the disclosure.

The system 100 may identify an utterance, including defining a beginning of the utterance (e.g., beginpoint) and an end of the utterance (e.g., endpoint), using techniques known to one of skill in the art. As used herein, a number of utterances that the first device 110a(1) is configured to process (e.g., capable of processing) simultaneously indicates a number of discrete audio streams representing speech on which the first device 110a(1) may perform language processing at the same time. While multiple devices 110 may capture a single utterance and generate multiple audio streams, the first device 110a(1) and/or the system 100 may perform arbitration to select a single audio stream on which to perform language processing. Thus, the multiple audio streams correspond to only a single utterance in terms of the number of utterances on which the first device 110a(1) is configured to process at a single time. Similarly, if a wakeword is falsely detected and a device 110 generates an audio stream that does not represent speech, this does not count as an utterance in terms of the number of utterances on which the first device 110a(1) is configured to process at a single time.

Figure 2A:
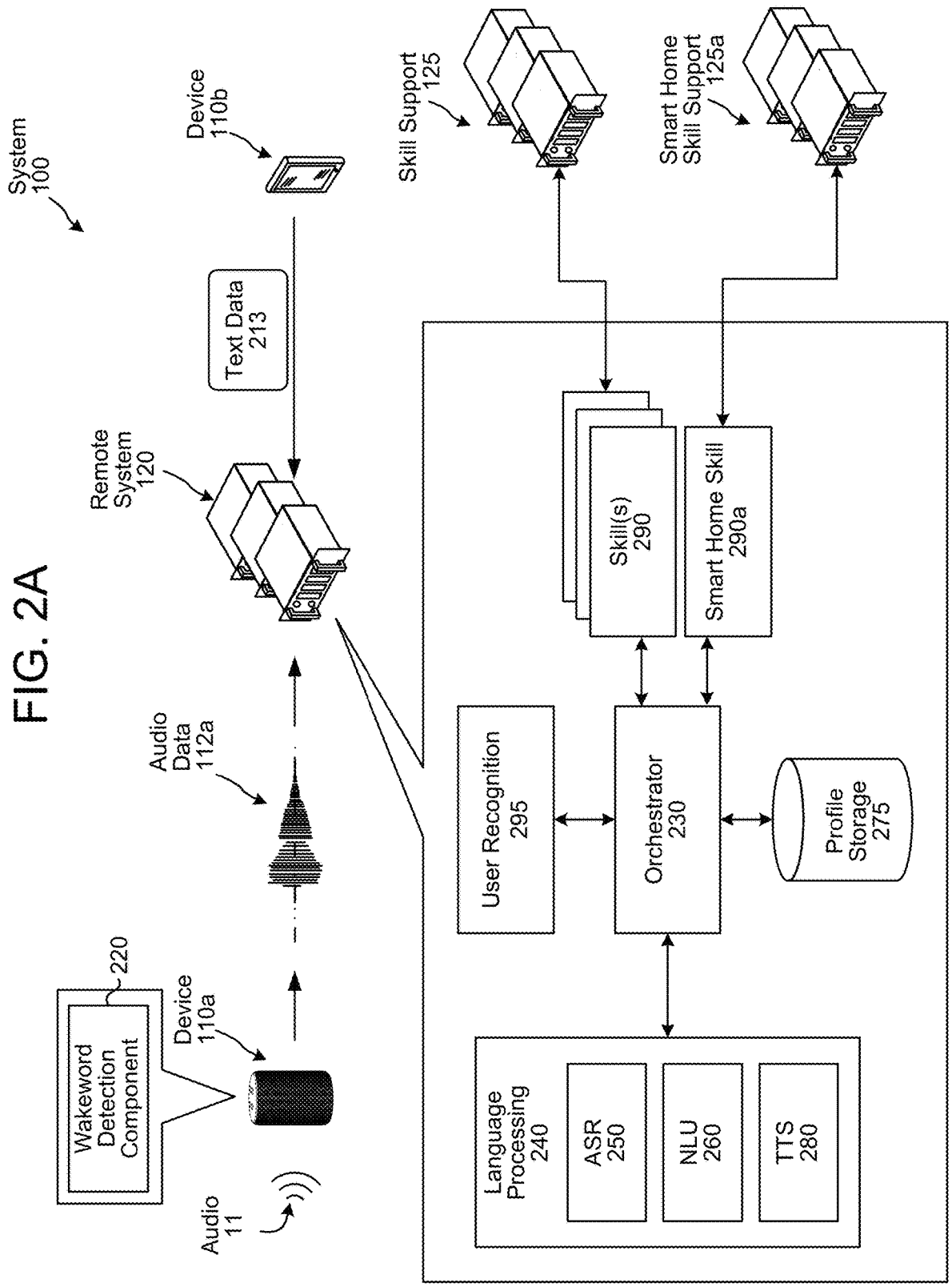
FIG. 2A is a block diagram illustrating language processing components of a natural language processing system according to embodiments of the present disclosure.

The system 100 may operate using various components as described in FIGS. 2A and 2B. The various components may be located on a same or different physical devices. Communication between various components of the system 100 may occur directly or across one or more network(s) 199.

A system such as the system 100 may be configured to incorporate user permissions and may only perform activities disclosed herein if approved by a user. Accordingly, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2A is a conceptual diagram of components of the system 100, according to embodiments of the present disclosure. As shown in FIG. 2A, an audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the remote system 120. An example wakeword is "Alexa." As used herein, a "wakeword" may refer to a single word or more than one consecutive words in speech. The system may also be configured to recognize different wakewords such as "Alexa" and "House" where a first wakeword may invoke different functionality/a different speech processing system from a second wakeword.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio data 211, to the remote system 120. The audio data 211 may include data corresponding to the wakeword, or the device 110a may remove the portion of the audio corresponding to the wakeword prior to sending the audio data 211 to the remote system 120.

The remote system 120 may include a language processing components 240 (e.g., speech processing components). The language processing components 240 can include an automatic speech recognition (ASR) component 250 a natural language understanding (NLU) component 260, and a text-to speech (TTS) component 280. The ASR component 250 can transcribe audio data into one or more ASR hypotheses embodied in ASR output data; for example, one or more different textual or symbolic representations of the speech contained in the audio data. The ASR output data can include a ranked list of ASR hypotheses or the top-scoring ASR hypothesis when multiple ASR hypotheses are generated for a single natural language input. The ASR output data may be used by various components of the remote system 120 for various purposes. A top-scoring ASR hypothesis (and/or other ASR hypotheses), which includes the text data or symbolic data corresponding to the most likely transcription of the audio data 211 may be sent from the ASR component 250 to the NLU component 260.

The NLU component 260 can receive the ASR output data and interpret the ASR output data to determine one or more NLU hypotheses embodied in NLU output data; for example, NLU results data including one or more different intents and entities contained in the transcribed audio data. The NLU output data can include a ranked list of NLU hypotheses or the top-scoring NLU hypothesis when multiple NLU hypotheses are generated for a single natural language input. The NLU output data may be used by various components of the remote system 120 for various purposes. A top-scoring NLU hypothesis (and/or other NLU hypotheses), which includes NLU output data such as the intent data and/or entity data corresponding to the most likely interpretation of the user input (such as represented by audio data 211 and/or text data 213) may be sent from the NLU component 260 to the orchestrator 230 for forwarding to other components of the remote system 120 and the system 100; for example, to skill(s) 290 for processing. Further details of the operation of the NLU component 260 are described below with reference to FIGS. 4 and 5.

The remote system 120 may include one or more skill(s) 290. A skill may be software running on the remote system 120 that is akin to a software application running on a traditional computing device. That is, skill(s) 290 may enable the remote system 120 to execute user commands involving specific functionality in order to provide data or produce some other requested output. The remote system 120 may be configured with more than one skill(s) 290. A skill 290 may operate in conjunction between the remote system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In some examples, the skill 290 may perform an action by interacting with skill support 125, which may include one or more databases, other software, and/or the like. For example, the skill 290 may send an instruction to the skill support 125 to execute specific functionality in order to provide data or perform some other action requested by a user 5. In some examples, the skill 290 may send a request for data (e.g., request for information) to the skill support 125 and may receive the requested data from the skill support 125, enabling the skill 290 to perform an action requested by the user 5. In other examples, the skill 290 may send an instruction to the skill support 125 and the skill support 125 may perform the action requested by the user 5. For example, a weather skill may enable the system 100 to provide weather information, a car service skill may enable the system 100 to book a trip with respect to a taxi or ride sharing service, a restaurant skill may enable the system 100 to order a pizza with respect to the restaurant's online ordering system, etc.

The remote system 120 may communicate with a skill support 125 via Hypertext Transfer Protocol (HTTP) or HTTPS over one or more computer networks such as the network(s) 199, although the disclosure is not limited thereto. In some cases, communication between the remote system 120 and the skill support 125 occurs over one or more third-party network; that is, a computer network maintained by a provider not associated with the remote system 120 or the skill support 125 other than by use of the third-party network.

Additionally or alternatively, a skill 290 may be implemented by a device 110. This may enable the device 110 to execute specific functionality in order to provide data or perform some other action requested by a user. The device 110 can host a skill 290 in the form of an app or application executing on the device 110. Such a device 110 can be, for example, a mobile device 110 on a mobile network or a local area network (LAN).

A skill may be configured to execute with respect to NLU output data. For example, for NLU results data including a <GetWeather> intent, a weather skill may determine weather information for a geographic location represented in a user profile or corresponding to a location of the device 110 that captured a corresponding natural language input. For further example, for NLU results data including a <BookRide> intent, a taxi skill may book a requested ride. In another example, for NLU results data including a <BuyPizza> intent, a restaurant skill may place an order for a pizza. A skill 290 may operate in conjunction with the remote system 120, skill support 125, and/or other devices, such as the device 110, in order to complete certain functions. Inputs to a skill 290 may come from speech processing interactions or through other interactions or input sources.

A skill may be associated with a domain. A non-limiting list of illustrative domains includes a smart home domain, a music domain, a video domain, a flash briefing domain, a shopping domain, and/or a custom domain (e.g., skills not associated with any pre-configured domain).

The remote system 120, skill support 125, and/or devices 110 may each host or otherwise execute instances of same or different skills. In some cases, a single skill—for example, a music skill—may have instances executing on more than one of the remote system 120, skill support 125, and/or devices 110. For example, skill support 125 may host a default instance of a skill while a device 110 hosts personal instance of a skill. The personal instance of a skill may be a skill instance under development or test on a machine local to and/or operated by a skill developer. In another example, the remote system 120 may host a default instance of a skill while the device 110b hosts a personal instance of the skill in the form of an app or application executing on the device 110b.

Unless expressly stated otherwise, reference herein to a "skill" may include a skill 290 operated by the remote system 120, skill support 125, and/or by a device 110. Moreover, the functionality described herein as a skill may be referred to using many different terms, such as an action, bot, app, application, or the like.

The remote system 120 may include a user recognition component 295 that recognizes one or more users associated with data input to the remote system 120.

The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the remote system 120 in correlation with a user input, to stored biometric data of users. The user recognition component 295 may additionally or alternatively perform user recognition by comparing image data (e.g., including a representation of at least a feature of a user), received by the remote system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the remote system 120 and/or other systems.

In some implementations, however, 295 may be turned off, inactive, or otherwise not engaged to perform user recognition. In such cases, the natural language processing system may assign input audio data to a default account, or a user or group account associated with the device 110, or otherwise determine a user/group account to which to assign incoming data.

The remote system 120 may include profile storage 275. The profile storage 275 may include a variety of information related to individual users, groups of users, devices, etc. that interact with the remote system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 275 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the remote system 120 with permission to allow the skill to execute with respect to the user's inputs.

If a user does not enable a skill, the remote system 120 may not permit the skill to execute with respect to the user's inputs.

The profile storage 275 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 275 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household. In some implementations, the user recognition component 295 can associate a particular device 110 to a particular end user (or device) profile in the profile storage 275.

The remote system 120 may include one or more skills 290. The orchestrator 230 can receive NLU results or output data and forward them to an appropriate skill 290, skill support 125, device 110, or any other device, machine, or system capable of hosting or executing a skill. Each skill has its endpoint defined in its definition (sometimes called a skill manifest). The orchestrator 230 can select a skill or skill instance based on an intent indicated in the NLU results data.

Figure 3A:
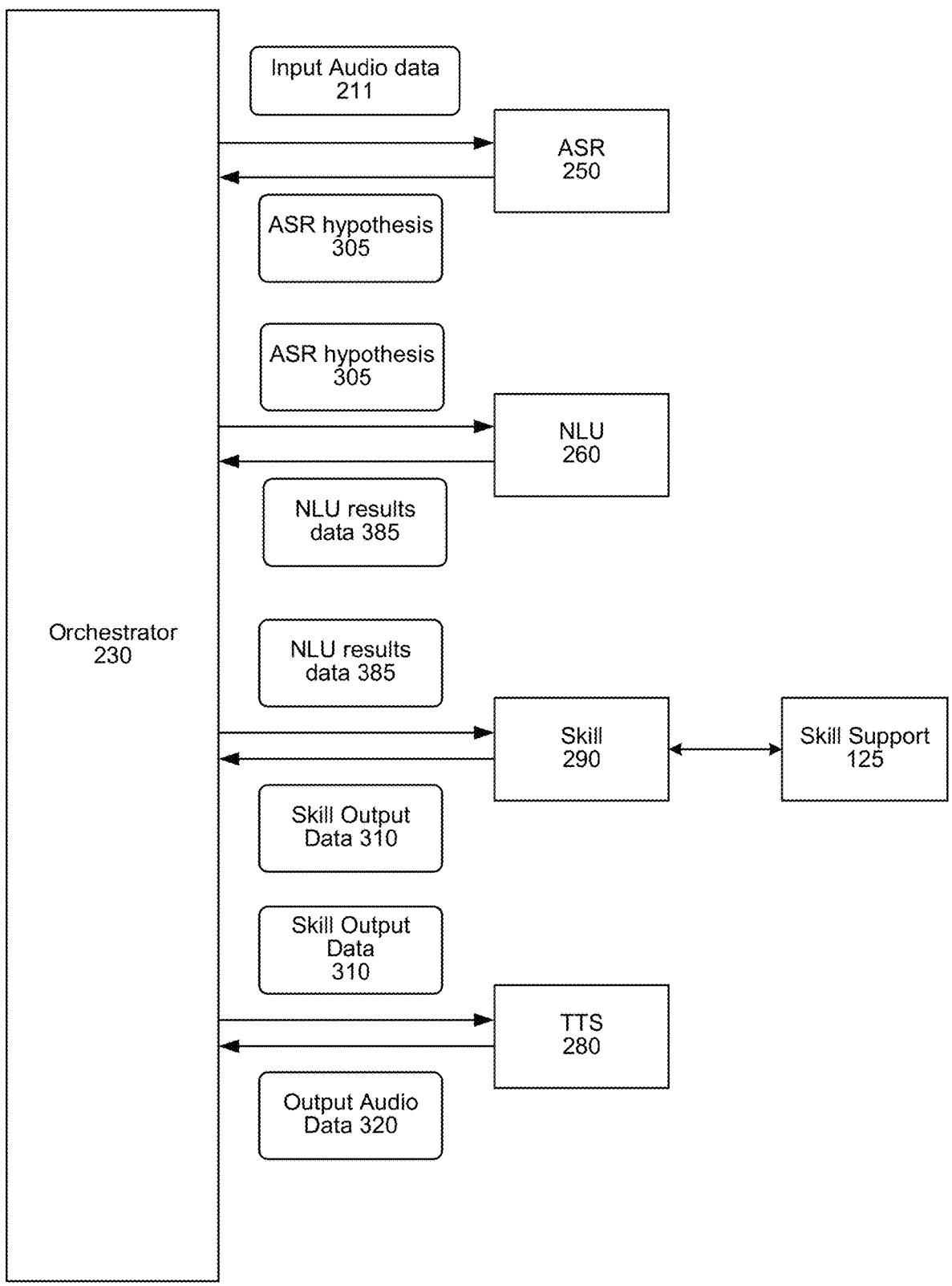
FIG. 3A is a conceptual diagram illustrating how a natural language input may be processed at runtime using dynamic skill endpoints, according to embodiments of the present disclosure.

The remote system 120 may include an orchestrator 230 configured to receive the audio data 211 (and optionally an account identifier corresponding to the device 110*a*) from the device 110*a*. The orchestrator 230 may include memory and logic that enables the orchestrator 230 to transmit various pieces and forms of data to various components of the system 100, as well as perform other operations. For example, as shown in FIG. 3A discussed in more detail below, the orchestrator 230 may send the audio data 211 to an ASR component 250 (discussed further below) and an NLU component 260 (conceptually illustrated in FIGS. 4 and 5, and discussed below). The orchestrator 230 may receive text or symbolic data from the ASR component 250 and forward them to the NLU component 260. The orchestrator 230 may receive the NLU results data from the NLU component 260 and forward them to a skill 290. For example, the system 100 can include various skill endpoints including endpoints associated with one or more skills 290, skill support 125, and/or devices 110. The skill 290, skill support 125, and/or the device 110 may generate output data and return it to the orchestrator 230. The orchestrator 230 cause performance of one or more actions in response to the output data. In some implementations, the orchestrator 230 can forward the output data to the TTS component 280 for generating a spoken-word response to the input audio data 211. The orchestrator 230 may receive output audio data 320 from the TTS component 280, and may transmit the output audio data back to the device 110*a* for output to the user 5.

The remote system 120 may include a TTS component 280. The TTS component 280 may generate audio data (e.g., synthesized speech) from text data using one or more different methods. Text data input to the TTS component 280 may come from a skill 290, skill support 125, the orchestrator 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

In certain embodiments of the system speech processing may be performed not only at the remote system 120 but also on device 110*a* (or 110*b* or other devices 110). Such on-device speech processing may occur separately from or in addition to speech processing performed on the remote system 120. In certain embodiments both device 110 and remote system 120 may perform speech processing and the results of each processing may be evaluated to determine which speech processing results to use to actually execute a command. Such a combined system may be referred to as hybrid language processing (e.g., hybrid speech processing).

FIG. 2B is a block diagram illustrating a system 100 including a speech interface device 110*a* that is capable of performing speech processing. Optimizing the utilization of on-device computing resources (e.g., processing resources, etc.) of the device 110*a* can a reduce latency so that the user experience with the device 110*a* is not negatively impacted by local processing tasks taking too long.

As used herein, some of the primary devices 110*a* may include a hybrid speech interface by including a local speech processing component, such as a language processing component 241. As the device 110*a* includes the local language processing component 241, the device 110 may be configured to process audio data locally and/or send the audio data to the remote system 120 for remote processing.

While FIG. 2B illustrates the language processing component 241 as including an ASR component 250 and/or an NLU component 260, the disclosure is not limited thereto and the language processing component 241 may include a spoken language understanding (SLU) component without departing from the disclosure. For example, the SLU component may be configured to receive audio data as an input and generate NLU data as an output, similar to the combination of the ASR component 250 and the NLU component 260.

The device 110*a* may be located within an environment to provide various capabilities to a user 5, when the user 5 is also in the environment. The environment in which the device 110*a* is located may be a home or other premises, an automobile, or any similar environment. Such an environment may include other devices including additional devices 110, such as other speech interface devices 110*a* (e.g., primary devices), and/or secondary devices 110*b* (e.g., Internet of Things (IoT) devices and/or smart home devices like thermostats, lights, refrigerators, ovens, etc.) that may be controllable by devices 110*a*. When acting as a hub, the device 110*a* may be configured to connect a plurality of devices 110 in an environment and control communications among them, thereby serving as a place of convergence where data arrives from one or more devices 110, and from which data is sent to one or more devices 110.

In general, the device 110a may be capable of capturing utterances with microphone(s) and responding in various ways, such as by outputting content (e.g., audio) via an output device(s), which may be loudspeaker(s), a display(s), or any other suitable output device. In addition, the device 110a may be configured to respond to user speech by controlling second devices 110 (e.g., other primary devices 110a, secondary devices 110b, etc.) that are collocated in the environment with the device 110a, such as by sending a command to a second device via an input/output communications interface (e.g., a short range radio), the command instructing an operation to be performed at the second device (e.g., to turn on/off a light in the environment).

As illustrated in FIG. 2C, in addition to using a built-in microphone(s) to capture utterances and convert them into digital audio data, a first device 110a(1) may additionally, or alternatively, receive audio data (e.g., second input audio data 112b) from a second device (e.g., device 110a(2)) in the environment, such as when the second device 110a(2) captures an utterance from the user 5 and sends the audio data to the first device 110a(1). This may occur in situations where the second device 110a(2) is closer to the user 5 (for example, earbuds 110k) and would like to leverage the "hybrid" capabilities of the first device 110a(1).

The device 110a may operate in conjunction with and/or under the control of a remote, network-based or network-accessible control system (e.g., remote system 120). The remote system 120 may, in some examples be part of a network-accessible computing platform that is maintained and accessible via one or more network(s) 199 such as wide area network. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users. The network(s) 199 are representative of any type of public or private, wide-area network, such as the Internet, which extends beyond the environment of the device 110a. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110a and other local devices 110 may be connected to a private network 10 associated with the environment of the device 110a (e.g., home, business, etc.), and the devices 110 may communicate with the network(s) 199 via the private network 10.

In some embodiments, the remote system 120 may be configured to receive audio data from the device 110a, to recognize speech corresponding to an utterance in the received audio data using a language processing component 240 (which may be referred to as a remote speech processing system), and to perform functions in response to the recognized speech. In some embodiments, these functions involve sending directives (e.g., commands), from the remote system 120 to the device 110a and/or other devices 110 to cause the device to perform an action, such as output an audible response to the utterance via loudspeaker(s), and/or control secondary devices in the environment by sending a control command via the communications interface.

Thus, when the device 110a is able to communicate with the remote system 120 over the network(s) 199, some or all of the functions capable of being performed by the remote system 120 may be performed by sending directive(s) over the network(s) 199 to the device 110a, which, in turn, may process the directive(s) and perform corresponding action(s). For example, the remote system 120, using a remote directive that is included in response data (e.g., a remote response), may instruct the device 110a to output an audible response (e.g., using text-to-speech (TTS)) to a user's 5 question via a loudspeaker of the device 110a, to output content (e.g., music) via the loudspeaker of the device 110a, to display content on a display of the device 110a, and/or to send a directive to a nearby device (e.g., directive to turn on a light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted, the device 110a may be configured to compare the audio data 211 to stored models used to detect a wakeword (e.g., "Alexa") that indicates to the device 110a that the audio data 211 is to be processed for determining a local NLU result (e.g., slot data that corresponds to a named entity, label data, and/or intent data, etc.). In some embodiments, the hybrid request selector 224 (further discussed below) may send the audio data 211 to a wakeword detection component 220, which determines whether a wakeword is detected in the audio data 211, and, if a wakeword is detected, this indication may be provided to the hybrid request selector 224 so that the hybrid request selector 224 can route the audio data 211 to the remote system 120 and/or the local language processing component 241 (e.g., the remote system 120 and the local language processing component 241 may process the audio data 211 in parallel, although the disclosure is not limited thereto). If a wakeword is not detected in the audio data 211, this indication may be provided to the hybrid request selector 224 so that the hybrid request selector 224 can refrain from sending the audio data 211 to the remote system 120, and to prevent the local language processing component 241 from further processing the audio data 211, which does not include the wakeword. The audio data 211 can be discarded in this situation.

The device 110 may also conduct its own speech processing using on-device language processing components 241, such as ASR 250 and NLU 260, similar to the manner discussed above and below for FIGS. 4 and 5 with regard to remote system 120. The device 110 may also have internally included or otherwise accessible other components such as skill(s) 290, smart home skill 290a, and/or other components capable of executing commands based on NLU results or other results determined by the device 110a, user recognition component, user profile storage, or other components. As described above with regard to FIG. 2A, the skill(s) 290 may communicate with skill support 125, while the smart home skill 290a may communicate with smart home skill support 290a, without departing from the disclosure.

The on-device language processing components, however, may not necessarily have the same capabilities as the speech processing components of the remote system 120. For example, the on-device language processing components may be more particularly configured to handle local-type speech commands, such as those controlling devices or components at a user's home. In such circumstances the on-device language processing may be able to more quickly interpret and execute a smart-home command, for example, than processing that involves the remote system 120. If a device 110 attempts to process a command for which the on-device language processing components are not necessarily best suited, the speech processing results obtained by the device 110 may indicate a low confidence or other metric indicating that the processing by the device 110 may not be as accurate as the processing done by the remote system 120.

A hybrid request selector 224 (or, hybrid request selector component 224) of the device 110*a* is shown as including a hybrid proxy (HP) 226 (or, hybrid proxy (HP) subcomponent 226), among other subcomponents. The HP 226 can be implemented as a layer within the voice services component 222 and may be configured to proxy traffic to/from the remote system 120. For example, the HP 226 may be configured to send messages to/from a hybrid execution controller (HEC) 227 (or, hybrid execution controller (HEC) subcomponent 227) of the hybrid request selector 224. For example, command/directive data received from the remote system 120 can be sent to the HEC 227 using the HP 226. The HP 226 may also be configured to allow audio data 211 to pass through to the remote system 120 while also receiving (e.g., intercepting) this audio data 211 and sending the received audio data to the HEC 227.

On-device language processing component 241 (sometimes referred to as a "speech processing component," or a "spoken language understanding (SLU) component") is configured to process audio data 211 representing user speech. In some embodiments, the hybrid request selector 224 may further include a local request orchestrator (LRO) 228 (or, local request orchestrator (LRO) subcomponent) of the hybrid request selector 224. The LRO 228 is configured to notify the local language processing component 241 about the availability of new audio data 211 that represents user speech, and to otherwise initiate the operations of the local language processing component 241 when new audio data 211 becomes available. In general, the hybrid request selector 224 may control the execution of the local language processing component 241, such as by sending "execute" and "terminate" events/instructions to the local language processing component 241. An "execute" event may instruct the local language processing component 241 to continue any suspended execution based on audio data 211 (e.g., by instructing the local language processing component 241 to execute on a previously-determined intent in order to generate a directive). Meanwhile, a "terminate" event may instruct the local language processing component 241 to terminate further execution based on the audio data 211, such as when the device 110*a* receives directive data from the remote system 120 and chooses to use that remotely-generated directive data.

Thus when audio data 211 is received by the voice services component 222, the HP 226 may allow the audio data 211 to pass through to the remote system 120 and the HP 226 may also input the audio data 211 to the on-device language processing component 241 by routing the audio data 211 through the HEC 227 of the hybrid request selector 224, whereby the LRO 228 notifies the local language processing component 241 of the incoming audio data 211. At this point, the hybrid request selector 224 may wait for response data from either or both of the remote system 120 or the local language processing component 241. However, the disclosure is not limited thereto, and in other examples the hybrid request selector 224 may send the audio data only to the local language processing component 241 without departing from the disclosure. For example, the device 110*a* may process the audio data locally without sending the audio data to the remote system 120, or the second device 110*a*(2) may send the audio data to the first device 110*a*(1) and the remote system 120 directly without departing from the disclosure.

The local language processing component 241 is configured to receive the audio data 211 from the hybrid request selector 224 as input, to recognize speech in the audio data 211, to determine user intent from the recognized speech, and to determine how to act on the user intent by generating NLU results data which may include directive data (e.g., data instructing a component to perform an action). Such NLU results data may take a form similar to that as determined by the NLU operations by the remote system 120. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local language processing component 241 (and/or the remote system 120) may be formatted using Java, such as JavaScript syntax, or JavaScript-based syntax. This may include formatting the directive using JSON. In some embodiments, a device-generated directive may be serialized, much like how remotely-generated directives are serialized for transmission in data packets over the network(s) 199. In other embodiments, a device-generated directive is formatted as a programmatic API call with a same logical operation as a remotely-generated directive. In other words, a device-generated directive may mimic remotely-generated directives by using a same, or a similar, format as the remotely-generated directive.

The language processing component 241 may process the audio data to determine local NLU data, which may include intent data and/or slot data (e.g., "NLU result") so that directives may be determined based on the intent data and/or the slot data. Thus, the language processing component 241 may process the audio data and attempt to make a semantic interpretation of the utterance represented by the audio data (e.g., determine a meaning associated with the utterance) and then implements that meaning. For example, the language processing component 241 may interpret audio data representing an utterance from the user 5 in order to derive an intent or a desired action or operation from the user 5. This may include deriving pertinent pieces of information from the utterance that allow the language processing component 241 to identify a second device in the environment, if the user, for example, intends to control a second device (e.g., a light in the user's 5 house). The local language processing component 241 may also provide a dialog management function to engage in speech dialogue with the user 5 to determine (e.g., clarify) user intents by asking the user 5 for information using speech prompts.

In some examples, the language processing component 241 outputs the most likely NLU response (e.g., hypothesis) recognized in the audio data, or multiple hypotheses in the form of a lattice or an N-best list with individual hypotheses corresponding to confidence scores or other scores (such as probability scores, etc.). In some examples, the language processing component 241 is customized to the user 5 (or multiple users) who created a user account to which the device 110*a* is registered. For example, the language processing component 241 may process the audio data based on known information (e.g., preferences) of the user 5, and/or on a history of previous interactions with the user 5.

NLU results as determined by the device 110*a* and/or the remote system 120 may include data indicating a confidence and/or estimated accuracy of the results. Such data may come in the form of a numeric score but may also come in different forms such as an indicator of Low, Medium, or High, a ranking, or other data. The confidence data may be set to a similar scale so that confidence data for one set of NLU results (e.g., NLU result data from device 110a) may be evaluated with regard to confidence data for another set of results (e.g., NLU result data from the remote system 120).

Thus an NLU result may be selected as a candidate NLU result usable to respond to the user speech, and the local language processing component 241 may send local response data (e.g., local NLU result and/or local directive data) to the hybrid request selector 224, such as a "ReadyToExecute" response, which can indicate that the local language processing component 241 has recognized an intent, or is ready to communicate failure (e.g., if the local language processing component 241 could not recognize an intent). The hybrid request selector 224 may then determine whether to use directive data from the local language processing component 241 to respond to the user speech, to use directive data received from the remote system 120, assuming a remote response is even received (e.g., when the device 110a is able to access the remote system 120 over the network(s) 199), or to generate output audio requesting additional information from the user 5.

Further illustration of selection of device 110a determined NLU results data versus remote system 120 determined NLU results data is discussed below in reference to FIG. 3B. In any case, directive data is processed to cause the device 110a to perform an action, such as outputting audio via one or more speaker(s), controlling one or more second devices in the environment, etc. In the example of FIG. 2B, the action may be to send a control signal(s) via the communications interface to one or more lights in the kitchen, which may be configured to receive the control signal and perform the "turn off" operation to turn off the kitchen lights.

In some examples, the device 110a and/or the remote system 120 may associate a unique identifier with each utterance. Thus, the device 110a may include the unique identifier when sending the audio data to the remote system 120 and the response data may include the unique identifier to identify which utterance the remote directive data and the remote NLU data corresponds.

In some examples, the device 110a may also include, or be configured to use, skill(s) 290 that may work similarly to the skill(s) 290 described above with regard to the remote system 120. Skill(s) 290 may represent domains that are used in order to determine how to act on an utterance in a particular way, such as by outputting a directive that corresponds to the determined intent, and which can be processed to implement the desired operation. Accordingly, the term "skill" may be used interchangeably with the terms "speechlet," "domain," or "domain implementation." The skill(s) 290 installed on the device 110a may include, without limitation, a smart home skill 290a (or smart home domain) and/or device control skill 290b (or device control domain) to act on utterances with intents to control a second device(s) in the environment, a music skill 290c (or music domain) to act on utterances with intents to play music on a device, such as via loudspeaker(s) of the device 110a, a navigation skill 290d (or a navigation domain) to act on utterances with intents to get directions to a point of interest with a known address, a shopping skill 290e (or shopping domain) to act on utterances with intents to buy an item from an electronic marketplace, and/or the like. In the example described above, the smart home skill 290a may correspond to a group of devices 110 associated with the smart home skill 290a and/or a smart home support 125a, whereas the device control skill 290b may correspond to individual devices 110 that can be controlled by the device 110a. In some examples, one or more devices 110 may be paired with the device 110a and only the device 110a may control these paired devices (e.g., using the device control skill 290b), although the disclosure is not limited thereto.

Additionally or alternatively, the device 110a may be in communication with skill support 125 without departing from the disclosure. In some examples, the device 110a may also have, or otherwise be in communication with, smart home skill support 125a configured locally. For example, the smart home skill support 125a described in FIG. 2A may be located in a remote environment (e.g., separate location), such that the device 110 may only communicate with the smart home skill support 125a via the network(s) 199. However, the disclosure is not limited thereto, and in some examples the smart home skill support 125a may be configured in a local environment (e.g., home server and/or the like), such that the device 110 may communicate with the smart home skill support 125a via the private network 10.

In order to generate a particular interpreted response, the language processing component 241 may apply grammar models and lexical information associated with the respective domains or skill(s) 290 to recognize one or more entities in the utterance. In this manner the language processing component 241 may identify "slots" (i.e., particular words in the utterance) that may be needed for later command processing. Depending on the complexity of the language processing component 241, it may also label each slot with a type of varying levels of specificity (such as noun, place, city, artist name, song name, device name, or the like). Each grammar model used by the language processing component 241 may include the names of entities (i.e., nouns) commonly found in speech about the particular domain (i.e., generic terms), whereas the lexical information (e.g., from a gazetteer) is personalized to the user(s) and/or the device. For example, a grammar model associated with the navigation domain may include a database of words commonly used when people discuss navigation.

Accordingly, the intents identified by the language processing component 241 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the language processing component 241 may parse the utterance to identify words as subject, object, verb, preposition, etc., based on grammar rules and/or models, prior to recognizing named entities. The identified verb may be used by the language processing component 241 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The language processing component 241 may then search the corresponding fields in the domain-specific and personalized lexicon(s), attempting to match words and phrases in the utterance tagged as a grammatical object or object modifier with those identified in the database(s).

To illustrate a home automation example, the user 5 may utter the expression "Turn on the office light." Whether this utterance is captured by the microphone(s) of the first device 110*a*(1) or captured by another device 110 (e.g., second input audio data 112*b* generated by device 110*a*(2)) in the environment, the audio data representing the utterance is ultimately received by the voice services component 222 executing on the device 110*a*. While not illustrated in FIGS. 2B-2C, in some examples the voice services component 222 may include a speech interaction manager (SIM) configured to manage received audio data by processing utterances as events. The SIM may also manage the processing of directives that are used to respond to the user speech (e.g., by controlling the action(s) of the device 110*a*). The SIM may include and/or interact with one or more client applications or skills 290 for performing various functions at the device 110*a*.

At least part of (e.g., subcomponents of) the hybrid request selector 224 can be implemented as a layer within the voice services component 222 that is located between the SIM and a speech communication library (SCL) (not illustrated), and may be configured to proxy traffic to/from the remote system 120. For example, the hybrid request selector 224 may be configured to pass messages between the SIM and the SCL (such as by passing events and directives there between), and to send messages to/from subcomponents of the hybrid request selector 224 that are configured to select a response (e.g., either local or remote response data) to use in responding to user speech. In this manner, in some examples the hybrid request selector 224 can "snoop" on communication between the SIM and the remote system 120. For example, information (e.g., a remote directive, remote NLU data, etc.) that is contained in the response data can be sent to the hybrid request selector 224. The hybrid request selector 224 may also be configured to allow audio data received from the SIM to pass through to the remote system 120 (via the SCL) while also receiving (e.g., intercepting) this audio data for input to a local language processing component 241.

FIG. 3A is a conceptual diagram illustrating how a natural language input may be processed at runtime using dynamic skill endpoints, according to embodiments of the present disclosure. FIG. 3A illustrates the operation of the remote system 120 from the perspective of an orchestrator 230. After the orchestrator 230 receives the audio data 211 corresponding to a spoken natural language input, the orchestrator 230 may send the audio data 211 to the ASR component 250. The ASR component 250 can transcribe audio data into one or more ASR hypotheses embodied in ASR output data 305 (e.g., one or more different textual or symbolic representations of the speech contained in the audio data). The ASR output data 305 can include a ranked list of ASR hypotheses or the top-scoring ASR hypothesis when multiple ASR hypotheses are generated for a single natural language input. A top-scoring ASR hypothesis (and/or other ASR hypotheses), which includes the text or symbolic data corresponding to the most likely transcription of the audio data 211 may be sent from the ASR component 250 to the orchestrator 230. The orchestrator 230 may send the ASR output data 305 to the NLU component 260.

The NLU component 260 can receive the ASR output data 305. The NLU component 260 can interpret the ASR output data 305 to determine one or more NLU hypotheses embodied in NLU results data 385 (e.g., one or more different intents and entities contained in the transcription of the audio data 211). The NLU results data 385 can include a ranked list of NLU hypotheses or the top-scoring NLU hypothesis when multiple NLU hypotheses are generated for a single natural language input. A top-scoring NLU hypothesis (and/or other NLU hypotheses), which includes the intent and entity data corresponding to the most likely interpretation of the audio data 211 may be sent from the NLU component 260 to the orchestrator 230. Further details of the operation of the NLU component 260 are described below with reference to FIGS. 4 and 5.

The orchestrator 230 may send the NLU results data 385 to a skill 290 for processing. The orchestrator 230 can forward the NLU results data 385 to the skill 290 or skill instance according to an intent indicated by the NLU results data. The skill 290 may process the NLU results data 385 and return skill output data 310 to the orchestrator 230. The orchestrator 230 may forward the skill output data 310 directly to the device 110, to another skill, or to the text-to-speech (TTS) component 280. The TTS component 280 may generate a spoken-word response to the user based on the skill output data 310, and provide it back to the orchestrator 230 in the form of output audio data 320, which may be forwarded to the device 110 for output.

FIG. 3B is a diagram illustrating how a device may select between NLU results determined by the device and determined by the system according to embodiments of the present disclosure. The device 110 may receive/determine (332) audio data representing speech. The device 110 may send (334) audio data representing the speech to the remote system 120. The device 110 may also perform (336) on-device speech processing to determine on-device NLU results data/directive data. The device 110 may receive (338) NLU results data/directive data from the remote system 120. The device 110 may select (340) from the system-generated NLU results data/directive data or the device-generated NLU results data/directive data. The device 110 may perform the selection by comparing confidence data of the respective NLU results data and selecting the NLU results data with the highest reflected confidence and/or accuracy. The device 110 may also check to see if the confidence of the device-generated NLU results data exceeds a threshold and if it does, select the device-generated NLU results data and if not select the system-generated NLU results data. The device 110 may also determine an intent represented in the NLU results data and if a certain intent is represented, select a particular set of NLU results data (for example, certain intents may result in selection of device-generated NLU results while other intents may result in selection of system-generated NLU results). Other selection criteria may also be used. The device 110 may them perform an action (342) based on the selected NLU results data.

For example if the selected NLU results data includes instructions to turn off the kitchen lights, the device 110 may perform an action, via the communications interface 1702, a command to a second device(s) (e.g., smart kitchen lights) collocated in the environment with the device 110, causing the second device(s) to "turn off" In another example, if the NLU results data indicates an action that requires operation of a remote skill 290 the device may indicate to the remote system 120 (or other component) to send a directive to the appropriate skill 290 to perform the action.

In another example, the device 110 may select (340) the system-generated NLU results data however may determine that the device 110 is acting as the skill endpoint (as described herein) for the skill indicated in the selected system-generated NLU results data. For example, the device 110 may process the system-generated NLU results data and determine, using a skill 290 and/or other components/operations that the device 110 is acting as (or is in communication with) the appropriate skill endpoint that goes with the system-generated NLU results data. The device 110 may then cause the command represented by the system-generated NLU results data to be executed, either by some component/software of device 110 or by some other component in communication with device 110.

Figure 4:
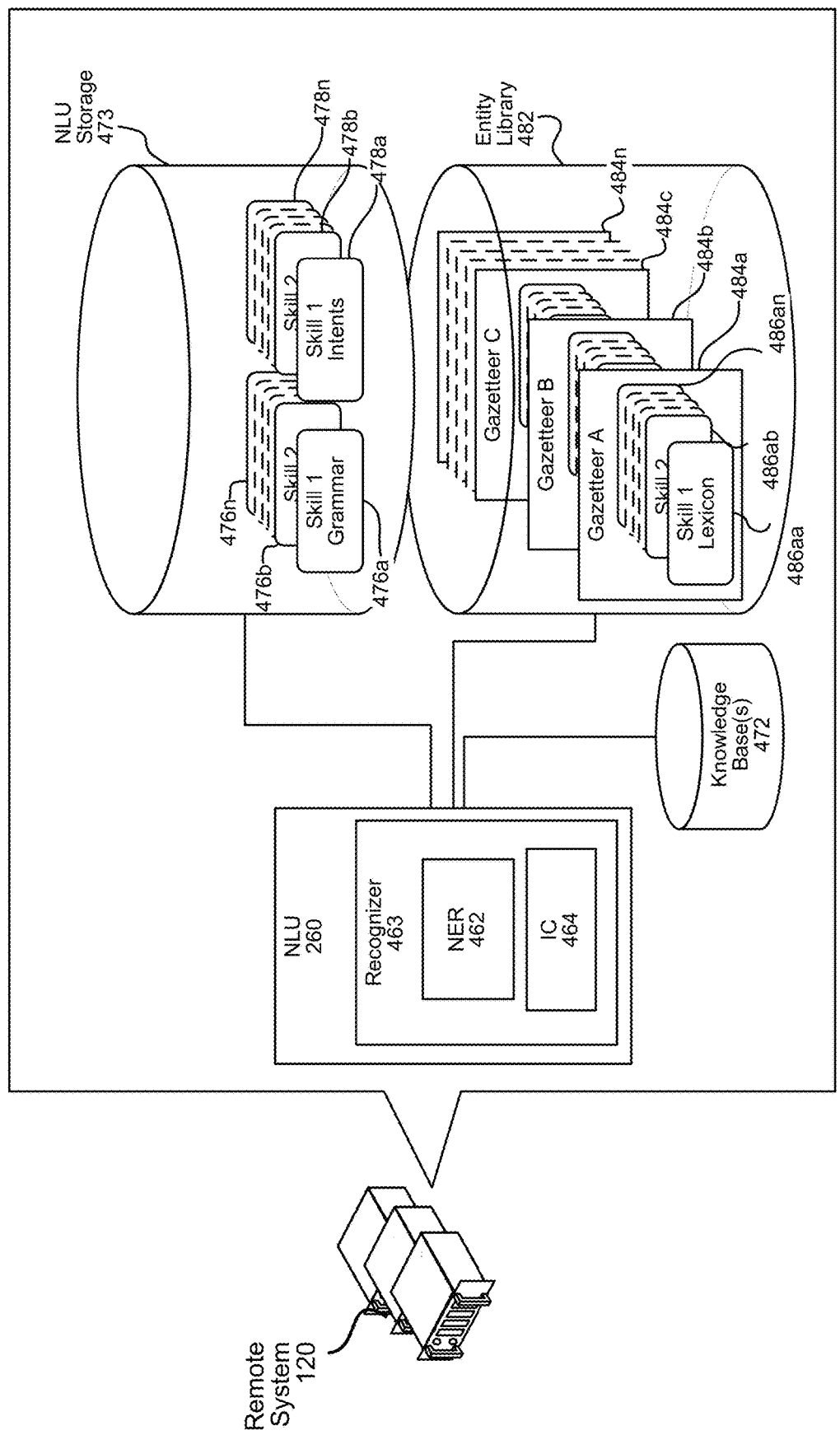
FIG. 4 is a conceptual diagram of how natural language processing is performed, according to embodiments of the present disclosure.

FIG. 4 is a conceptual diagram showing how natural language processing is performed by the NLU component 260, according to embodiments of the present disclosure. The NLU component 260 may include one or more recognizers 463. In at least some embodiments, a recognizer 463 may be associated with skill support 125 (e.g., the recognizer may be configured to interpret text data to correspond to the skill support 125). In at least some other examples, a recognizer 463 may be associated with a domain (i.e., the recognizer may be configured to interpret text data to correspond to the domain). The recognizer 463 can serve as a search provider interface to the skills and/or domains such as a music domain.

Recognizers 463 may process text data in parallel, in series, partially in parallel, etc. For example, a recognizer corresponding to a first domain may process text data at least partially in parallel to a recognizer corresponding to a second domain. For further example, a recognizer corresponding to a first skill may process text data at least partially in parallel to a recognizer corresponding to a second skill. Thus, the system 100 can fan out searches related to entity recognition and resolution across the recognizers 463.

The NLU component 260 may communicate with various storages. The NLU component 260 may communicate with an NLU storage 473, which includes skill grammar models (476a-476n), representing how natural language inputs may be formulated to invoke skill support 125, and skill intents (e.g., intents databases 478a-478n) representing intents supported by respective skill support 125.

Each recognizer 463 may be associated with a particular grammar model 476, a particular intents database 478, and a particular personalized lexicon 486 (stored in an entity library 482). A gazetteer 484 may include skill-indexed lexical information associated with a particular user. For example, Gazetteer A (484a) may include skill-indexed lexical information 486aa to 486an. A user's music skill lexical information might include album titles, artist names, and song names, for example, whereas a user's contact list skill lexical information might include the names of contacts. Since every user's music collection and contact list is presumably different, this personalized information may improve entity resolution.

Each recognizer 463 may include a named entity recognition (NER) component 462 that attempts to identify grammars and lexical information that may be used to construe meaning with respect to text data input therein. A NER component 462 identifies portions of text data that correspond to a named entity that may be recognizable by the remote system 120. A NER component 462 may also determine whether a word refers to an entity that is not explicitly mentioned in the text, for example "him," "her," "it" or other anaphora, exophora or the like.

A NER component 462 applies grammar models 476 and lexical information included in lexicons 486 that are associated with one or more skills 290 to determine a mention of one or more entities in text data input therein. In this manner, a NER component 462 identifies "slots" (i.e., particular words in text data) that may be needed for later processing. A NER component 462 may also label each slot with a type (e.g., noun, place, city, artist name, song name, etc.).

Each grammar model 476 may include the names of entities (i.e., nouns) commonly found in speech about a particular skill 290 to which the grammar model 476 relates, whereas lexicon 486 may include lexical information personalized to the user identifier output by a user recognition component 295 (described herein with reference to FIG. 2) for the natural language input. For example, a grammar model 476 associated with a shopping skill may include a database of words commonly used when people discuss shopping.

A downstream process called named entity resolution actually links a portion of text data (identified by a NER component 462) to a specific entity known to the remote system 120. To perform named entity resolution, the NLU component 260 may use gazetteer information (484a-484n) stored in the entity library storage 482. The gazetteer information 484 may be used to match text data (identified by a NER component 462) with different entities, such as song titles, contact names, etc. Gazetteers may be linked to users (e.g., a particular gazetteer may be associated with a specific user's music collection), may be linked to certain skills 290 (e.g., a shopping skill, a music skill, a video skill, a communications skill, etc.), or may be organized in another manner.

Each recognizer 463 may also include an IC component 464 that processes text data input thereto to determine an intent(s) of a skill 290 that potentially corresponds to the natural language input represented in the text data. An intent corresponds to an action to be performed that is responsive to the natural language input represented by the text data. An IC component 464 may communicate with an intents database 478 that includes words linked to intents. For example, a music intent database may link words and phrases such as "quiet," "volume off," and "mute" to a <Mute> intent. An IC component 464 identifies potential intents by comparing words and phrases in text data to the words and phrases in an intents database 478 associated with the skill 290 that is associated with the recognizer 463 implementing the IC component 464.

The intents identifiable by a specific IC component 464 may be linked to one or more skill-specific grammar models 476 (e.g., grammar frameworks) with "slots" to be filled. Each slot of a grammar model 476 corresponds to a portion of text data that a NER component 462 believes corresponds to an entity. For example, a grammar model 476 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 476 may not be structured as sentences, but rather based on associating slots with grammatical tags.

For example, a NER component 462 may identify words in text data as subject, object, verb, preposition, etc. based on grammar rules and/or models prior to recognizing named entities in the text data. An IC component 464 (implemented by the same recognizer 463) may use the identified verb to identify an intent. The NER component 462 may then determine a grammar model 476 associated with the identified intent. For example, a grammar model 476 for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon 486, attempting to match words and phrases in the text data the NER component 462 previously tagged as a grammatical object or object modifier with those identified in the lexicon 486.

A NER component 462 may perform semantic tagging, which is the labeling of a word or combination of words according to their type/semantic meaning. A NER component 462 may parse text data using heuristic grammar rules, or a model may be constructed using techniques such as hidden Markov models, maximum entropy models, log linear models, conditional random fields (CRF), and the like. For example, a NER component 462, implemented by a music skill or music domain recognizer 463, may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 may identify "Play" as a verb based on a word database associated with the music skill or music domain, which an IC component 464 may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity).

The frameworks linked to the intent are then used to determine what database fields should be searched to determine the meaning of these phrases, such as searching a user's gazetteer 484 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 484 does not resolve a slot/field using gazetteer information, the NER component 462 may search a database of generic words (in the knowledge base 472). For example, if the text data corresponds to "play songs by the rolling stones," after failing to determine an album name or song name called "songs" by "the rolling stones," the NER component 462 may search a music skill vocabulary for the word "songs." In the alternative, generic words may be checked before the gazetteer information, or both may be tried, potentially producing two different results.

A recognizer 463 may tag text data to attribute meaning thereto. For example, a recognizer 463 may tag "play mother's little helper by the rolling stones" as: {skill} Music, {intent} Play Music, {artist name} rolling stones, {media type} SONG, and {song title} mother's little helper. For further example, a recognizer 463 may tag "play songs by the rolling stones" as: {skill} Music, {intent} Play Music, {artist name} rolling stones, and {media type} SONG.

As described above, more than one recognizer 463 may process with respect to text data representing a single natural language input. In such examples, each recognizer 463 may output at least one NLU hypothesis including an intent indicator (determined by an IC component 464 of the recognizer 463) and at least one tagged named entity (determined by a NER component 462 of the recognizer 463).

Figure 5:
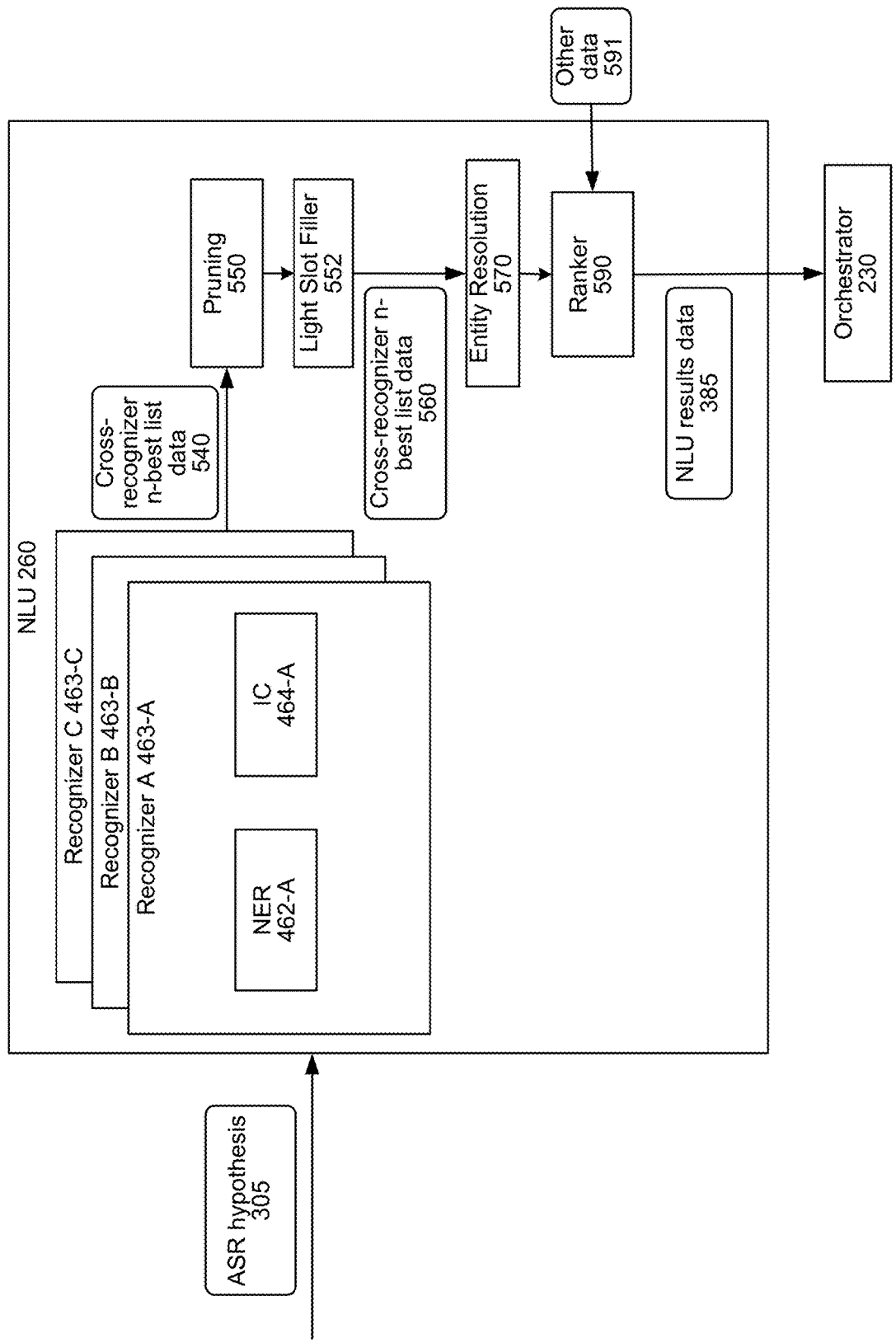
FIG. 5 is a conceptual diagram of how natural language processing is performed, according to embodiments of the present disclosure.

FIG. 5 is a conceptual diagram of how natural language processing is performed by the NLU component 260, according to embodiments of the present disclosure. The NLU component 260 may compile the NLU hypotheses (output by multiple recognizers 463) into cross-recognizer N-best list data 540. Each NLU hypothesis may be associated with a respective score indicating a likelihood that the NLU hypothesis corresponds to the domain, one or more skills 290 associated with the recognizer 463 from which the NLU hypothesis was output. For example, the cross-recognizer N-best list data 540 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface with each line of the foregoing corresponding to a different NLU hypothesis and associated score.

The NLU component 260 may send the cross-recognizer N-best list data 540 to a pruning component 550, which sorts the NLU hypotheses, represented in the cross-recognizer N-best list data 540, according to their respective scores. The pruning component 550 may then perform score thresholding with respect to the cross-recognizer N-best list data 540. For example, the pruning component 550 may select NLU hypotheses, represented in the cross-recognizer N-best list data 540, associated with scores satisfying (e.g., meeting and/or exceeding) a threshold score. The pruning component 550 may additionally or alternatively perform number of NLU hypothesis thresholding. For example, the pruning component 550 may select a threshold number of top-scoring NLU hypotheses represented in the cross-recognizer N-best list data 540.

The pruning component 550 may generate cross-recognizer N-best list data 560 including the selected NLU hypotheses. The purpose of the pruning component 550 is to create a reduced list of NLU hypotheses so that downstream, more resource intensive, processes may only operate on NLU hypotheses that most likely represent the natural language input.

The NLU component 260 may include a light slot filler component 552 that takes text from slots, represented in the NLU hypotheses output by the pruning component 550, and alter it to make the text more easily processed by downstream components. The light slot filler component 552 may perform low latency operations that do not involve heavy operations such as reference to a knowledge base. The purpose of the light slot filler component 552 is to replace words with other words or values that may be more easily understood by downstream components. For example, if a NLU hypothesis includes the word "tomorrow," the light slot filler component 552 may replace the word "tomorrow" with an actual date for purposes of downstream processing. Similarly, the light slot filler component 552 may replace the word "CD" with "album" or the words "compact disc." The replaced words are then included in the cross-recognizer N-best list data 560.

The cross-recognizer N-best list data 560 may be sent to an entity resolution component 570. The entity resolution component 570 can apply rules or other instructions to standardize labels or tokens in the NLU hypotheses represented in the cross-recognizer N-best list data 560. The precise transformation may depend on the skill 290, domain, etc., to which a NLU hypothesis relates. For example, for a travel skill-specific NLU hypothesis, the entity resolution component 570 may transform text corresponding to "Boston airport" to the standard BOS three-letter code referring to the airport. The entity resolution component 570 can refer to a knowledge base that is used to specifically identify the precise entity referred to in each slot of each NLU hypothesis represented in the cross-recognizer N-best list data 560.

Specific intent/slot combinations may also be tied to a particular source, which may then be used to resolve the text. In the example "play songs by the stones," the entity resolution component 570 may reference a personal music catalog, Amazon Music account, a user profile, or the like. The entity resolution component 570 may output N-best list data, altered from the cross-recognizer N-best list data 560, that includes more detailed information (e.g., entity IDs) about the specific entities mentioned in the slots and/or more detailed slot data that can eventually be used by a skill 290 to perform an action responsive to the natural language input. The NLU component 260 may include multiple entity resolution components 570 that are each specific to one or more different skills 290, domains, etc.

One or more models for the entity resolution component 570 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The NLU component 260 may include a ranker component 590 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 590 may assign the first NLU hypothesis a higher score than a second NLU hypothesis including at least one slot that is unfilled/unresolved by the entity resolution component 570.

The ranker component 590 may apply re-scoring, biasing, or other techniques. To do so, the ranker component 590 may consider not only the data output by the entity resolution component 570, but may also consider other data 591. The other data 591 may include a variety of information.

For example, the other data 591 may include skill 290 rating or popularity data. For example, if a skill 290 has a high rating, the ranker component 590 may increase the score of a NLU hypothesis associated with that skill 290, and vice versa.

The other data 591 may additionally or alternatively include information about skills 290 that have been enabled by the user that originated the natural language input. For example, the ranker component 590 may assign higher scores to NLU hypotheses associated with enabled skills 290 than NLU hypotheses associated with skills 290 that have not been enabled by the user.

The other data 591 may additionally or alternatively include data indicating system usage history (e.g., specific to the user), such as if the user, that originated the natural language input, regularly invokes a particular skill 290 or does so at particular times of day. The other data 591 may additionally or alternatively include data indicating date, time, location, weather, type of device 110, user identifier, context, as well as other information. For example, the ranker component 590 may consider when any particular skill 290 is currently active with respect to the present user and/or device 110 (e.g., music being output by the skill 290, a game being executed by the skill 290, etc.).

The ranker component 590 may output NLU results data 385 including one or more NLU hypotheses. The NLU component 260 may send the NLU results data 385 to the orchestrator 230.

The NLU component 260 sends the NLU results data 385 (discussed below) to the orchestrator 230. The orchestrator 230 may then send a NLU hypothesis to an appropriate skill 290 for processing and execution of a corresponding action. After processing the skill 290 may return to the orchestrator 230 skill output data 310. If called for, the skill output data 310 (or text data portions thereof) may be sent from the orchestrator 230 to a TTS component 280 for purposes of creating output audio data 320 representing synthesized speech (which in turn represents the content of the skill output data 310 which should correspond to a response to the original utterance). The remote system 120 may then cause the output audio data 320 to be returned to device 110 (or to another device) for output of the synthesized speech using the output audio data 320.

The remote system 120 may include one or more skills 290. A skill may be software running on the remote system 120 that is akin to a software application running on a traditional computing device. That is, a skill 290 may enable the remote system 120 to execute user commands involving specific functionality in order to provide data or produce some other requested output. The remote system 120 may be configured with more than one skill 290. For example, a weather skill may enable the remote system 120 to provide weather information, a car service skill may enable the remote system 120 to book a trip with respect to a taxi or ride sharing service, a restaurant skill may enable the remote system 120 to order a pizza with respect to the restaurant's online ordering system, etc. A skill 290 may operate in conjunction between the remote system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the remote system 120, a skill 290 may be implemented by skill support 125. This may enable the skill support 125 to execute specific functionality in order to provide data or perform some other action requested by a user.

Skills 290 may be associated with different domains, such as smart home, music, video, flash briefing, shopping, and custom (e.g., skills not associated with any pre-configured domain).

The remote system 120 may be configured with a single skill 290 dedicated to interacting with more than one skill support 125.

Unless expressly stated otherwise, reference herein to a "skill" may include a skill 290 operated by the remote system 120, the skill support 125, and/or the device 110. Moreover, the functionality described herein as a skill may be referred to using many different terms, such as an action, bot, app, or the like.

Referring again to FIG. 2A, after receiving the NLU results data 385, the orchestrator 230 may send the NLU results data 385 to a skill 290. In some examples, the skill 290 may send the NLU results data 385 to a respective skill support 125. The remote system 120 may communicate with a variety of skills 290. A skill 290 may be configured to execute with respect to NLU results data. For example, for NLU results data including a <GetWeather> intent, a weather skill may determine weather information for a geographic location represented in a user profile or corresponding to a location of the device 110 that captured a corresponding natural language input. For further example, for NLU results data including a <BookRide> intent, a taxi skill may book a requested ride. In another example, for NLU results data including a <BuyPizza> intent, a restaurant skill may place an order for a pizza. The skill support 125 may operate in conjunction between the remote system 120 and other devices, such as the device 110, in order to complete certain functions. Inputs to a skill 290 may come from speech processing interactions or through other interactions or input sources.

A skill 290 may be associated with a domain. A non-limiting list of illustrative domains includes a smart home domain, a music domain, a video domain, a flash briefing domain, a shopping domain, and/or a custom domain.

The remote system 120 may include a TTS component 280. The TTS component 280 may generate audio data (e.g., synthesized speech) from text data using one or more different methods. Text data input to the TTS component 280 may come from a skill 290, the orchestrator 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

Figure 6:
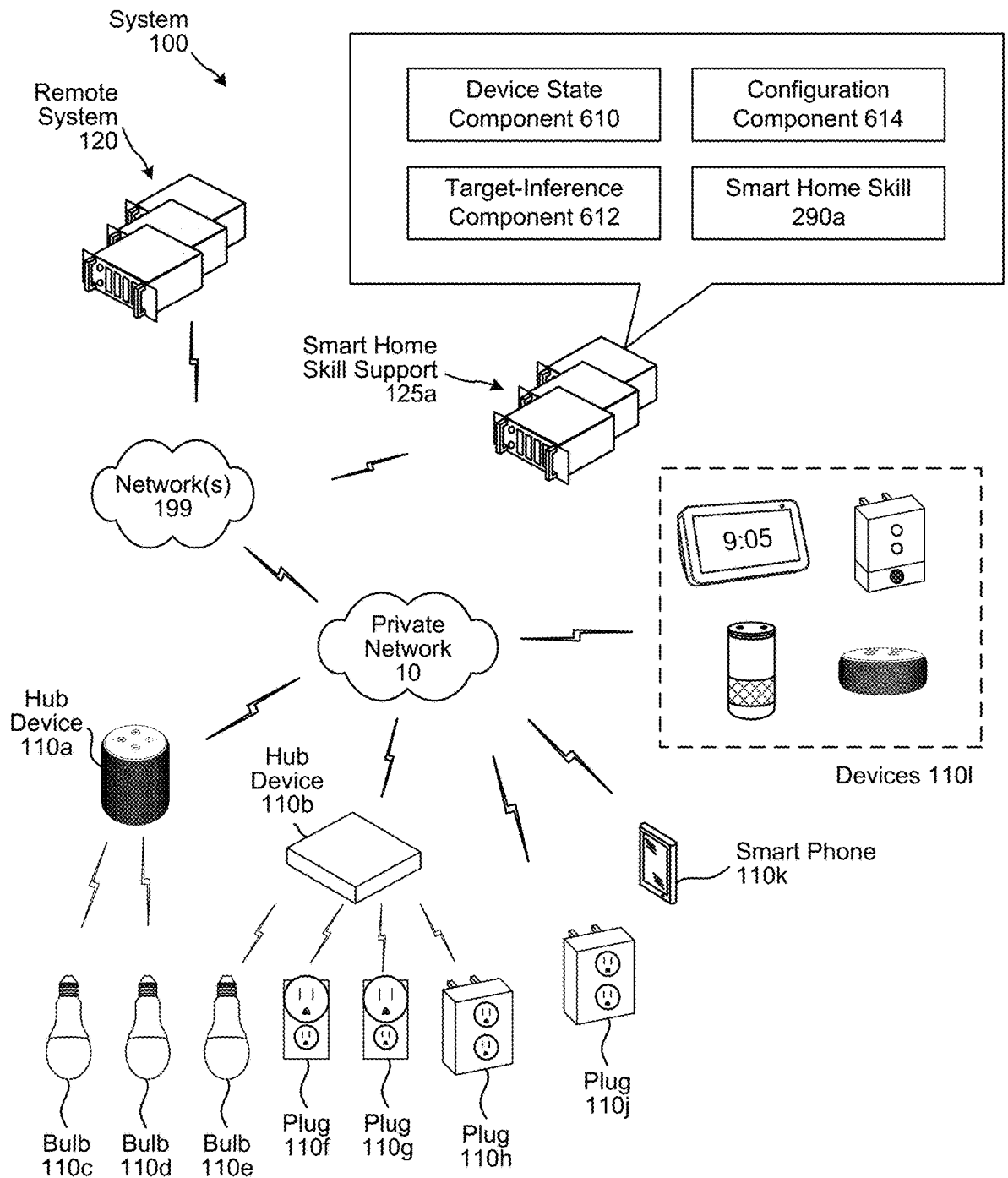
FIG. 6 illustrates a schematic diagram of an example system for a smart home environment according to embodiments of the present disclosure.

FIG. 6 illustrates a schematic diagram of an example system for a smart home environment according to embodiments of the present disclosure. As illustrated in FIG. 6, the system 100 may include the smart home skill support 125a configured to monitor device state data and/or event data associated with a plurality of devices 110. For example, the smart home skill support 125a may receive device state data from and/or send commands to each of the plurality of devices 110, enabling the smart home skill support 125a to remotely control and/or monitor the plurality of devices 110 in a smart home environment. Additionally or alternatively, the smart home skill support 125a may receive event data generated by the plurality of devices 110, enabling the smart home skill support 125a to track activity detected by sensors connected to the plurality of devices 110.

As illustrated in FIG. 6, one or more devices 110 may be connected to a private network 10 associated with an environment of the devices 110 (e.g., home, business, etc.). For example, the devices 110 may communicate with each other using the private network 10, even if the private network 10 is not connected to remote networks (e.g., network(s) 199). In some examples, the devices 110, the remote system 120, and/or the smart home skill support 125a may communicate via the private network 10 and one or more network(s) 199. For example, the remote system 120 may be remote from the devices 110 and the devices 110 may communicate with the remote system 120 via the private network 10 and the network(s) 199. However, while FIG. 6 illustrates the private network 10 being connected to the network(s) 199, such that the devices 110 may communicate with the remote system 120 and/or the smart home skill support 125a via the private network 10 and the network(s) 199, the disclosure is not limited thereto.

Additionally or alternatively, while FIG. 6 illustrates the remote system 120 and/or the smart home skill support 125a being remote from the devices 110 and connected to the private network 10 indirectly via the network(s) 199, the disclosure is not limited thereto. In some examples, the remote system 120 and/or the smart home skill support 125a may be directly connected to the private network 10 without departing from the disclosure. For example, the remote system 120 and/or the smart home skill support 125a may correspond to home servers or other devices associated with the private network 10 without departing from the disclosure.

In some examples, the system 100 may include the remote system 120 and/or one or more on-device language processing devices (e.g., first device 110a(1), illustrated in FIG. 6 as first hub device 110a) configured to enable a voice interface and interpret voice commands, although the disclosure is not limited thereto. For example, some of the devices 110 may be voice-enabled and configured to receive user utterances and perform operations in response to such user utterances. In these examples, the voice-enabled devices 110 may be "hands free" such that interactions with the devices are performed through audible requests and responses.

As described in greater detail above, the system 100 may perform language processing using the remote system 120 and/or the one or more language processing devices 110a. For example, the system 100 may perform remote speech processing (e.g., send audio data via the network(s) 199 to the remote system 120), perform local speech processing (e.g., send audio data via the private network 10 to one of the one or more language processing devices 110a, such as hub device 110a), and/or perform hybrid speech processing (e.g., send audio data to both the remote system 120 and one of the one or more language processing devices 110a).

As illustrated in FIG. 6, some of the devices 110 may be "smart" devices associated with the smart home skill support 125a. In some examples, some of the devices 110 (e.g., smart phone 110k, devices 110l, and smart plug 110j) may be configured to communicate with the smart home skill support 125a directly via the network(s) 199, while other devices 110 (e.g., 110c-110h) may be configured to communicate with the smart home skill support 125a indirectly via hub devices 110a-110b. For example, the smart plug 110j may send data to the smart home skill support 125a via the network(s) 199, whereas the smart plug 110h may send data to a second hub device 110*b* and the second hub device 110*b* may send the data to the smart home skill support 125*a* via the network(s) 199.

The system 100 may also include hub devices 110*a*-110*b*. A hub device may be referred to as a "home controller," gateway and/or other type of "hub," and may assist in controlling associated smart-home devices. In some examples, smart devices may be paired to the hub device, typically by following instructions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device. As illustrated in FIG. 6, the first hub device 110*a* may correspond to a device 110 that is configured to interpret voice commands and perform other functionality while also connecting to one or more devices (e.g., smart bulbs 110*c*-110*d*). In contrast, the second hub device 110*b* may be configured specifically to connect to one or more devices (e.g., smart bulb 110*e*, smart plug 110*f*, smart plug 110*g*, smart plug 110*h*, etc.) without performing additional functionality without departing from the disclosure.

While FIG. 6 illustrates the hub devices 110*a*-110*b* connecting to smart bulbs 110*c*-110*e* and smart plugs 110*f*-110*h*, the disclosure is not limited thereto and the hub devices 110*a*-110*b* may connect to any number of devices 110 without departing from the disclosure.

While not illustrated in FIG. 6, any of the devices 110 may be configured to connect to sensor components that are external to the devices 110, using a wireless connection and/or a wired connection, without departing from the disclosure. Additionally or alternatively, while the smart bulbs 110*c*-110*e* and/or the smart plugs 110*f*-110*j* may not include a traditional sensor component, these devices 110*c*-110*j* may determine a current state (e.g., "ON" or "OFF") and the current state may be considered sensor data without departing from the disclosure. For example, the system 100 may detect that the smart bulb 110*c* switches from a first state (e.g., "OFF") to a second state (e.g., "ON") and use that information to generate event data without departing from the disclosure.

The devices 110 that connect to the hub devices 110*a*-110*b* may be described as "smart" devices, which may have certain computing components and be configured to send and/or receive data from other devices. For example, these smart devices may correspond to light bulbs, plugs, locks, televisions, appliances, doorbells, cameras, etc. These devices 110 may be "paired" or otherwise associated with a voice-enabled device (e.g., devices 110*l*), a hub device (e.g., hub devices 110*a*-110*b*), and/or a user account, although the disclosure is not limited thereto.

The devices 110 may be configured to send data to and/or receive data from the remote system 120 and/or the smart home skill support 125*a* via the network(s) 199. As discussed above, one or more of the components of the system 100 may communicate directly with the remote system 120 and/or the smart home skill support 125*a* via the network(s) 199. However, the disclosure is not limited thereto, and one or more the components of the system 100 may communicate indirectly with the remote system 120 and/or the smart home skill support 125*a* via another device 110, such as the hub devices 110*a*-110*b*. Additionally or alternatively, a personal device, such as a smart phone 110*k*, may communicate directly with the devices 110 and/or the remote system 120 and/or the smart home skill support 125*a* without departing from the disclosure.

The devices 110 may include one or more components, such as, for example, one or more microphones, one or more speakers, one or more displays, one or more cameras, and/or sensor components (e.g., motion sensor, proximity sensor, etc.). The microphones may be configured to capture audio, such as user utterances, and generate corresponding audio data. The speakers may be configured to output audio, such as audio corresponding to audio data received from another device 110, the remote system 120, and/or the smart home skill support 125*a*. The displays may be configured to present images, such as images corresponding to image data received from another device 110, the remote system 120 and/or the smart home skill support 125*a*.

In some examples, the devices 110 may be configured to activate and/or deactivate device functionality components. For example, the smart bulb 110*c* may be a light bulb, and in this example, the device functionality components may include a filament and/or light emitting diode that may produce and/or emit light. Additionally or alternatively, the smart plug 110*f* may be a wall plug, and in this example, the device functionality components may include an "on/off mechanism" for causing electricity to flow or not flow to a device that is plugged in to the wall plug. It should be noted that the device functionality components illustrated here are by way of example only and the disclosure is not limited thereto.

The personal device (e.g., smart phone 110*k*) may include one or more components such as one or more applications residing on memory of the personal device and/or residing elsewhere. The applications may be configured to cause processors of the personal device to display one or more user interfaces associated with operations of the devices 110. The user interfaces may be utilized to receive inputs from the user of the personal device and/or to provide content to the user.

As described in greater detail above, the remote system 120 may include an automatic speech recognition (ASR) component, a natural language understanding (NLU) component, a text-to-speech (TTS) component, and/or the like. Thus, the remote system 120 may be configured to enable a voice interface and perform additional functionality without departing from the disclosure.

As illustrated in FIG. 6, in some examples the smart home skill support 125*a* is located in a remote environment (e.g., separate location) relative to the devices 110 (e.g., not directly connected to the private network 10), such that the device 110 may only communicate with the smart home skill support 125*a* via the network(s) 199. However, the disclosure is not limited thereto, and in other examples the smart home skill support 125*a* may be configured in a local environment (e.g., home server and/or the like), such that the devices 110 may communicate with the smart home skill support 125*a* via the private network 10.

The smart home skill support 125*a* may include a device state component 610, a target-inference component 612, a configuration component 714, and/or a smart home skill 290*a*. Each of the components described herein with respect to the smart home skill support 125*a* may be associated with their own systems, which collectively may be referred to herein as the smart home skill support 125*a*, and/or some or all of the components may be associated with a single system.

The device state component 610 may be configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill support 125a and stored by the device state component 610.

The target-inference component 612 may be configured to determine which of the plurality of devices 110 to operate based at least in part on receiving audio data representing a user utterance from a user 5. For example, a user 5 may speak a user utterance to perform functionality and corresponding audio may be captured by the microphones of one of the devices 110. The device 110 may generate audio data representing the user utterance and may send the audio data to the remote system 120 for speech processing. In some examples, the remote system 120 may attempt to determine which device 110 to operate in light of the user utterance. For example, the user utterance may include "turn on study light." The ASR component 250 may generate text data corresponding to the audio data and the NLU component 260 may generate intent data indicating that the user utterance is associated with a "turn on" intent and that the device to be acted on has a naming indicator of "study light." In these examples, the smart home skill support 125a may be designated as a component that may handle and/or otherwise perform operations corresponding to a "turn on" intent. The remote system 120 may communicate the intent data and/or other data to the smart home skill support 125a using the smart home skill 290a. The smart home skill 290a may attempt to identify the device 110 to be operated using the data received from the remote system 120 and/or from one or more other components, such as an internet-of-things component.

The user 5, the remote system 120, the smart home skill support 125a, and/or a third-party system may have given naming indicators to the devices 110 associated with the user profile associated with the user 5. However, in this example, none of the naming indicators may be "study light" and/or multiple naming indicators may correspond to "study light." Therefore, the target-inference component 612 of the smart home skill support 125a may perform target inference operations to identify which of the multiple devices 110 is most likely to be the "study light." The target inference operations may include determining which device is most likely in the "on" state at the time the audio data was received by the remote system 120. For example, the target-inference component 612 may determine that 1% of the devices 110 associated with a first device with the naming indicator of "kitchen light" are in the "unlocked" state. The target-inference component 612 may further determine that 50% of the devices 110 associated with a second device with the naming indicator of "bedroom light" are in the "unlocked" state. The target-inference component 612 may further determine that 97% of the devices 110 associated with a third device with the naming indicator of "office light" are in the "on" state. Based at least in part on this analysis, the target-inference component 612 may determine that the third device is most likely the device that the user desires to operate.

Additionally or alternatively, the state prediction operations described herein may be utilized when configuring a device 110 for scheduled state changes. For example, a user 5 may desire to set a schedule for a device 110 to be activated and deactivated during, for example, a given day. While the user 5 may manually set such a schedule, the user 5 may additionally, or alternatively, desire to automatically set a schedule based on typical usage patterns for devices like the selected device. To do so, the configuration component 714 may determine when state changes generally occur for a subset of the devices 110 that are similar to the selected device. Scheduling data indicating the schedule of such state changes may be generated and a recommendation indicating the schedule may be sent to the device 110 and/or the personal device associated with the user 5 to configure the selected device for scheduled state changes utilizing the schedule. Based at least in part on receiving input data representing an acceptance of the recommendation, the configuration component 714 may configure the selected device using the schedule.

Additionally, or alternatively, the state prediction operations described herein may be utilized to determine which devices to transition states at a given time and/or in response to a user request. For example, a user may speak a "good night" or "good morning" user utterance to one of the device 110 configured to be voice enabled. In other examples, the user may provide input to a personal device (e.g., smart phone 110k) that corresponds to a "good night" or "good morning" request. In these examples, the user utterance may be associated with an intent to operate one or more devices 110 that a user would typically operate when they are going to bed and/or getting up for the morning. For example, when going to bed, the user 5 may desire to lock the doors, turn off certain lights, turn on other lights, adjust thermostat temperatures, etc. The state prediction operations described herein may be utilized to determine which of the devices 110 to operate when a user command such as those described with respect to these examples is received.

Additionally, or alternatively, the state prediction operations described herein may be utilized to determine which devices 110 to operate and/or not operate when a user is not present in a space with the devices 110. For example, the remote system 120, the smart home skill support 125a, and/or the device 110 may determine that a user is not present in the space. This determination may be made, for example, by determining that audio has not been received at the microphones of the device 110 and/or audio is received below a threshold amount and/or a threshold intensity. Additionally, or alternatively, the determination may be made based at least in part on image data representing one or more images of the space not depicting a user. Additionally, or alternatively, the determination may be made based at least in part on a signal not being received from a personal device (e.g., smart phone 110k) associated with the user. In examples where it is determined that a user is not present in the space, devices 110 may be activated based at least in part on their predicted state. Additionally, or alternatively, devices 110 may restricted from activation during this time period, which may prevent such devices from being activated when not desired.

The smart home skill 290a described herein may include a speech-enabled web component that may run in the remote system 120 and/or the smart home skill support 125a. Skill(s) may receive and respond to user-initiated requests. Skill(s) may define life-cycle events for a skill as experienced by a user, a way to process requests from the user, and/or call-backs from events happening on the device the user is interacting with. Given skill(s) may be capable of handling certain intents. For example, the NLU component 260 may generate intent data that indicates an intent as well as a payload associated with the intent. A skill may be associated with the intent, and thus the intent data, including the payload may be sent to and received by the skill. The skill may process that intent by analyzing the payload and generating data representing a directive and/or instruction to perform an action. The directive and/or instruction may be sent to other components of the system for performance of the action.

After processing a user request and generating the directive, the remote system 120 and/or the smart home skill support 125a may publish (i.e., write) some or all of this information to an event bus. That is, the remote system and/or the smart home skill support 125a may provide information regarding the initial request (e.g., the speech, the text, the domain/intent, etc.), the response to be provided to a device 110, or any other information pertinent to the interaction between the device 110 and the remote system 120 and/or the smart home skill support 125a to the event bus.

Within the remote system 120 and/or the smart home skill support 125a, one or more components or services may subscribe to the event bus so as to receive information regarding interactions between the devices 110 and the user 5. For example, the smart home skill support 125a may subscribe to the event bus and, thus, may monitor information regarding these interactions. In some examples, monitoring information in the event bus may comprise messages between various components of the remote system 120 and/or the smart home skill support 125a. For example, the device state component 610 may monitor the event bus to identify device state data for the devices 110. In some examples, the event bus may "push" or send indications of events and/or device state data to one or more components and/or devices 110. For example, the event bus may send indications of events and/or device state data to the smart phone 110k and/or the smart home skill support 125a. Additionally, or alternatively, the event bus may be "pulled" where a component sends requests to the event bus to provide an indication of device state data for a particular device 110.

The event bus may store indications of the device states for the devices, such as in a database (e.g., profile storage 275, event database associated with the smart home skill support 125a, etc.), and using the stored indications of the device states, send the device state data for the devices 110 to the remote system 120 and/or the smart home skill support 125a. Thus, to identify device state data for a device 110, a component may send a request to the event bus (e.g., event component) to provide an indication of the device state data associated with a device 110, and receive, from the event bus, the device state data that was requested.

In some examples, the remote system 120 and/or the smart home skill support 125a may monitor information published to the event bus and identify events that may trigger action. For example, the remote system 120 and/or the smart home skill support 125a may identify (e.g., via filtering) those events that: (i) come from voice-enabled devices that are associated with secondary device(s) (e.g., have secondary devices 110b in their environments such as televisions, personal computing devices, accessory devices, etc.), and (ii) are associated with supplemental content (e.g., image data, video data, etc.). The remote system 120 and/or the smart home skill support 125a may reference a user registry to determine which voice-enabled devices are associated with secondary devices 110b, as well as determine device types, states, and other capabilities of these secondary devices 110b. For example, the remote system 120 and/or the smart home skill support 125a may determine, from the information published to the event bus, an identifier associated with the voice-enabled device making the corresponding request or the voice-enabled device selected to respond to or act upon the user utterance. The remote system 120 and/or the smart home skill support 125a may use this identifier to identify, from the user registry, a user profile associated with the voice-enabled device and/or determine whether any secondary devices 110b have been registered with the identified user profile, as well as capabilities of any such secondary devices 110b, such as how the secondary devices 110b are configured to communicate (e.g., via WiFi, short-range wireless connections, etc.), the type of content the devices are able to output (e.g., audio, video, still images, flashing lights, etc.), and the like.

The remote system 120 and/or the smart home skill support 125a may determine whether a particular event identified is associated with supplemental content. That is, the remote system 120 and/or the smart home skill support 125a may write, to a datastore, indications of which types of events and/or which primary content or responses are associated with supplemental content. In some examples, the remote system 120 and/or the smart home skill support 125a may provide access to third-party developers to allow the developers to register supplemental content for output on secondary devices 110b for particular events and/or primary content. For example, if a voice-enabled device is to output that the weather will include thunder and lightning, the remote system 120 and/or the smart home skill support 125a may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device 110b to the audio session. In these and other examples, the remote system 120 and/or the smart home skill support 125a may store an association between the primary response or content (e.g., outputting of information regarding the world's largest mammal) and corresponding supplemental content (e.g., the audio data, image data, or the like). In some examples, the remote system 120 and/or the smart home skill support 125a may also indicate which types of secondary devices 110b are to output which supplemental content. For example, the remote system 120 and/or the smart home skill support 125a may store an indication that secondary devices 110b of a class type "tablet" are to output a picture of a blue whale. In these and other examples, meanwhile, the remote system 120 and/or the smart home skill support 125a may store the supplemental content in association with secondary-device capabilities (e.g., devices with speakers output the audio commentary, devices with screens output the image, etc.).

The remote system 120 and/or the smart home skill support 125a may also determine how to transmit response and/or supplement content (and/or information acquiring the content) to the devices 110 (e.g., voice-enabled devices and/or the secondary devices 110b). To make this determination, the remote system 120 and/or the smart home skill support 125a may determine a device type of the voice-enabled devices and/or secondary devices 110b, capabilities of the device(s), or the like, potentially as stored in the user registry. In some examples, the remote system 120 and/or the smart home skill support 125a may determine that a particular device is able to communicate directly and may provide the response and/or content directly over the network(s) 199 to the secondary device 110b (potentially via the remote system 120). In another example, the remote system 120 and/or the smart home skill support 125a may determine that a particular secondary device 110b is unable to communicate directly with the remote system 120 and/or the smart home skill support 125a, but instead is configured to communicate with a hub device 110a-110b in its space over short-range wireless networks. As such, the remote system 120 and/or the smart home skill support 125a may send the supplement content (or information) to the hub device 110a/110b, which may send the information over a short-range network to the secondary device.

The remote system 120 and/or the smart home skill support 125a may include the user registry (e.g., profile storage 275, database associated with the smart home skill support 125a, etc.) that includes data regarding user profiles as described herein. The user registry may be located part of, or proximate to, the remote system 120 and/or the smart home skill support 125a, although the disclosure is not limited thereto and the user registry may be separate and may communicate with the remote system 120 and/or the smart home skill support 125a via the network(s) 199 without departing from the disclosure.

The user registry may include a variety of information related to individual users, user profiles, accounts, etc., that interact with the devices 110, the remote system 120, and/or the smart home skill support 125a. For example, the user registry may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry may store indications of associations between various devices 110 (e.g., between voice-enabled devices and/or secondary device), such as virtual clusters of devices, states of devices, and associations between devices and audio-session queues. The user registry may represent clusters of devices as single devices that can receive commands and disperse the commands to each device and/or to the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the smart home skill 290a and/or other skills 290 may determine, based on the stored device states in the user registry, a current device state of the devices 110. Rather than receiving device states for the voice-enabled devices, in metadata, the device states may already have been determined or received and stored in the user registry. Further, the user registry may provide indications of various permission levels depending on the user. As an example, the remote system 120 may perform speaker recognition on audio signals to determine an identity of the speaker. If the speaker is a child, for example, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus may publish different events which indicate device states to various entities or components that subscribe to the event bus. For example, if an event of "turn on office lights" occurs for a voice-enabled device, the event bus may publish the indication of this event, and thus the device state of the voice-enabled device from which the audio data was received may be determined. Thus, various components may be provided with indications of the various device states via the event bus. The event bus may further store and/or update device states for the devices 110 in the user registry. The components of the remote system 120 and/or the smart home skill support 125a may query the user registry to determine device states.

A particular user profile may include a variety of data that may be used by the remote system 120 and/or the smart home skill support 125a. For example, a user profile may include information about what device(s) 110 are associated with the user and/or user profile. The user profile may further indicate an IP address for each of the devices 110 associated with the user and/or user profile, user IDs for the devices 110, indications of the types of devices, and current device states for the devices.

The user registry component may be configured to identify, determine, and/or generate associations between users, user accounts, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between the devices 110. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores may be configured to identify, determine, and/or generate data associated with use of the devices 110. Usage data may be identified, determined, and/or generated that indicates some or each of these interactions. Timing data may also be identified, determined, and/or generated that indicates a time at which some or each of these interactions took place. Device-state data, and/or other usage data may also be identified, determined, and/or generated. In some examples, the user registry and the data stores may be separate components, although the disclosure is not limited thereto and in other examples the user registry and the data stores may be a single component. In other examples, the data stores may be operated and/or maintained by a third-party system other than the remote system 120 and/or the smart home skill support 125a, and the remote system 120 and/or the smart home skill support 125a may have access to the data stores.

As described above, the smart home skill support 125a may include a device state component 610 configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill support 125a and stored by the device state component 610.

In some examples, the smart home skill support 125a may store information about the device and/or the device state in a device registry 710. For example, the device registry 710 may be configured to store the state data as well as identifying information associated with each of the devices 110, although the disclosure is not limited thereto.

Figure 7:
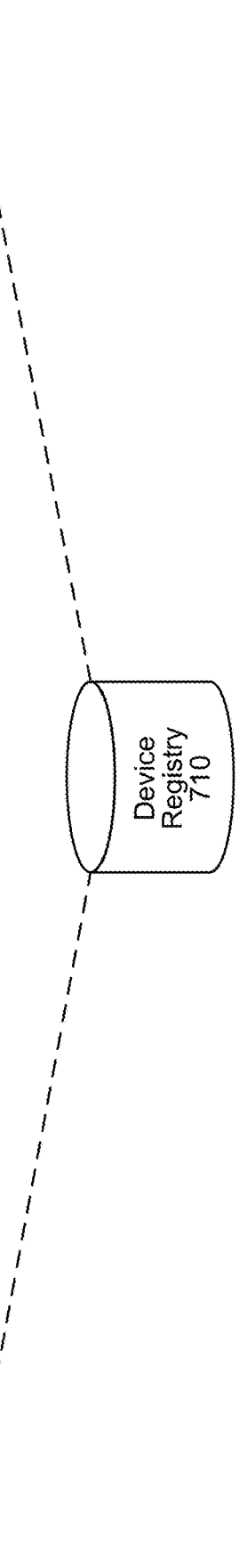
FIG. 7 illustrates an example of information included in a device registry.

FIG. 7 illustrates an example of information included in a device registry. As illustrated in FIG. 7, the device registry 710 may include an entry for each of the devices 110 associated with an account. In the example illustrated in FIG. 7, each entry may indicate a customer profile (e.g., customer identification), which may correspond to a user profile (e.g., individual user) or the overall account, device identification (ID) (e.g., unique device identifier), an Internet Protocol (IP) address associated with the device, a device name, one or more qualifiers (e.g., indicating a location or other attributes of the device), a device state (e.g., outputting audio, idle, etc.), and/or the like. However, the disclosure is not limited thereto and the device registry 710 may include any information known to one of skill in the art without departing from the disclosure.

While the device registry 710 may include multiple columns of information, an individual entry in the device registry 710 may lack information for one or more columns of information without departing from the disclosure. To illustrate an example, some devices may not be associated with an IP address without departing from the disclosure. For example, one or more devices (e.g., sensor device or component, although the disclosure is not limited thereto) may connect to the remote system 120 via a wireless connection to a hub device or a wired connection to another device 110 and may therefore not be associated with an individual IP address. Additionally or alternatively, the device registry 710 may indicate the IP address of the hub device for each of the one or more devices without departing from the disclosure.

Figure 8:
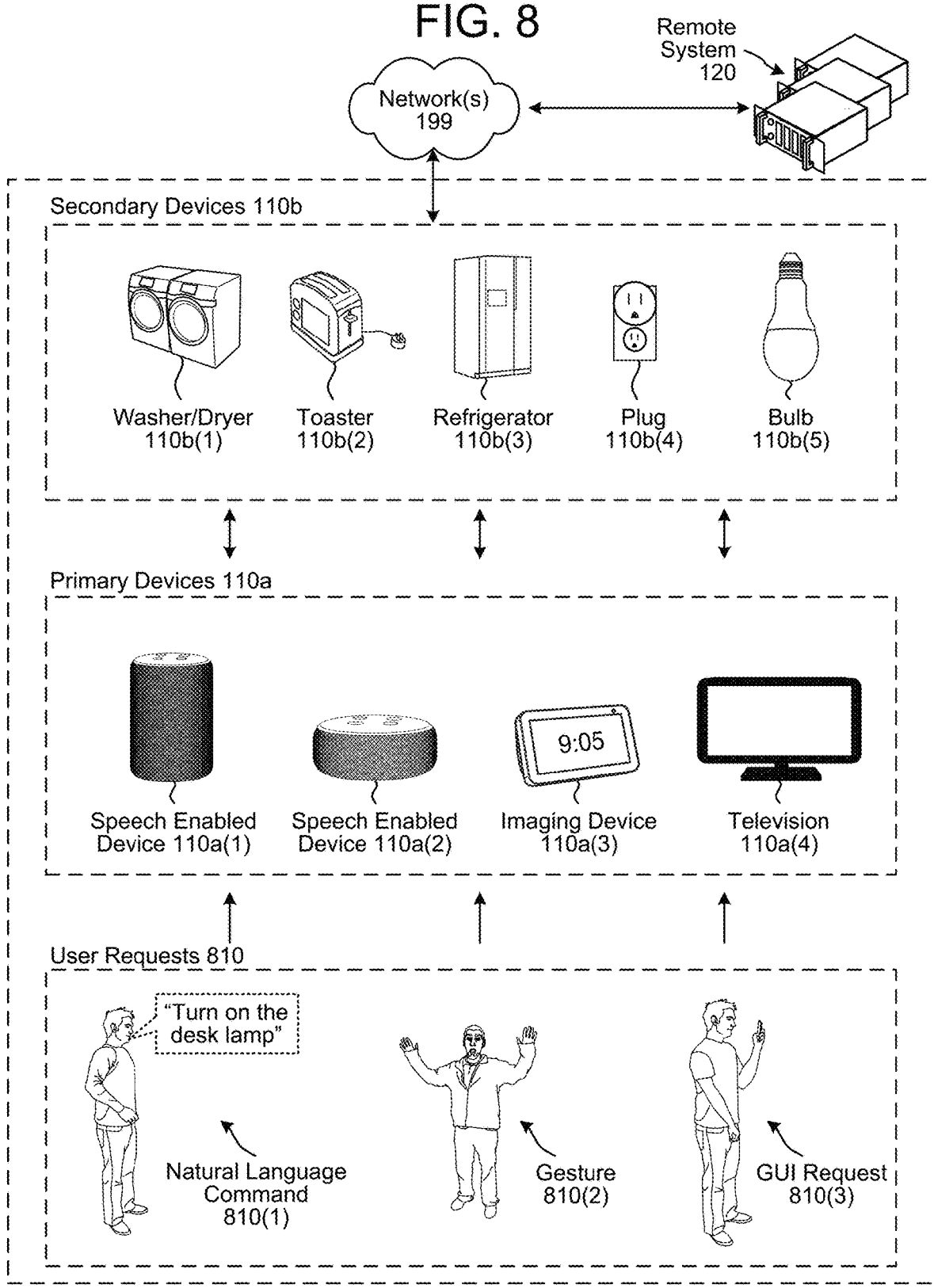
FIG. 8 illustrates examples of user requests that can be processed by primary devices to control primary devices and secondary devices according to embodiments of the present disclosure.

FIG. 8 illustrates examples of user requests that can be processed by primary devices to control primary devices and secondary devices according to embodiments of the present disclosure. Techniques for controlling secondary devices (or "smart appliances") are described herein. For example, one or more secondary devices 110b may reside within an environment, along with one or more primary devices 110a that communicatively couple with the secondary devices 110b and are configured to control the secondary devices 110b. To do so, the primary devices 110a may be configured to send control signals to the secondary devices 110b causing the secondary devices to perform certain operations. For example, a user 5 in the environment may provide, to one of the primary devices 110a, user requests 810 requesting that one of the secondary devices 110b perform a certain operation. The primary device 110a may then send the request to perform the operation directly or indirectly to the secondary device 110b, as described below. Upon receiving a command to perform the operation, the secondary device 110b may perform the operation.

The secondary devices 110b may comprise lights, televisions, audio systems, door locks, garage door openers, washing machines, dryers, dishwashers, coffee makers, refrigerators, doors, automated window shades, tablets, telephones, or the like. That is, the secondary devices may comprise any type of "home-automation" device configured to communicate wired or wirelessly with a controlling primary device 110a. The primary devices 110a (e.g., controlling devices), meanwhile, may comprise speech enabled devices (e.g., voice-controlled devices), imaging devices, tablet computing devices, televisions, mobile phones, or the like. In some examples, servers (e.g., remote system 120) that are remote from the environment of the secondary devices 110b may also be configured to control one or more secondary devices 110b within the environment.

Traditional home-automation systems utilize a single hub for controlling secondary devices 110b within a home. The disclosure is not limited thereto, however, and the system 100 may utilize multiple hubs within the environment and/or located remotely from the environment. For example, an environment may include multiple primary devices 110a, each configured to control one or more secondary devices 110b within the environment. In addition, the remote system 120 may be configured to control one or more secondary devices 110b within the environment. As such, each primary device 110a may store and executes an instance of a control engine, rather than relying on a single instance of a control engine located at a single controlling hub.

Utilizing multiple "hubs" has many benefits. First, because different primary devices 110a are able to communicate via different wired or wireless protocols, utilizing multiple primary devices 110a as hubs may expand the number of secondary devices 110b that the home-automation system is collectively able to control. For example, secondary devices 110b may communicate via an array of wireless protocols, such as via Bluetooth®, ZigBee®, Z-Wave®, TCP/IP, Thread®, HomeKit®, and the like. However, not all primary devices 110a may be configured to communicate via each of these protocols. As such, by utilizing multiple primary devices 110a as home-automation hubs, the collective capabilities of all of the primary devices 110a may be increased, thus increasing the amount of secondary devices 110b within an environment that the home-automation system is able to control.

In addition, by distributing instances of a control engine across multiple primary devices 110a (or "home-automation hubs"), the resulting system includes redundancy. Therefore, if one primary device 110a hosting an instance of the control engine goes down, one or more other hubs may still allow the home-automation system to continue functioning.

Next, by providing instances of a control engine on primary devices 110a located within the local environment of the secondary devices 110b being controlled, the described techniques may reduce latency and increase efficacy of the system. That is, traditional home-automation systems may require user requests to modify state of secondary devices 110b be sent to and processed "in the cloud" (i.e., remote from the environment, such as the remote system 120), while the techniques described herein allow local instances of a control engine to handle these requests. Therefore, the system continues to function even if a network connection between the environment and a remote system 120 is lost (e.g., a user's home or office Internet is down). In addition, the system is able to execute a user's command without the need to interact with the remote system 120 over the network(s) 199, thus reducing the latency associated with the request. Further, and as described below, the system may route user requests amongst multiple local primary devices 110a, thus again reducing latency associated with making calls to the remote system 120.

While the system may include local instance(s) of a control engine as discussed immediately above, in some examples the system may also include an instance of the control engine executing at a remote system 120. Therefore, the system still allows for control of secondary devices 110b outside of the environment, via communication with the remote system 120 over the network(s) 199. For example, a user may utilize an application on his mobile device configured to communicate with the remote system 120, which in turn communicates with secondary devices 110b in the environment. As such, the user may be able to check the state of secondary devices 110b in his home or office (e.g., "did I leave the lights on?") and may also be able to control states of the secondary devices 110b (e.g., may be able to turn off the lights from his mobile device).

As introduced above, multiple primary devices 110a within an environment may store and execute an instance of a control engine that is configured to control secondary devices 110b within the environment. Within this architecture, a primary device 110a may be responsible for controlling one or more secondary devices 110b within the environment, although the disclosure is not limited thereto and some primary devices 110a may not be responsible for any secondary devices 110b without departing from the disclosure. For example, a first primary device 110a(1) may be responsible for controlling the downstairs lights and the downstairs television, a second primary device 110a(2) may be responsible for controlling door locks in the environment, while a third primary device 110a(3) may be responsible for controlling the upstairs lights and the thermostat within the environment.

A user 5 may input a user request 810 to change a state (i.e., perform an operation) of a secondary device 110b within the environment in a number of ways. For example, the user may issue this request via a voice command (e.g., natural language command 810(1)), a gesture 810(2), a graphical user interface (GUI) (e.g., GUI request 810(3)), and/or the like. When a primary device 110a within the environment receives the request, the primary device 110a may initially identify the operation being requested and the secondary device 110b being referenced. For example, if a user issues a request to turn on a particular light, the primary device 110a (or another entity) may identify the light that the user is referencing and may identify the requested operation (turn on). After doing so, the primary device 110a may determine which primary device 110a within the environment is responsible for controlling the particular light. That is, each instance of the control engine may maintain an up-to-date listing of which primary devices 110a are responsible for (or "own") each secondary device 110b within the environment, although the disclosure is not limited thereto. After identifying the responsible primary device 110a, the primary device 110a that received the initial request may route this request to the responsible primary device 110a.

Upon the responsible primary device 110a receiving the request, it may also identify the requested operation and the referenced secondary device. After identifying this information, the primary device 110a may issue a command to the secondary device 110b to change its state in accordance with the request. To do so, in some examples the primary device 110a may execute, locally, a secondary-device driver associated with the secondary device. In other examples, meanwhile, the primary device 110a may work with the remote system 120, which executes, remotely, the secondary-device driver for generating a command to perform the operation (i.e., changing state). In either instance, upon receiving the command to change its state, the secondary device 110b may execute the command and correspondingly change state. For example, in the example discussed above, the particular light may turn on, in accordance with the user's request. The secondary device 110b may also send an indication back to the controlling primary device 110a indicating that the secondary device 110b has successfully turned on.

In response to receiving an indication of this success, the responsible primary device 110a may broadcast this information out to each other instance of the control engine. That is, the primary device 110a may send this information to other devices within the environment responsible for controlling one or more secondary devices 110b, as well as to the remote system 120 executing the instance of the control engine. As discussed in further detail below, each instance may maintain a current state of each secondary device 110b within the environment. Therefore, in response to receiving this information, each instance may update the state associated with the particular light.

In other examples, meanwhile, primary devices 110a may subscribe to receive information regarding particular secondary devices 110b. For example, if the environment includes five devices in addition to the responsible device from the example above, two (as a non-limiting example) may subscribe to receive state-update information regarding state changes of the particular light. Upon the responsible device receiving an indication from the light that it has successfully turned on, the responsible device may update its stored information regarding the state of the light (from OFF to ON) and may identify the devices that have subscribed to receiving state-update information about the light. The responsible device may then send this updated state information to the subscribing devices, while refraining from sending this information to other devices that have not subscribed to receive information regarding the particular light.

In still other examples, devices (or control engines stored on the devices) may subscribe to individual controlling devices (or "hubs") rather than the individual secondary devices 110b. That is, a first device may subscribe to receive all updated state information from a second device, regardless of the secondary device 110b to which the state information pertains. As such, whenever the second device successfully changes state of a secondary device 110b that it is responsible for, it may send an indication of this updated state to the first device.

FIG. 8 is a schematic diagram of an illustrative environment that includes primary devices 110a configured to control different secondary devices 110b within the environment. As illustrated, these secondary devices 110b may include lights, thermostats, window blinds, audio systems, refrigerators, door locks, and the like. In some examples, users, such as the user 5, may send requests (e.g., user requests 810) to change states of these secondary devices 110b to these primary devices 110a, which may in turn cause the secondary devices 110b to change their states in accordance with the user requests 810. It is noted that in some examples, a device within the environment may both be a primary device 110a, by controlling one or more secondary devices 110b, and may also function as a secondary device 110b, by performing one or more operations within the environment.

As introduced above and described in further detail below, each of the primary devices 110a may store and execute an instance of a control engine for communicating with and controlling one or more of the secondary devices 110b. In addition, a remote system 120 may store and execute an instance of the control engine, and may interact with and control the secondary devices 110b over the network(s) 199. The network(s) 199 may represent an array or wired networks, wireless networks (e.g., WiFi), or combinations thereof. While not illustrated in FIG. 8, the primary devices 110a and the secondary devices 110b may communicate via the private network 10, as described in greater detail above with regard to FIGS. 1 and 6.

The remote system 120 may generally refer to a network-accessible platform—or "cloud-based service"—implemented as a computing infrastructure of processors, storage, software, data access, and so forth that is maintained and accessible via the network(s) 199, such as the Internet. Cloud-based services may not require end-user knowledge of the physical location and configuration of the system that delivers the services. Common expressions associated with cloud-based services, such as the remote system 120, include "on-demand computing", "software as a service (SaaS)", "platform computing", "network accessible platform", and so forth.

When a secondary device 110b is introduced in the environment, or when a secondary device 110b is disconnected from one of the primary devices 110a that is responsible for controlling the secondary device, one or more instances of the control engines executing on the primary devices 110a may detect the presence of the secondary device 110b via one or more wireless protocols. For example, when the user 5 installs a "smart light bulb" or "smart door lock" within the environment, this secondary device 110b may broadcast its presence, which may be detected by one or more of the primary devices 110a. In response to detecting a new secondary device, the instance of the control engine operating on the respective primary device 110a may store an indication that it is now responsible for controlling this secondary device 110b 110b (i.e., that it is now the "owner" of the secondary device) and may broadcast this information to each other hub (i.e., each of the primary devices 110a and remote system 120 executing a control-engine instance). In response, each control-engine instance may store an indication indicating that the primary device 110a that broadcast the message is now responsible for the identified secondary device. In other examples, the control-engine instance that assumed control of the secondary device 110b may only send an indication that it is responsible for the secondary device 110b to those devices that have subscribed. In still other examples, the control-engine instance that assumed control of the secondary device 110b may only send an indication that it is responsible for the secondary device 110b when queried by other devices.

In some examples, more than one of the primary devices 110a may attempt to claim ownership of a secondary device 110b. In these examples, a conflict-resolution process may be employed. For example, each control engine instance may be programmed such that a primary device 110a having a smallest device identification number may be deemed the owner of a secondary device 110b if two or more primary devices 110a attempt to claim ownership of a single secondary device 110b. Of course, while one example conflict-resolution process is described, it is to be appreciated that multiple other processes may be employed.

After a primary device 110a has claimed responsibility for controlling a particular secondary device 110b, that secondary device 110b may now be controlled within the environment through the primary devices 110a and/or the remote system 120. For example, FIG. 8 illustrates the following primary devices 110a: a first speech-enabled device 110a(1) that includes a microphone and is controllable via voice commands, a second speech-enabled device 110a(2) that includes a microphone and is controllable via voice commands, an imaging device 110a(3) that includes a camera and is controllable via gestures, a television 110a(4) that may be controllable via voice commands, gestures, or the like. While a few examples of primary devices 110a have been listed, it is to be appreciated that the primary devices 110a may include tablet computers, desktop computers, wearable devices, or any other type of computing device. In an example, envision that the television 110a(4) initially detected the presence of a smart bulb 110b(5) within the environment and, hence, claimed ownership of the smart bulb 110b(5) and broadcast (i.e., sent a message) to the other primary devices 110a and the remote system 120 indicating this ownership. As such, each instance of the control engine executing on the primary devices 110a and the remote system 120 may store an indication indicating that the television 110a(4) is responsible for controlling the smart bulb 110b(5).

Thereafter, envision that the user 5 issues, to the speech-enabled device 110a(1), a voice command 810(1) to turn on the smart bulb 110b(5). In response, the speech-enabled device 110a(1) may generate an audio signal including this voice command and either perform speech recognition on the audio signal to identify the command or send this audio signal to another entity, such as the remote system 120, for performing speech-recognition thereon and identifying the voice command.

After the speech-enabled device 110a(1) identifies the voice command, the device 110a(1) may identify the requested operation and the referenced secondary device 110b (the smart bulb 110b(5)). After doing so, the speech-enabled device 110a(1) may determine, from its memory maintaining the owners of each of the secondary devices 110b within the environment, that the television 110a(4) is responsible for controlling the smart bulb 110b(5). As such, the speech-enabled device 110a(1) may pass this request to the television 110b(1). In response, the television 110b(1) may issue a command or work with the remote system 120 to issue a command for causing the smart bulb 110b(5) to turn on. Upon receiving such a command, the smart bulb 110b(5) may turn on, complying with the user's initial request 810(1). In some examples, such as where the remote system 120 performs the speech-recognition on the audio signal to identify the voice command, the remote system 120 may pass the request to the television 110a(4) rather than the speech-enabled device 110a(1) passing this request.

While the above example describes the user 5 issuing the voice command 810(1) to ultimately control the smart bulb 110b(5), this request may take other forms. For example, the user may perform user gestures 810(2), which may be identified by the imaging device 110a(2) or other devices that include a camera, to control the secondary devices 110b. Additionally or alternatively, the user may utilize a graphical user interface (GUI) on a device to issue GUI requests 810(3) for controlling the secondary devices 110b.

Within the environment, each of the secondary devices 110b may be owned by one of the controlling primary devices 110a. Further, each of the primary devices 110a may store and locally execute an instance of a control engine for controlling the secondary devices 110b that it controls, while also storing indications of the current state of all secondary devices 110b within the environment and indications of which primary devices 110a own which secondary devices 110b. Therefore, the architecture described in FIG. 8 allows the primary devices 110a to route the user requests 810 to change the state of the secondary devices 110b to the appropriate primary devices 110a, and potentially to the remote system 120 when appropriate. Further, the architecture allows for redundancy by providing multiple control hubs, rather than a centralized hub.

Figure 9:
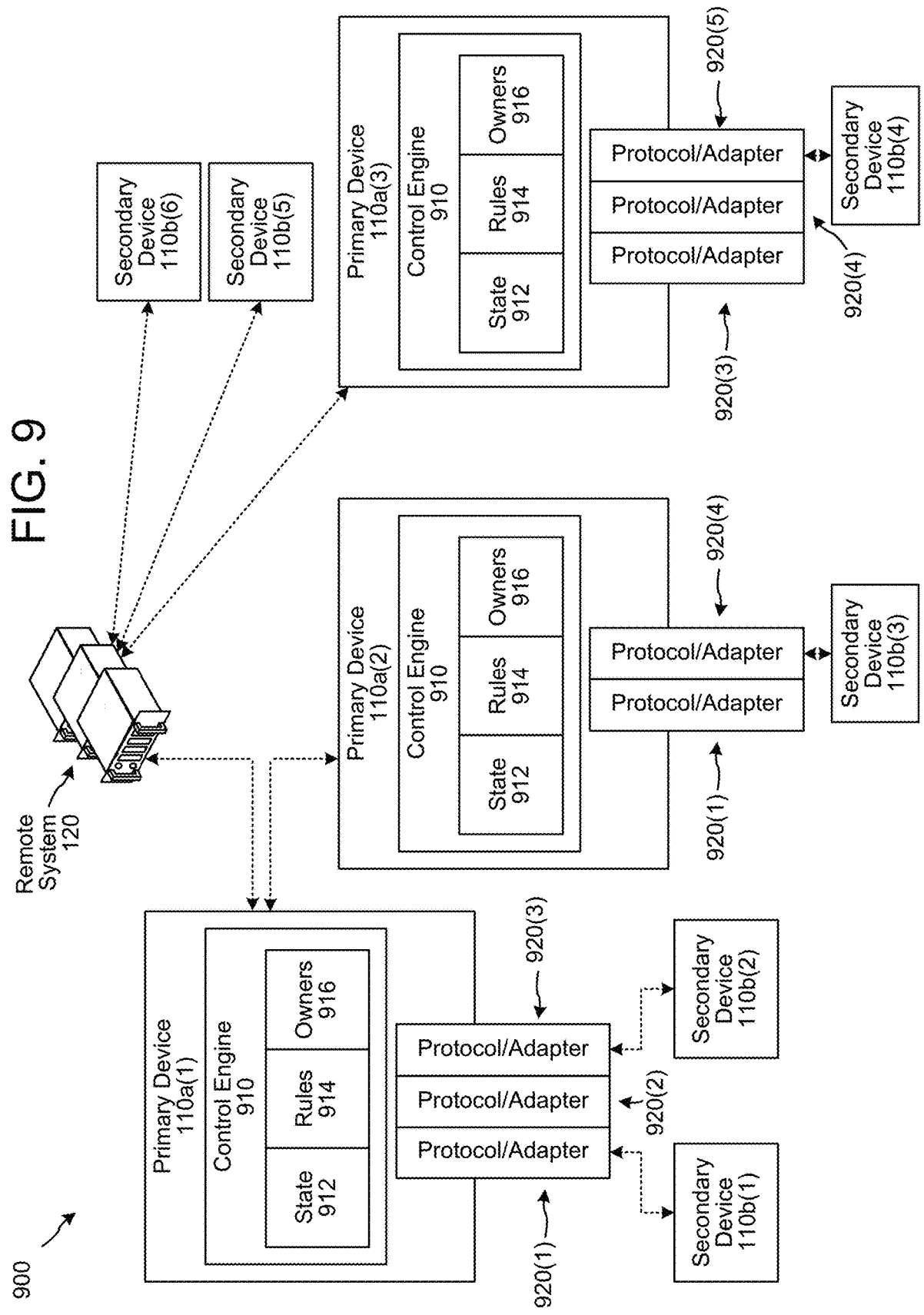
FIG. 9 illustrates an example of an organization of primary devices and secondary devices within an environment according to embodiments of the present disclosure.

FIG. 9 illustrates an example of an organization of primary devices 110a and secondary devices 110b within an environment according to embodiments of the present disclosure. As illustrated, each primary device 110a(1), 110a(2), . . . , 110a(N) that controls one or more secondary devices 110b includes a respective instance of a control engine 910(1), 910(2), . . . 910(N). Each of these control engines 910 represents a home-automation hub that may control one or more secondary devices 110b within the environment. In addition, the remote system 120 may also store an instance of the control engine 910, although not illustrated in FIG. 9.

FIG. 9 further illustrates that each of the controlling primary devices 110a may be associated with one or more protocols and protocol adapters, each enabling the respective device 110a to communicate via a respective protocol. For example, these devices may be able to communicate via TCP/IP, Bluetooth®, ZigBee®, Z-Wave®, and/or the like. As such, each respective primary device 110a may be configured with one or more respective protocol stacks (e.g., a protocol stack corresponding to Bluetooth®) and one or more corresponding protocol adapters to allow the respective primary device 110a to communicate with a secondary device 110b via the protocol (e.g., Bluetooth®).

In this example, the first primary device 110a(1) includes protocol stacks and protocol adapters 920(1), 920(2), and 920(3), while the second primary device 110a(2) includes protocol stacks and protocol adapters 920(1) and 920(4), and the third primary device 110a(N) includes protocol stacks and protocol adaptors 920(3), 920(4), and 920(5). As illustrated, the first primary device 110a(1) may be configured to communicate with a first secondary device 110b(1) via the protocol and protocol adapter 920(1) and with a second secondary device 110b(2) via the protocol and protocol adapter 920(3). That is, the first primary device 110a(1) may be responsible for controlling the secondary devices 110b(1) and 110b(2), and may communicate with these secondary devices 110b via the protocols supported by the protocols stacks/protocol adapters 920(1) and 920(3), respectively.

The second primary device 110a(2), meanwhile, may be responsible for controlling a third secondary device 110b(3) and may communicate with this secondary device 110b(3) via the protocol stack and adapter 920(4). The third primary device 110a(3) may be responsible for controlling a fourth secondary device 110b(4) via the protocol stack and adapter 920(5). Finally, the remote system 120 may be responsible for controlling (i.e., may be the owner of) a fifth secondary device 110b(5) and a sixth secondary device 110b(6).

FIG. 9 further illustrates details regarding each instance of a control engine 910. As illustrated, the control engines 910(1), 910(2), 910(N) may include, respectively, a state database 912(1), 912(2), 912(3), a rules database 914(1), 914(2), 914(3), and an owners database 916(1), 916(2), 916(3). The owners databases 916 may maintain a current listing of which of the primary devices 110a or the remote system 120 currently owns which of the secondary devices 110b. As discussed above, when one of the primary devices 110a or the remote system 120 claims responsibility for controlling a particular secondary device, that primary device 110a may broadcast out this ownership. In response, each other primary device 110a and the remote system 120 may update is owner database 916.

The state database 912, meanwhile, may maintain a current state of each of the secondary devices 110b. State may include binary states (e.g., whether a light is on or off, whether a lock or locked or unlocked, whether a garage door is open or closed) and non-binary states (e.g., a current brightness level of a television, a current color of a smart light bulb, a time at which a coffee maker is set to turn on, etc.). When a control engine of an primary device 110a or the remote system 120 successfully changes the state of a secondary device 110b, that primary device 110a or remote system 120 may broadcast out this information in addition to updating its own state database. In response to receiving this information, each respective primary device 110a and remote system 120 may update its corresponding state database 912.

The rules databases 914, meanwhile, may store one or more rules. Rules may comprise one or more conditions that, when met, result in the execution of one or more operations on one or more secondary devices 110b. In some examples, a user may utilize voice commands, gestures, or GUIs to create one or more rules. For example, a user may create a rule to turn on his upstairs lights and start the coffee maker at 7:00 am. In another example, the user may create a rule that certain operations should occur when the user leaves his house and when he returns. For example, the user may set a rule that the garage door should close and the front door should lock when the user is not home, and that the garage door should open and the front door unlock when the user returns home. In this example, when one of the primary devices 110a senses that the user has left or returned home, that device may execute the rule by, for example, identifying which control engine owns the secondary devices 110b associated with the rule and may issue one or more requests to these control engines to perform the operations dictated by the rule. In one example, the user may be determined to be away from home (thus triggering execution of a rule) when a mobile device of the user is not sensed by any of the primary devices 110a. Conversely, the user may be determined to be arriving home (thus triggering execution of another rule) when one of the primary devices 110a detects the presence of the mobile device after an absence.

Using the architecture of FIG. 9, a user may issue requests to change states of one or more of the secondary devices 110b(1)-(6). The user may issue these requests in a number of ways (e.g., voice, gestures, GUIs, etc.) and to any number of the primary devices 110a and/or the remote system 120. Upon a particular one of the primary devices 110a or the remote system 120 receiving a request to change a state of a secondary device, the primary device 110a or the remote system 120 may identify, from the owners database 916, the identity of the primary device 110a or remote system 120 responsible for controlling the particular secondary device 110b and may pass the request along accordingly. The owner of this secondary device 110b may thereafter receive the request and may cause the secondary device 110b to perform the requested operation.

As illustrated in FIG. 9, some devices 110 may communicate with the remote system 120 via the first primary device 110a(1). For example, FIG. 9 illustrates that secondary devices 110b(1)-110b(2) are controlled by the first primary device 110a(1), although the disclosure is not limited thereto and additional devices may be connected to the first primary device 110a(1) without departing from the disclosure. Additionally or alternatively, other primary devices 110a may be connected to the first primary device 110a(1). For example, FIG. 9 illustrates an example in which the second primary device 110a(2) communicates with the first primary device 110a(1) directly (e.g., via a private network, such as a local network associated with a wireless router and/or the like). Thus, a command intended for the third secondary device 110b(3) that originates at the remote system 120 may be sent from the remote system 120 to the first primary device 110a(1), from the first primary device 110a(1) to the second primary device 110a(2), and from the second primary device 110a(2) to the third secondary device 110b(3).

In some examples, some of the primary devices 110a and/or the secondary devices 110b may communicate directly with the remote system 120. For example, FIG. 9 illustrates that the third primary device 110a(3), the fifth secondary device 110b(5), and the sixth secondary device 110b(6) communicate with the remote system 120. Thus, a command intended for the fourth secondary device 110b(4) that originates at the remote system 120 may be sent from the remote system 120 to the third primary device 110a(3) and from the third primary device 110a(3) to the fourth secondary device 110b(4), without being sent to the first primary device 110a(1).

While not illustrated in FIG. 9, the first primary device 110a(1), the second primary device 110a(2), the first secondary device 110b(1), the second secondary device 110b(2), and the third secondary device 110b(3) may communicate via the private network 10, as described above with regard to FIGS. 1 and 6. Thus, these devices 110 may communicate with each other without using the network(s) 199. In contrast, the third primary device 110a(3), the fourth secondary device 110b(4), the fifth secondary device 110b(5), and the sixth secondary device 110b(6) may communicate via the private network and/or the network(s) 199, although the disclosure is not limited thereto.

Figure 10:
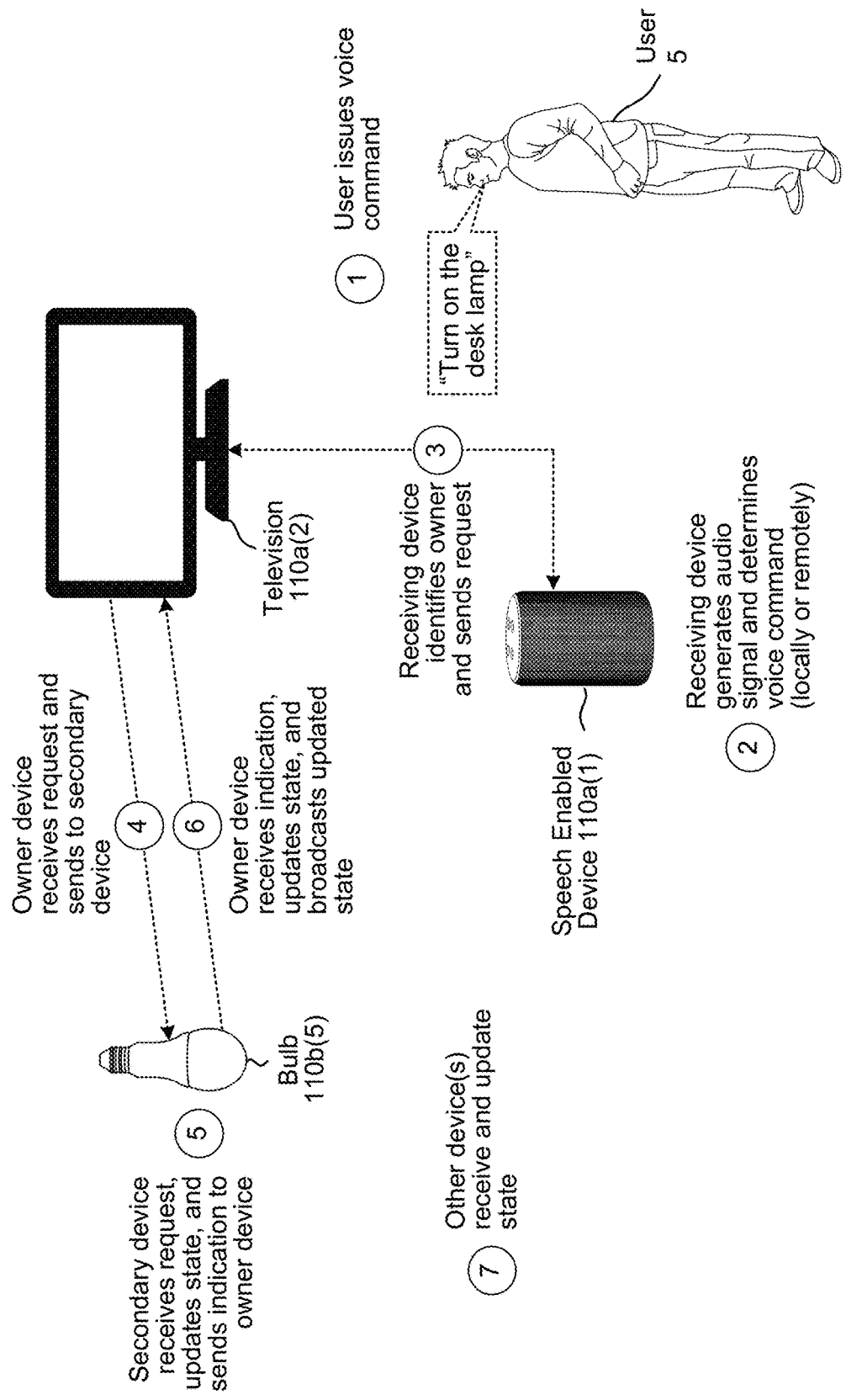
FIG. 10 illustrates an example sequence flow for a user issuing a request to change a state of a secondary device in an environment.

FIG. 10 illustrates an example sequence flow for a user issuing a request to change a state of a secondary device in an environment. As illustrated in FIG. 10, a user 5 may issue a request to change a state of a secondary device (e.g., bulb 110b(5)). For example, at "1" the user 5 may issue a voice command, such as a natural language command (e.g., "Turn on the desk lamp"). That is, the user 5 issues a voice command to change a state of the bulb 110b(5) (e.g., desk lamp) from off to on. At "2", the primary device 110a(1) generates an audio signal that includes the request and determines the contents of the voice command. For example, the primary device 110a(1) may perform language processing and/or may send the audio data to the remote system 120 for language processing.

At "3", the receiving device (e.g., primary device 110a(1)) identifies the owner of the referenced secondary device (e.g., bulb 10b(5)) and passes the request to turn on the light to the controlling device. In this example, the receiving device determines that the television 110a(2) is responsible for controlling the bulb 110b(5) and, therefore, the primary device 110a(1) passes the request to the television 110a(2). While not illustrated in FIG. 10, in some examples the remote system 120 may perform language processing on the audio data and may pass the request to the television 110a(2) directly, although the disclosure is not limited thereto.

At "4", the television 110a(2) receives the request and causes a command to be sent to the secondary device 110b(5) to cause the bulb 110b(5) to turn on, in accordance with the user's request. In some examples, this may include the television 110a(2) executing a secondary-device driver associated with the bulb 110b(5) to generate a command that, when executed by the bulb 110b(5), causes the bulb 110b(5) to turn on. In other examples, the television 110a(2) may work with the remote system 120 and/or another entity that executes the secondary-device driver and passes the generated command to the bulb 110b(5). In each instance, at "5" the bulb 110b(5) receives the request to turn on and, in response, executes the request and turns on (e.g., updates state). In addition, the bulb 110b(5) may send a notification indicating that it has successfully changed its state to "on" back to the television 110a(2).

At "6", the television 110a(2) receives the indication from the bulb 110b(5) that it has turned on and broadcasts this information out to at least some of the devices 110 (e.g., primary device 110a(1)) and/or the remote system 120. At "7", at least some of the devices 110 receives the message from the television 110a(2) and updates a local database to indicate the updated state of the bulb 110b(5).

Figure 11A:
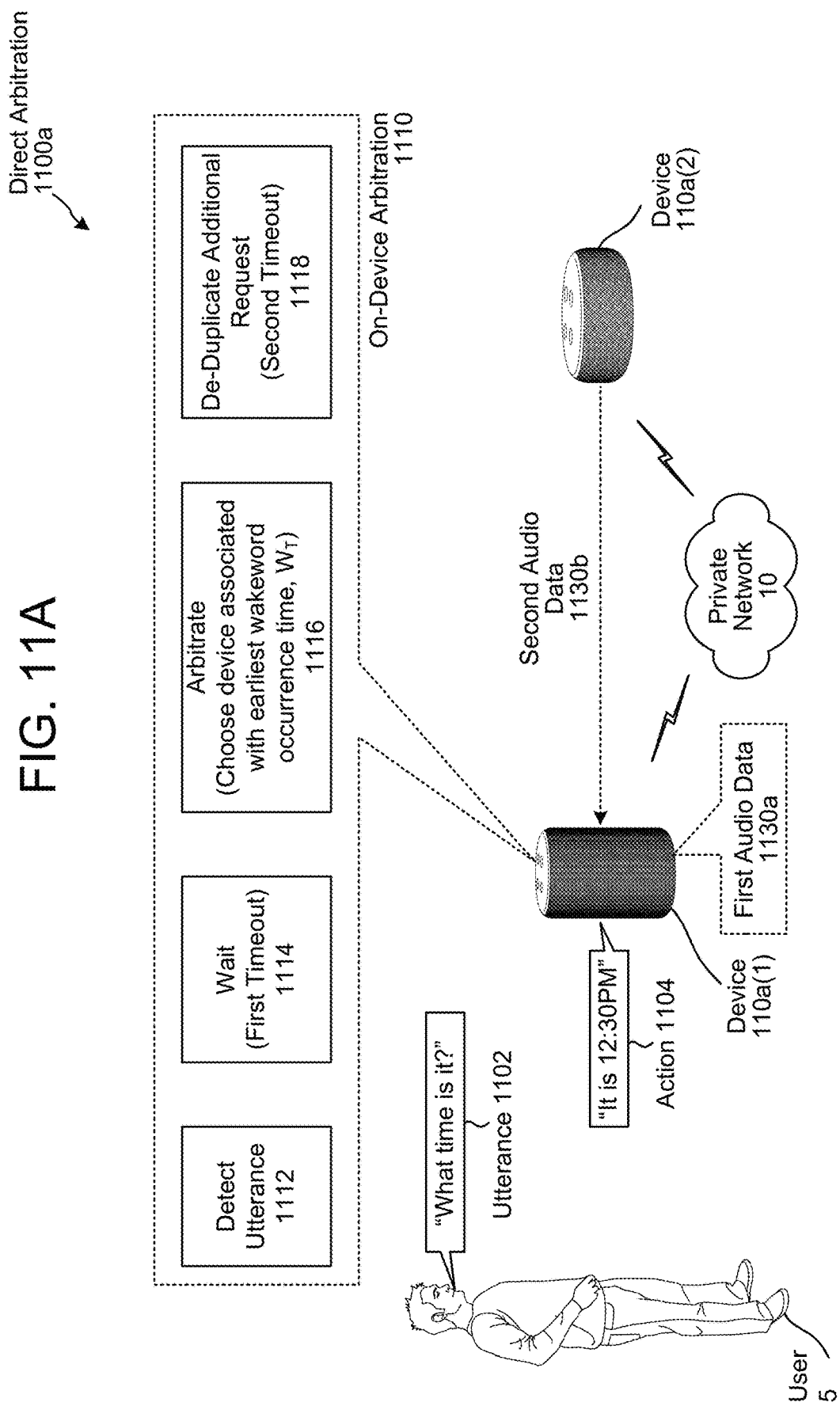
FIG. 11A is a schematic diagram illustrating a technique for performing time-based direct arbitration to designate a device to perform an action with respect to user speech.

FIG. 11A is a schematic diagram illustrating a technique for performing time-based direct arbitration to designate a device to perform an action with respect to user speech. As illustrated in FIG. 11A, a first device 110a(1) and a second device 110a(2) may both capture an utterance 1102 generated by a user 5 (e.g., "What time is it?"). To avoid redundant processing, the system 100 may perform arbitration to select audio data that represents the user utterance 1102 from a single device 110.

In the example illustrated in FIG. 11A, the first device 110a(1) is a hub device configured to perform language processing and other routing for surrounding devices 110, such as the second device 110a(2). Thus, when the utterance 1102 is detected by multiple devices 110, the devices 110 may be configured to send audio data to the first device 110a(1) for language processing. As part of performing language processing, the first device 110a(1) may perform on-device arbitration 1110 (e.g., local arbitration) to select from multiple representations of the utterance 1102. For example, the first device 110a(1) may receive input audio data 1130 from one or more devices 110 and may perform on-device arbitration 1110 to select audio data 1130 corresponding to a single representation of the utterance 1102.

FIG. 11A illustrates an example of the first device 110a(1) performing direct arbitration 1100a, which may occur when the first device 110a(1) and the second device 110a(2) can communicate directly via the private network 10. For example, the second device 110a(2) may send the second audio data 1130b directly to the first device 110a(1) via the private network 10. Thus, the first device 110a(1) may generate first audio data 1130a representing the utterance 1102, while the second device 110a(2) may generate second audio data 1130b representing the utterance 1102 and may send the second audio data 1130b to the first device 110a(1).

In the example illustrated in FIG. 11A, on-device arbitration 1110 corresponds to selecting between the first audio data 1130a and the second audio data 1130b. The first device 110a(1) may perform on-device arbitration 1110 based on wakeword occurrence times associated with the audio data 1130. For example, the first device 110a(1) may determine a first wakeword occurrence time ($W_{T1}$) associated with the first audio data 1130a, which corresponds to an estimated time at which the first device 110a(1) detected a wakeword in the utterance 1102. In addition to receiving the second audio data 1130b from the second device 110a(2), the first device 110a(1) may also receive a second wakeword occurrence time ($W_{T2}$) associated with the second audio data 1130b, which corresponds to an estimated time at which the second device 110a(2) detected the wakeword in the utterance 1102.

To perform on-device arbitration 1110, the first device 110a(1) may compare the first wakeword occurrence time ($W_{T1}$) to the second wakeword occurrence time ($W_{T2}$) and select the audio data 1130 corresponding to an earliest wakeword occurrence time ($W_T$). To illustrate an example of performing on-device arbitration 1110, FIG. 11A illustrates that the first device 110a(1) may detect (1112) an utterance and wait (1114) for a first period of time (e.g., first timeout) to receive audio data 1130 from other devices 110.

The first device 110a(1) may wait for the first period of time to account for communication delays associated with receiving data via the private network 10. For example, while the first device 110a(1) may detect the utterance 1102 before the first device 110a(1) receives the second audio data 1130b from the second device 110a(2), the second device 110a(2) may have detected the utterance 1102 first (e.g., second wakeword occurrence time ($W_{T2}$) may be earlier than the first wakeword occurrence time ($W_{T1}$)). Thus, the first device 110a(1) may start the first timeout period upon detecting the utterance 1102 at the first wakeword occurrence time ($W_{T1}$) (e.g., upon generating audio data based on the utterance, detecting a wakeword in the utterance, etc.), and the first device 110a(1) may wait for the first period of time to allow audio data or notifications to arrive at the first device 110a(1) within the first timeout period. In the example illustrated in FIG. 11A, the first device 110a(1) may receive the second audio data 1130b and the second wakeword occurrence time ($W_{T2}$) from the second device 110a(2) within the first timeout period.

After the first period of time has elapsed (e.g., end of the first timeout period), the first device 110a(1) may identify the audio data 1130 received during the first period of time and may arbitrate (1116) by determining an earliest wakeword occurrence time ($W_T$) (e.g., choose a device associated with the earliest wakeword occurrence time). Thus, the first device 110a(1) may perform time-based device arbitration to determine whether to designate the first device 110a(1) or the second device 110a(2) as a designated device to field the utterance 1102. For example, the first device 110a(1) may designate the device 110 with the earliest wakeword occurrence time as the designated device to perform an action with respect to the user speech. Thus, if the first device 110a(1) determines that the first wakeword occurrence time ($W_{T1}$) (e.g., the time the first device 110a(1) perceived the wakeword) is earlier than (or precedes) the second wakeword occurrence time ($W_{T2}$) (e.g., the time the second device 110a(2) perceived the wakeword), the first device 110a(1) may designate itself to perform the action with respect to the user speech. If, on the other hand, the first device 110a(1) determines that the second wakeword occurrence time ($W_{T2}$) is earlier than (or precedes) the first wakeword occurrence time ($W_{T1}$), the first device 110a(1) may designate the second device 110a(2) to perform the action with respect to the user speech.

The first device 110a(1) may then de-duplicate (1118) additional request(s) that arrive at the first device 110a(1) during a second period of time (e.g., second timeout period that is longer than the first timeout period). For example, if the first device 110a(1) waits for other notifications or audio data 1130 to arrive at the first device 110a(1) during the first timeout period, performs arbitration after the first timeout period, and then receives a notification and/or audio data from another device 110 during the second period of time, the first device 110a(1) may infer that the received audio data and/or notification(s) corresponds to the same utterance 1102, and may de-duplicate by deleting the audio data, and/or ignoring the notification so that two actions 1104 are not output based on a single utterance 1102. To illustrate an example, the first device 110a(1) may perform on-device arbitration 1110 to determine that the first audio data 1130a corresponds to the earliest wakeword occurrence time ($W_T$). Thus, the first device 110a(1) may select the first audio data 1130a and ignore duplicate representations of the utterance 1102 (e.g., the second audio data 1130b).

Performing the action with respect to the user speech may include continuing to capture the user speech corresponding to the utterance 1102 via a microphone of the designated device (e.g., continue generating audio data 1130). In other words, on-device arbitration 1110 may determine a most appropriate device to "listen" for sound representing user speech in the environment. For example, a duration of the utterance 1102 may be longer than the time it takes to perform on-device arbitration 1110, and, as such, a designated device can be determined for continuing to "listen" to the utterance 1102. In some examples, the first device 110a(1) may send a command to stop generating the audio data 1130 to each of the devices 110 that were not selected as the designated device. For example, if the on-device arbitration 1110 selects the first device 110a(1) as the designated device, the first device 110a(1) may send a command to the second device 110a(2) instructing the second device 110a(2) to stop generating the second audio data 1130b. Alternatively, if the on-device arbitration 1110 selects the second device 110a(2) as the designated device, the first device 110a(1) may stop generating the first audio data 1130a.

Additionally or alternatively, the on-device arbitration 1110 may determine the appropriate device 110 to perform an action 1104 responsive to the utterance 1102. For example, as the earliest wakeword occurrence time ($W_T$) indicates that the designated device is closest to the user 5, the on-device arbitration 1110 may determine that the designated device should perform the action 1104 and generate output audio responsive to the utterance 1102. However, the disclosure is not limited thereto, and the system 100 may designate an output device 110 using any technique known to one of skill in the art without departing from the disclosure. For example, despite the second device 110a(2) perceiving the wakeword earlier, the system 100 may designate the first device 110a(1) to generate the output audio based on a number of loudspeakers, a quality of output audio, and/or the like without departing from the disclosure.

Regardless of which device 110 was designated as the device to perform the action, after performing on-device arbitration 1110 the first device 110a(1) may perform language processing on the selected audio data 1130. For example, the first device 110a(1) may use the language processing component 241 to process the selected audio data 1130 (e.g., by performing ASR on the audio data 1130 to generate ASR data, then performing NLU on the ASR data, etc., although the disclosure is not limited thereto) and generate directive data.

The directive data corresponds to a command to perform an action 1104 responsive to the utterance 1102. In the example illustrated in FIG. 11A, the utterance 1102 (e.g., "What time is it?") corresponds to a user query and the first device 110a(1) may generate directive data corresponding to an action 1104 that is responsive to the user query, such as generating an audible response with the current time (e.g., a text-to-speech (TTS) response saying "It is 12:30 PM"). The first device 110a(1) may cause the action 1104 to be performed using any techniques known to one of skill in the art without departing from the disclosure. For example, the first device 110a(1) may execute the directive data (e.g., generate output audio corresponding to the audible response) or send the directive data to the second device 110a(2) in order to instruct the second device 110a(2) regarding how to respond to the user speech (e.g., instructing the second device 110a(2) to generate the output audio).

It is to be appreciated that the first device 110a(1) may perform arbitration in step 1116 based on additional types of data, which may be considered in combination with or instead of the aforementioned "time-based data" that corresponds to the wakeword occurrence times. For example, the arbitration processing may include "energy data", which may correspond to a signal strength value (e.g., SNR) associated with a detected utterance. Additionally or alternatively, the arbitration processing may include "contextual data" (e.g., a current state of the device(s) that detects an utterance, a last-used device, an ASR and/or NLU output, etc.), although the disclosure is not limited thereto.

FIG. 11B is a schematic diagram illustrating a technique for performing time-based indirect arbitration to designate a device to perform an action with respect to user speech. In some examples, some of the devices 110 may communicate with the remote system 120 but be unable to communicate with each other, due to hardware limitations, network configurations, and/or the like. For example, the first device 110a(1) and the second device 110a(2) may communicate with the remote system 120 via the network(s) 199, but the first device 110a(1) may not communicate with the second device 110a(2).

As described above, the remote system 120 may be part of a network-accessible computing platform that is maintained and accessible via the network(s) 199. Thus, when the utterance 1002 is detected by the first device 110a(1) and the second device 110a(2), the first device 110a(1) and/or the second device 110a(2) may be configured to send audio data 1130 to the remote system 120 for language processing. For example, the second device 110a(2) may generate second audio data 1030b representing the utterance 1002 and may send the second audio data 1030b to the remote system 120 via the private network 10 and the network(s) 199.

FIG. 11B illustrates an example of indirect arbitration 1100b, where the remote system 120 enables the first device 110a(1) to perform on-device arbitration 1110. As illustrated in FIG. 11B, the remote system 120 may be configured to process the second audio data 1130b on behalf of the second device 110a(2). For example, the remote system 120 may receive the second audio data 1130b from the second device 110a(2), determine that the second audio data 1130b is from a second device 110a(2) that is associated with the same user profile as the first device 110a(1), and send data to the first device 110a(1). The data sent from the remote system 120 to the first device 110a(1) may include the second audio data 1130b, the second wakeword occurrence time ($W_{T2}$) (e.g., an estimated time at which the second device 110a(2) detected a wakeword in the utterance 1102), and possibly other data including a device identifier (ID) of the second device 110a(2), additional timestamp data, etc.

Using the data received from the remote system 120 (e.g., second audio data 1130b and the second wakeword occurrence time ($W_{T2}$)), the first device 110a(1) may perform on-device arbitration 1110 as described above with regard to FIG. 11A. As the first device 110a(1) is unable to communicate with the second device 110a(2), the first device 110a(1) may generate device arbitration data 1140 and send the device arbitration data 1140 to the second device 110a(2) via the remote system 120. For example, the device arbitration data 1140 may instruct the second device 110a(2) to stop generating the second audio data 1130b (e.g., when the first wakeword occurrence time ($W_{T1}$) is earlier than the second wakeword occurrence time ($W_{T2}$)) or to continue generating the second audio data 1130b (e.g., (e.g., when the second wakeword occurrence time ($W_{T2}$) is earlier than the first wakeword occurrence time ($W_{T1}$)).

While not illustrated in FIG. 11B, the remote system 120 may send the device arbitration data 1140 and/or a portion of the device arbitration data 1140 to the second device 110a(2), although the disclosure is not limited thereto. Additionally or alternatively, the remote system 120 may interpret the device arbitration data 1140 to determine which device was designated by the on-device arbitration 1110 and may send a command to the second device 110a(2). For example, if the second device 110a(2) is not designated, the remote system 120 may send a command to stop generating the second audio data 1130b to the second device 110a(2).

In some examples, the first device 110a(1) may perform language processing on the second audio data 1130b when the second device 110a(2) is the designated device. For example, if the device arbitration data 1140 indicates that the second device 110a(2) is the designated device (e.g., the second audio data 1130b is the selected audio data on which to perform language processing), the second device 110a(2) may send the second audio data 1130b to the first device 110a(1) via the remote system 120 and the first device 110a(1) may perform language processing on the second audio data 1130b. However, the disclosure is not limited thereto, and in other examples the remote system 120 may perform language processing on the second audio data 1130b when the second device 110a(2) is the designed device without departing from the disclosure. For example, if the device arbitration data 1140 indicates that the second device 110a(2) is the designated device, the second device 110a(2) may send the second audio data 1130b to the remote system 120 and the remote system 120 may perform language processing on the second audio data 1130b. While FIG. 11B illustrates the remote system 120 sending the second audio data 1130b to the first device 110a(1) to enable the first device 110a(1) to perform on-device arbitration 1110, in some examples the remote system 120 may only send the second wakeword occurrence time ($W_{T2}$) without departing from the disclosure.

Figure 11C:
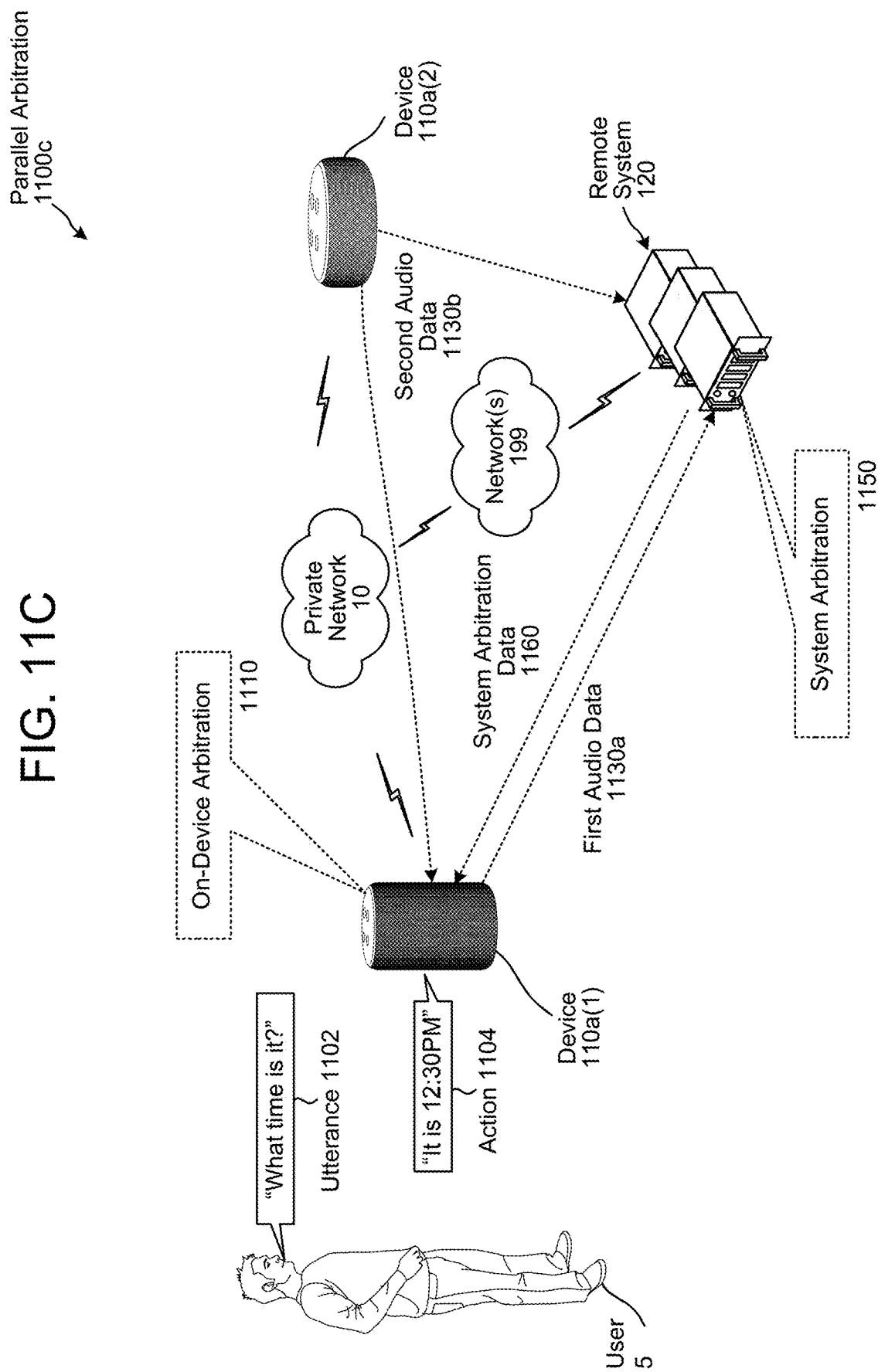
FIG. 11C is a schematic diagram illustrating a technique for performing remote arbitration and local arbitration in parallel to designate a device to perform an action with respect to user speech.

FIG. 11C is a schematic diagram illustrating a technique for performing remote arbitration and local arbitration in parallel to designate a device to perform an action with respect to user speech. In the example illustrated in FIG. 11C, the first device 110a(1) and the second device 110a(2) may communicate with each other via the private network 10 and with the remote system 120 via the network(s) 199.

In some examples, the system 100 may perform language processing on the first device 110a(1) (e.g., on-device language processing, local speech processing, etc.). Thus, the first device 110a(1) may perform on-device arbitration 1110 (e.g., local arbitration), as described above with regard to FIG. 11A. However, FIG. 11C illustrates an example of parallel arbitration 1100c, in which the remote system 120 may also perform system arbitration 1150 (e.g., remote arbitration) that may have a higher priority than the on-device arbitration 1110. For example, the first device 110a(1) may perform on-device arbitration 1110 to select a designated device and may begin processing the selected audio data 1130, but the first device 110a(1) continues to buffer the non-selected audio data 1130 until receiving remote arbitration data 1160 from the remote system 120. Thus, the first device 110a(1) does not send a command to stop generating the audio data 1130 until the first device 110a(1) receives the remote arbitration data 1160 generated by the system arbitration 1150. If the remote arbitration decision matches the local arbitration decision, the first device 110*a*(1) finishes performing language processing on the selected audio data. However, if the remote arbitration decision differs from the local arbitration decision, the first device 110*a*(1) begins performing language processing on the audio data 1130 indicated by the remote arbitration data 1160.

In addition to performing parallel arbitration 1100*c*, in some examples the system 100 may perform first language processing at the remote system 120 (e.g., remote speech processing) and second language processing at the first device 110*a*(1) in parallel. Thus, both the first device 110*a*(1) and remote system 120 may perform language processing and the results of each processing may be evaluated to determine which language processing results to use to actually execute a command. Such a combined system may be referred to as hybrid language processing (e.g., hybrid speech processing), as described in greater detail above. To illustrate an example of reducing latency, the first device 110*a*(1) may determine first directive data generated by the second language processing and may wait for second directive data generated by the first language processing performed by the remote system 120. If the first device 110*a*(1) does not receive the second directive data within a period of time, the first device 110*a*(1) may execute the first directive data to perform the action 1104. However, if the first device 110*a*(1) receives the second directive data within the period of time, the second directive data is given priority over the first directive data and the first device 110*a*(1) may execute the second directive data to perform the action 1104.

As illustrated in FIG. 11C, the devices 110 may be configured to send audio data 1130 to both the first device 110*a*(1) and to the remote system 120. For example, when the first device 110*a*(1) detects the utterance 1102, the first device 110*a*(1) may generate first audio data 1130*a* representing the utterance 1102 and may send the first audio data 1130*a* to the remote system 120 via the network(s) 199. Similarly, when the second device 110*a*(2) detects the utterance 1102, the second device 110*a*(2) may generate second audio data 1130*b* representing the utterance 1102 and may send the second audio data 1130*b* to the first device 110*a*(1) via the private network 10 and to the remote system 120 via the network(s) 199. While FIG. 11C illustrates the second device 110*a*(2) sending the second audio data 1130*b* to the first device 110*a*(1) directly via the private network 10, the disclosure is not limited thereto and in some examples the second device 110*a*(2) may send the second audio data 1130*b* to the first device 110*a*(1) indirectly via the remote system 120 without departing from the disclosure.

As part of performing language processing, the first device 110*a*(1) may perform the on-device arbitration 1110 to select from multiple representations of the utterance 1102. Thus, the first device 110*a*(1) may receive input audio data 1130 from one or more devices 110 and may perform on-device arbitration 1110 to select a single representation of the utterance 1102. For example, the first device 110*a*(1) may receive the second audio data 1130*b* from the second device 110*a*(2) and may perform on-device arbitration 1110 to select between the first audio data 1130*a* and the second audio data 1130*b*.

After performing the on-device arbitration 1110, the first device 110*a*(1) may select a single representation of the utterance 1102 and begin processing corresponding audio data 1130, while buffering the unselected audio data 1130 corresponding to redundant representations of the utterance 1102. For example, the local arbitration decision may select the first audio data 1130*a* and the first device 110*a*(1) may begin processing the first audio data 1130*a* while buffering the second audio data 1130*b*, although the disclosure is not limited thereto.

The remote system 120 may perform system arbitration 1150 (e.g., remote arbitration) to select between the first audio data 1130*a* and the second audio data 1130*b* and may generate system arbitration data 1160 indicating the remote arbitration decision (e.g., whether to perform language processing on the first audio data 1130*a* or the second audio data 1130*b*). The remote system 120 may send the system arbitration data 1160 to the first device 110*a*(1).

When the remote arbitration decision matches the local arbitration decision made by the first device 110*a*(1) (e.g., both arbitration decisions select the first audio data 1130*a*), the first device 110*a*(1) may send commands to the non-designated device(s) to stop generating audio data 1130 (e.g., send a command to the second device 110*a*(2) to stop generating the second audio data 1130*b*) and may finish processing the selected audio data 1130 (e.g., first audio data 1130*a*). However, when the remote arbitration decision differs from the local arbitration decision (e.g., remote arbitration decision selects the second audio data 1130*b*), the first device 110*a*(1) may stop generating the first audio data 1130*a*, may stop processing the selected audio data (e.g., first audio data 1130*a*), and may begin processing the buffered audio data (e.g., second audio data 1130*b*). Thus, performing local arbitration may reduce latency when the arbitration decisions match, while not affecting latency when the arbitration decisions differ.

Figure 12:
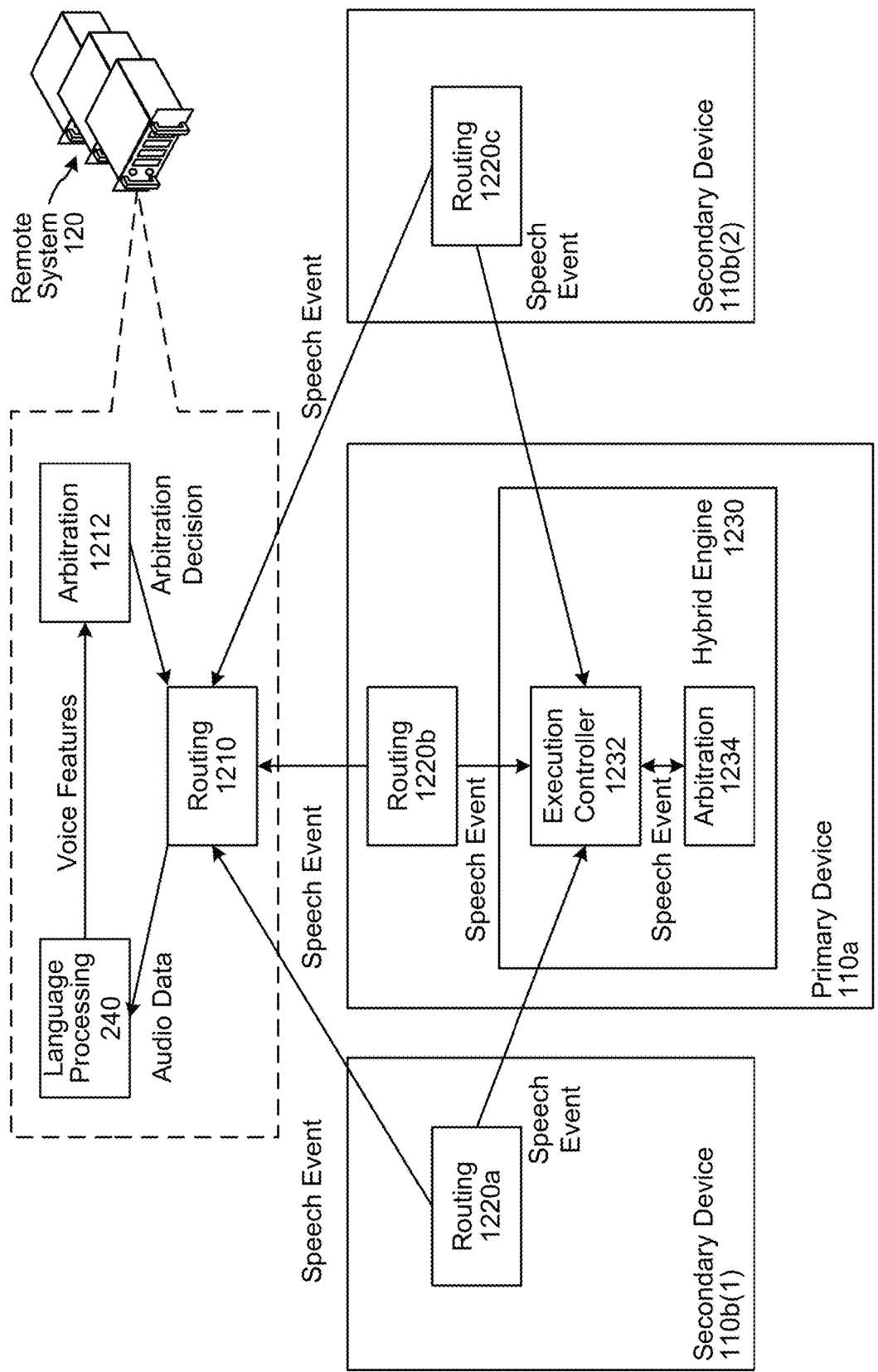
FIG. 12 illustrates an example of routing and signaling between devices during local and remote arbitration according to embodiments of the present disclosure.

FIG. 12 illustrates an example of routing and signaling between devices during local and remote arbitration according to embodiments of the present disclosure. As illustrated in FIG. 12, a primary device 110*a*, a first secondary device 110*b*(1), and a second secondary device 110*b*(2) may communicate with each other and/or the remote system 120. While not illustrated in FIG. 12, the primary devices 110*a*, the first secondary device 110*b*(1), and the second secondary device 110*b*(2) may communicate with each other via the private network 10, as described in greater detail above with regard to FIGS. 1 and 6. In addition, these devices 110 may optionally communicate with the remote system 120 via a combination of the private network 10 and the network(s) 199.

Hybrid language processing occurs when the secondary devices 110*b* send audio data to the primary device 110*a* and the remote system 120 in parallel. For example, if the first secondary device 110*b*(1) and the second secondary device 110*b*(2) capture the same utterance, the first secondary device 110*b*(1) may generate first audio data and may send the first audio data to the remote system 120 and to the primary device 110*a* (e.g., the first secondary device 110*b*(1) outputs two identical streams of audio data). In addition, the second secondary device 110*b*(2) may generate second audio data and may send the second audio data to the remote system 120 and to the primary device 110*a* (e.g., the second secondary device 110*b*(2) also outputs two identical streams of audio data). Thus, the primary device 110*a* receives the first audio data and the second audio data and the remote system 120 receives the first audio data and the second audio data, for a total of four streams of audio data.

As illustrated in FIG. 12, each of the devices 110 may include a routing component 1220 configured to send speech events to other devices and/or the remote system 120. For example, the first secondary device 110*b*(1) may include a first routing component 1220*a* that may send a first speech event (e.g., first audio data generated by the first secondary device 110b(1), along with additional information such as a first wakeword occurrence time) to the remote system 120 and to a hybrid engine 1230 of the primary device 110a, the primary device 110a may include a second routing component 1220b configured to send a second speech event (e.g., second audio data generated by the primary device 110a, along with additional information such as a second wakeword occurrence time) to the remote system 120 and to the hybrid engine 1230, and the second secondary device 110b(2) may include a third routing component 1220c that may send a third speech event (e.g., third audio data generated by the second secondary device 110b(2), along with additional information such as a third wakeword occurrence time) to the remote system 120 and to the hybrid engine 1230 of the primary device 110a.

In addition to the second routing component 1220b, the primary device 110a may include the hybrid engine 1230, which may include an execution controller 1232 and an arbitration component 1234 (e.g., configured to perform local arbitration). The execution controller 1232 may receive the speech events from the routing components 1220 and may send the speech events to the arbitration component 1234. The arbitration component 1234 may perform on-device arbitration 1110, as described in greater detail above with regard to FIGS. 11A-11C.

The remote system 120 may include a routing component 1210, an arbitration component 1212 (e.g., configured to perform remote arbitration), and the language processing components 240 described above with regard to FIG. 2A. The routing component 1210 may be configured to receive the speech events from the devices 110 and may send audio data associated with the speech events to the language processing components 240. The language processing components 240 may process the audio data, for example using the ASR component 250, to generate voice features and may send the voice features to the arbitration component 1212. The arbitration component 1212 may use the voice features to perform remote arbitration to select a designated device and selected audio data on which to perform language processing. Thus, whereas the local arbitration may use time-based arbitration and/or energy-based arbitration, the remote arbitration may perform additional processing to generate the voice features.

FIG. 13 illustrates an examples of performing arbitration according to embodiments of the present disclosure. As described above, arbitration refers to a process in which the system 100 selects between multiple representations of the same utterance. For example, two or more devices 110 may capture an utterance representing a voice command, such that a primary device 110a(1) receives first audio data and second audio data that both represent a single voice command. Instead of processing both the first audio data and the second audio data, the system 100 may perform arbitration to select a single representation of the voice command and process corresponding audio data. The system 100 may perform arbitration using a variety of techniques known to one of skill in the art without departing from the disclosure. For example, the system 100 may select based on which audio data was generated first (e.g., select audio data associated with a device 110 that is closer to the user 5, as determined by wakeword occurrence time), based on a device type and/or features associated with the devices 110 (e.g., prioritizing devices 110 with a better microphone array or better signal processing capabilities), and/or the like.

As illustrated in FIG. 13, a first secondary device 110b(1) may detect (1310) a wakeword, may send (1312) first event data indicating a first speech event to a primary device 110a(1) configured to perform language processing, and may begin (1314) sending first audio data to the primary device 110a(1). In response to receiving the first event data, the primary device 110a(1) may start (1316) an arbitration timer and wait a first period of time for additional event data. Within the first period of time, the second secondary device 110b(2) may also detect (1318) the wakeword, may send (1320) second event data indicating a second speech event to the primary device 110a(1), and may begin (1322) sending second audio data to the primary device 110a(1).

The primary device 110a(1) may determine (1324) that the arbitration timer has ended and may perform (1326) arbitration to select a designated device, as described in greater detail above with regard to FIG. 11A. For example, the primary device 110a(1) may compare a first wakeword occurrence time associated with the first event data and a second wakeword occurrence time associated with the second event data.

In the example illustrated in FIG. 13, the arbitration selected the first secondary device 110b(1) as the designated device. As a result, the primary device 110a(1) may send (1328) a stop capture command to the second secondary device 110b(2) and may begin (1330) processing the first audio data associated with the first secondary device 110b(1). After receiving the stop capture command, the second secondary device 110b(2) may stop (1332) audio capture and cease generating the second audio data.

While FIG. 13 illustrates an example in which the arbitration selected the first secondary device 110b(1), the disclosure is not limited thereto and in some examples the arbitration may select the second secondary device 110b(2) despite the primary device 110a(1) receiving the second event data after receiving the first event data. For example, the second wakeword occurrence time associated with the second audio data may be earlier than the first wakeword occurrence time associated with the first audio data. Thus, while communication delays resulted in the second event data being received by the primary device 110a(1) after the first event data, the second secondary device 110b(2) may have perceived the wakeword earlier than the first secondary device 110b(1) without departing from the disclosure.

Figure 14C:
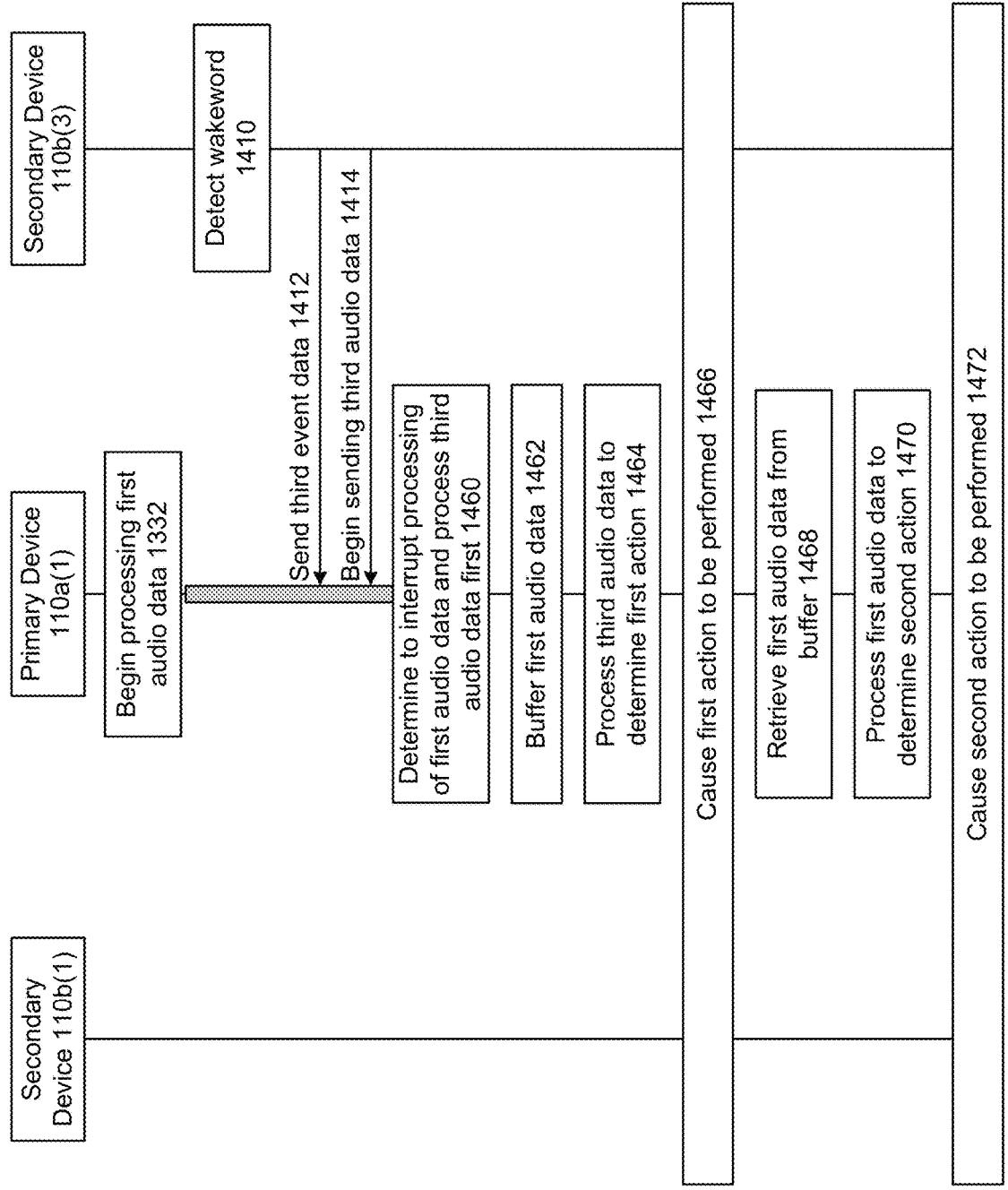

FIGS. 14A-14C illustrate examples of performing language processing for multiple utterances according to embodiments of the present disclosure. As illustrated in FIGS. 14A-14C, the primary device 110a(1) may perform arbitration to select the first secondary device 110b(1) and may begin (1332) processing the first audio data received from the first secondary device 110b(1). After the primary device 110a(1) begins processing the first audio data (e.g., long after the arbitration timer ended), a third secondary device 110b(3) may detect (1410) a wakeword, may send (1412) third event data to the primary device 110a(1), and may begin (1414) sending third audio data to the primary device 110a(1).

The primary device 110a(1) may determine that the third event data corresponds to a second utterance that is different from the first utterance represented in the first audio data. If the primary device 110a(1) has finished processing the first audio data and/or has sufficient processing capability (e.g., can process more than one utterance at a time), the primary device 110a(1) may begin processing the third audio data immediately. However, as the primary device 110a(1) is resource constrained (e.g., limited processing capability), if the primary device 110a(1) is already processing the first audio data and/or other audio data, the primary device 110a(1) may need to prioritize whether to process the first audio data or the third audio data.

As illustrated in FIG. 14A, in some examples the primary device 110a(1) may determine (1416) to continue processing the first audio data and to ignore the third audio data. For example, interrupting the ongoing processing of the first audio data may be inefficient and disrupt a first user interaction associated with the first utterance, so the primary device 110a(1) may continue processing the first audio data. However, the system 100 may prioritize a short latency and determine that a lengthy delay to process the second utterance may disrupt a second user interaction associated with the second utterance.

Therefore, the system 100 may determine to ignore the third audio data and instead generate a prompt response (e.g., error message, notification, and/or the like) indicating that the second utterance was ignored. As illustrated in FIG. 14A, the primary device 110a(1) may generate (1418) output data including a notification that the second utterance could not be processed and may send (1420) the output data to the third secondary device 110b(3). The third secondary device 110b(3) may stop (1422) audio capture (e.g., stop generating the third audio data) and may generate (1424) an output using the output data, such as generating output audio and/or displaying an image, to indicate that the second utterance was not processed.

In some examples, the prompt response may correspond to a formal drop acknowledgment indicating that the primary device 110a(1) is not processing the third audio data. For example, the third secondary device 110b(3) may receive the response and may determine to stop audio capture on its own. However, the disclosure is not limited thereto and in other examples the third secondary device 110b(3) may identify a fallback option (e.g., second primary device 110a(2) and/or remote system 120) and may send the third audio data to the primary device 110a(2) and/or remote system 120 for processing without departing from the disclosure. Thus, the third secondary device 110b(3) may skip steps 1422 and 1424 without departing from the disclosure. In some examples, the third secondary device 110b(3) may identify the second primary device 110a(2) using hub organization data, a hierarchy of language processing devices, and/or the like.

Additionally or alternatively, in some examples the third secondary device 110b(3) may initially send the third audio data to both the primary device 110a(1) and the remote system 120. In this case, receiving the formal drop acknowledgement from the primary device 110a(1) indicates to the third secondary device 110b(3) that the remote system 120 will be processing the third audio data. Thus, the third secondary device 110b(3) may skip steps 1422-1424 and continue sending the third audio data to the remote system 120 for processing without departing from the disclosure. While FIG. 14A illustrates an example in which the primary device 110a(1) sends the output data to the third secondary device 110b(3), the disclosure is not limited thereto and in some examples the primary device 110a(1) may do nothing without departing from the disclosure.

In some examples, the prompt response may include a command instructing the third secondary device 110b(3) to perform an action. For example, the primary device 110a(1) may send a command to the third secondary device 110b(3) instructing the third secondary device 110b(3) to stop audio capture. Alternatively, the primary device 110a(1) may instead send a command instructing the third secondary device 110b(3) to continue generating the third audio data but to send the third audio data to the second primary device 110a(2) and/or the remote system 120 for processing without departing from the disclosure. For example, the primary device 110a(1) may identify the second primary device 110a(2) using the hub organization data, the hierarchy of language processing devices, and/or the like and may send information identifying the second primary device 110a(2) to the third secondary device 110b(3).

In response to determining that the primary device 110a(1) is processing the first utterance, the primary device 110a(1) may perform at least one operation that results in the third audio data being processed by another device (e.g., the remote system 120 and/or the primary device 110a(2)). For example, the primary device 110a(1) may send the third audio data to the remote system 120, send the third audio data to the primary device 110a(2), send a notification to the third secondary device 110b(3) that the remote system 120 will be processing the third audio data, do nothing (e.g., in which case the third secondary device 110b(3) waits for the remote system 120 to process the third audio data), send a command to the primary device 110a(2) to communicate with the third secondary device 110b(3), send a command to the third secondary device 110b(3) to send the third audio data to the primary device 110a(2), and/or the like without departing from the disclosure.

As illustrated in FIG. 14B, in some examples the primary device 110a(1) may determine (1430) to continue processing the first audio data and then process the third audio data afterward. For example, interrupting the ongoing processing of the first audio data may be inefficient and disrupt a first user interaction associated with the first utterance, so the primary device 110a(1) may continue processing the first audio data. However, the system 100 may determine that the second user interaction is improved by processing the second utterance, even after a short delay, rather than generating an error message.

Therefore, the system 100 may determine to buffer the third audio data, generate a response indicating that the second utterance will be processed (e.g., after a short delay), and then process the first audio data followed by the third audio data. As illustrated in FIG. 14B, the primary device 110a(1) may buffer (1432) the third audio data, may generate (1434) output data including a notification that the second utterance will be processed, and may send (1436) the output data to the third secondary device 110b(3). The third secondary device 110b(3) may generate (1438) an output using the output data, such as generating output audio and/or a displaying an image, to indicate that the second utterance will be processed. In some examples, the output may indicate that there will be a temporary delay, although the disclosure is not limited thereto.

While FIG. 14B illustrates the primary device 110a(1) generating the output data and the third secondary device 110b(3) generating the output using the output data, the disclosure is not limited thereto. In some examples, the third secondary device 110b(3) may not generate an output in response to the primary device 110a(1) buffering the third audio data without departing from the disclosure. For example, upon detecting the wakeword, the third secondary device 110b(3) may display indicator light(s) and/or other visual indicators to indicate to the second user 5b that the second utterance is being processed. Instead of generating an output indicating that the second utterance will be processed, the third secondary device 110b(3) may continue to display the indicator light(s) and/or other visual indicators.

The primary device 110a(1) may finish (1440) processing the first audio data to determine a first action responsive to the first utterance and may cause (1442) the first action to be performed. The primary device 110a(1) may then retrieve (1444) the third audio data from the buffer, may process (1446) the third audio data to determine a second action responsive to the second utterance, and may cause (1448) the second action to be performed. The primary device 110a(1) may cause the first action and/or the second action to be performed using any technique known to one of skill in the art without departing from the disclosure. For example, the primary device 110a(1) may perform the action (e.g., generate output audio), may send a command to one or more devices 110 to perform the action, and/or the like without departing from the disclosure.

As illustrated in FIG. 14C, in some examples the primary device 110a(1) may determine (1460) to interrupt processing of the first audio data and process the third audio data prior to processing the first audio data. For example, the system 100 may prioritize the device originating the third audio data (e.g., the third secondary device 110b(3) in this example, although the disclosure is not limited thereto), may associate the device originating the third audio data with a group of commands that the primary device 110a(1) may process accurately and/or quickly, may determine that a length of the third audio data is shorter than the first audio data, and/or the like. While FIG. 14C illustrates an example in which the primary device 110a(1) receives the third audio data from the third secondary device 110b(3), the disclosure is not limited thereto and the primary device 110a(1) may generate the third audio data or may receive the third audio data from another primary device without departing from the disclosure. For example, the primary device 110a(1) may prioritize processing utterances captured by the primary device 110a(1) prior to processing utterances received from other devices 110, although the disclosure is not limited thereto.

As illustrated in FIG. 14C, the primary device 110a(1) may buffer (1462) the first audio data, may process (1464) the third audio data to determine a first action responsive to the second utterance and may cause (1466) the first action to be performed. The primary device 110a(1) may then retrieve (1468) the first audio data from the buffer, may process (1470) the first audio data to determine a second action responsive to the first utterance, and may cause (1472) the second action to be performed. The primary device 110a(1) may cause the first action and/or the second action to be performed using any technique known to one of skill in the art without departing from the disclosure. For example, the primary device 110a(1) may perform the action (e.g., generate output audio), may send a command to one or more devices 110 to perform the action, and/or the like without departing from the disclosure.

FIGS. 15A-15E illustrate examples of performing language processing for multiple utterances using multiple language processing devices according to embodiments of the present disclosure. As illustrated in FIGS. 15A-15E, a primary device 110a(1) may begin (1332) processing the first audio data and then the secondary device 110b(3) may detect (1410) a wakeword, may send (1412) third event data to the primary device 110a(1), and/or may begin (1414) sending the third audio data to the primary device 110a(1), as described above with regard to FIGS. 13-14C. While FIGS. 14A-14C illustrate examples of the primary device 110a(1) performing all language processing (e.g., processing the first audio data and/or the third audio data), FIGS. 15A-15E illustrate examples in which the primary device 110a(1) may send the first audio data or the third audio data to another primary device 110a(2) or to the remote system 120 without departing from the disclosure.

Figure 15A:
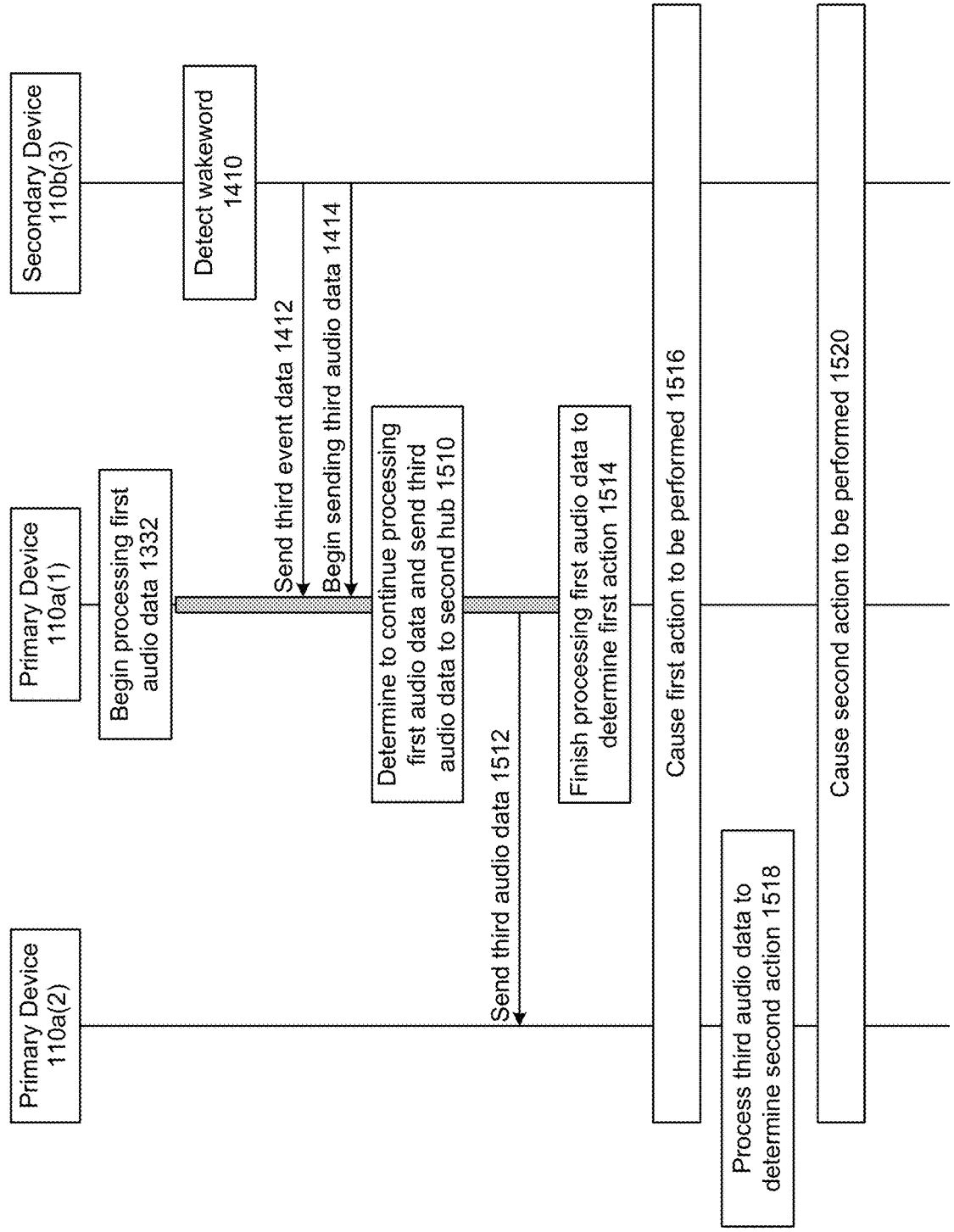

In some examples, the primary device 110a(1) may send the third audio data to a second primary device 110a(2). As illustrated in FIG. 15A, the primary device 110a(1) may determine (1510) to continue processing the first audio data and to send the third audio data to a second hub and may send (1512) the third audio data to the second primary device 110a(2). While not illustrated in FIG. 15A, in some examples the primary device 110a(1) may send a command to the primary device 110a(2) instructing the primary device 110a(2) to communicate directly with the third secondary device 110b(3). For example, the primary device 110a(2) may establish a communication session with the third secondary device 110b(3) or perform other actions such that the primary device 110a(2) directly interacts with the third secondary device 110b(3) without involving the primary device 110a(1). However, the disclosure is not limited thereto and in other examples the primary device 110a(1) may act as an intermediary between the primary device 110a(2) and the third secondary device 110b(3) without departing from the disclosure.

The primary device 110a(1) may then finish (1514) processing the first audio data to determine a first action responsive to the first utterance, and may cause (1516) the first action to be performed. The primary device 110a(1) may cause the first action to be performed using any technique known to one of skill in the art without departing from the disclosure. For example, the primary device 110a(1) may perform the action (e.g., generate output audio), may send a command to one or more devices 110 to perform the action, and/or the like without departing from the disclosure.

The primary device 110a(2) may then process (1518) the third audio data to determine a second action responsive to the second utterance, and may cause (1520) the second action to be performed. The primary device 110a(2) may cause the second action to be performed using any technique known to one of skill in the art without departing from the disclosure. For example, the primary device 110a(2) may perform the action (e.g., generate output audio), may send a command to one or more devices 110 to perform the action, and/or the like without departing from the disclosure. While FIG. 15A illustrates the primary device 110a(1) causing the first action to be performed prior to the primary device 110a(2) causing the second action to be performed, the disclosure is not limited thereto and the timing of these steps may vary without departing from the disclosure.

Figure 15B:
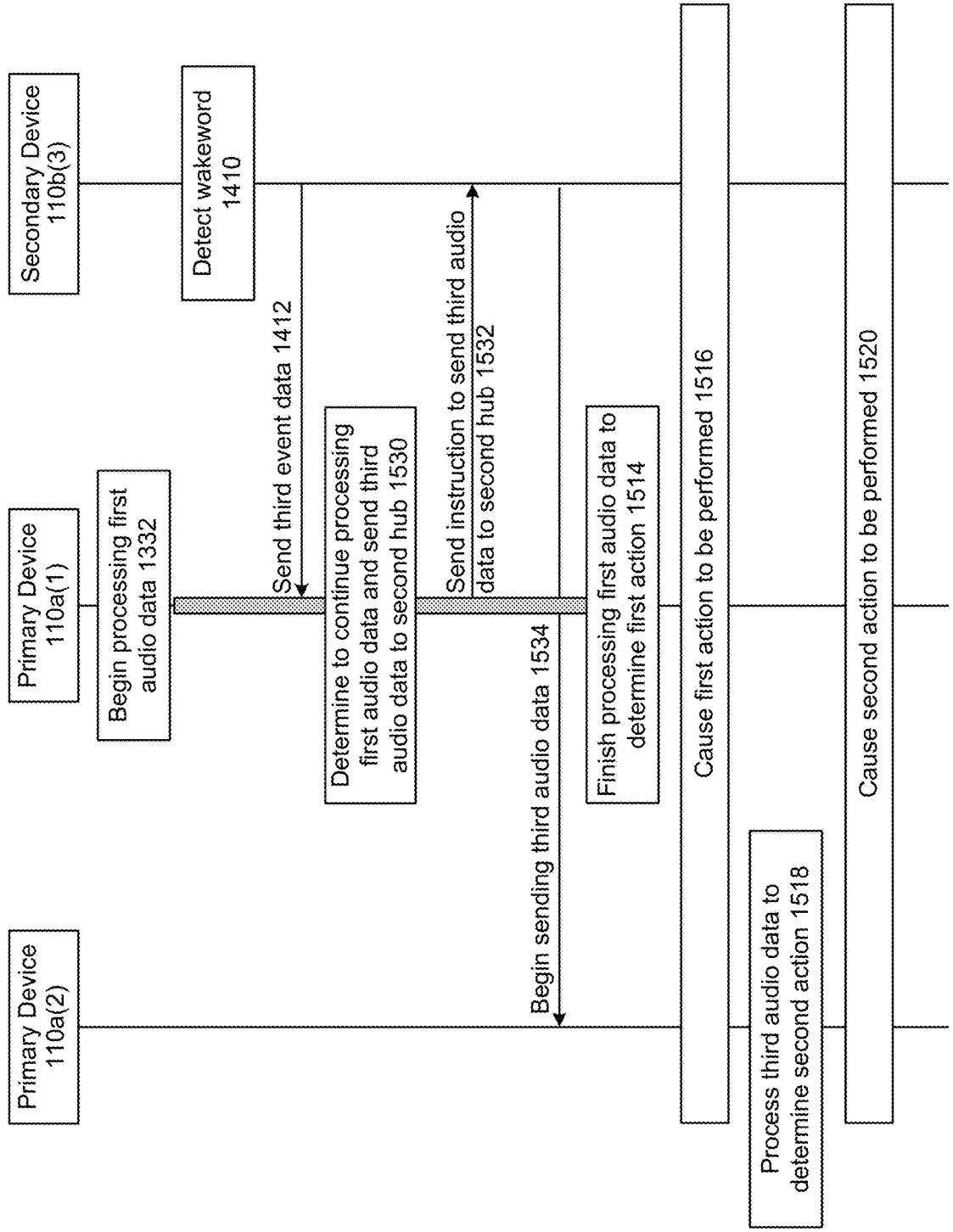

In some examples, the primary device 110a(1) may instruct the third secondary device 110b(3) to send the third audio data to a second primary device 110a(2). As illustrated in FIG. 15B, the primary device 110a(1) may determine (1530) to continue processing the first audio data and to send the third audio data to a second hub and may send (1532) an instruction to the third secondary device 110b(3) instructing the third secondary device 110b(3) to send the third audio data to a second hub (e.g., primary device 110a(2)). The third secondary device 110b(3) may then begin (1534) sending the third audio data to the primary device 110a(2). While FIG. 15B does not illustrate the secondary device 110b(3) sending the third audio data to the primary device 110a(1) in step 1414, the disclosure is not limited thereto and the secondary device 110b(3) may initially send the third audio data to the primary device 110a(1) without departing from the disclosure.

As illustrated in FIG. 15B, the primary device 110a(2) may then finish (1514) processing the first audio data to determine a first action responsive to the first utterance, and may cause (1516) the first action to be performed, as described in greater detail above. The primary device 110a(2) may then process (1518) the third audio data to determine a second action responsive to the second utterance, and may cause (1520) the second action to be performed, as described in greater detail above.

In some examples, the primary device 110*a*(1) may send the third audio data to the remote system 120. As illustrated in FIG. 15C, the primary device 110*a*(1) may determine (1550) to continue processing the first audio data and to send the third audio data to an NLP system (e.g., remote system 120) and may send (1552) the third audio data to the remote system 120. The primary device 110*a*(1) may then finish (1554) processing the first audio data to determine a first action responsive to the first utterance, and may cause (1556) the first action to be performed. The primary device 110*a*(1) may cause the first action to be performed using any technique known to one of skill in the art without departing from the disclosure. For example, the primary device 110*a* (1) may perform the action (e.g., generate output audio), may send a command to one or more devices 110 to perform the action, and/or the like without departing from the disclosure.

The remote system 120 may then process (1558) the third audio data to determine a second action responsive to the second utterance, and may cause (1560) the second action to be performed. The remote system 120 may cause the second action to be performed using any technique known to one of skill in the art without departing from the disclosure. For example, the remote system 120 may perform an action (e.g., generate output audio data), may send a command to one or more devices 110 to perform the action, and/or the like without departing from the disclosure. While FIG. 15C illustrates the primary device 110*a*(1) causing the first action to be performed prior to the remote system 120 causing the second action to be performed, the disclosure is not limited thereto and the timing of these steps may vary without departing from the disclosure.

In some examples, the primary device 110*a*(1) may instruct the third secondary device 110*b*(3) to send the third audio data to the remote system 120. As illustrated in FIG. 15D, the primary device 110*a*(1) may determine (1570) to continue processing the first audio data and to send the third audio data to an NLP system (e.g., remote system 120) and may send (1572) an instruction to the third secondary device 110*b*(3) instructing the third secondary device 110*b*(3) to send the third audio data to the remote system 120. The third secondary device 110*b*(3) may then begin (1574) sending the third audio data to the remote system 120. While FIG. 15D does not illustrate the secondary device 110*b*(3) sending the third audio data to the primary device 110*a*(1) in step 1414, the disclosure is not limited thereto and the secondary device 110*b*(3) may initially send the third audio data to the primary device 110*a*(1) without departing from the disclosure.

As illustrated in FIG. 15D, the primary device 110*a*(2) may then finish (1554) processing the first audio data to determine a first action responsive to the first utterance, and may cause (1556) the first action to be performed, as described in greater detail above. The remote system 120 may then process (1558) the third audio data to determine a second action responsive to the second utterance, and may cause (1560) the second action to be performed, as described in greater detail above.

In some examples, the primary device 110*a*(1) may send the first audio data to the remote system 120 and process the third audio data instead. For example, the system 100 may prioritize the device originating the third audio data (e.g., the third secondary device 110*b*(3) in this example, although the disclosure is not limited thereto), may associate the device originating the third audio data with a group of commands that the primary device 110*a*(1) may process accurately and/or quickly, may determine that a length of the third audio data is shorter than the first audio data, and/or the like. While FIG. 15E illustrates an example in which the primary device 110*a*(1) receives the third audio data from the third secondary device 110*b*(3), the disclosure is not limited thereto and the primary device 110*a*(1) may generate the third audio data or may receive the third audio data from another primary device without departing from the disclosure. For example, the primary device 110*a*(1) may prioritize processing utterances captured by the primary device 110*a*(1) over processing utterances received from other devices 110, although the disclosure is not limited thereto.

As illustrated in FIG. 15E, the primary device 110*a*(1) may determine (1580) to interrupt processing of the first audio data and to send the first audio data to an NLP system (e.g., remote system 120), may begin (1582) processing the third audio data, and may send (1584) the first audio data to the remote system 120.

The primary device 110*a*(1) may then finish (1586) processing the third audio data to determine a first action responsive to the second utterance, and may cause (1588) the first action to be performed. The primary device 110*a*(1) may cause the first action to be performed using any technique known to one of skill in the art without departing from the disclosure. For example, the primary device 110*a* (1) may perform the action (e.g., generate output audio), may send a command to one or more devices 110 to perform the action, and/or the like without departing from the disclosure.

The remote system 120 may then process (1590) the first audio data to determine a second action responsive to the first utterance and may cause (1592) the second action to be performed. The remote system 120 may cause the second action to be performed using any technique known to one of skill in the art without departing from the disclosure. For example, the remote system 120 may perform an action (e.g., generate output audio data), may send a command to one or more devices 110 to perform the action, and/or the like without departing from the disclosure. While FIG. 15E illustrates the primary device 110*a*(1) causing the first action to be performed prior to the remote system 120 causing the second action to be performed, the disclosure is not limited thereto and the timing of these steps may vary without departing from the disclosure.

Figure 16A:
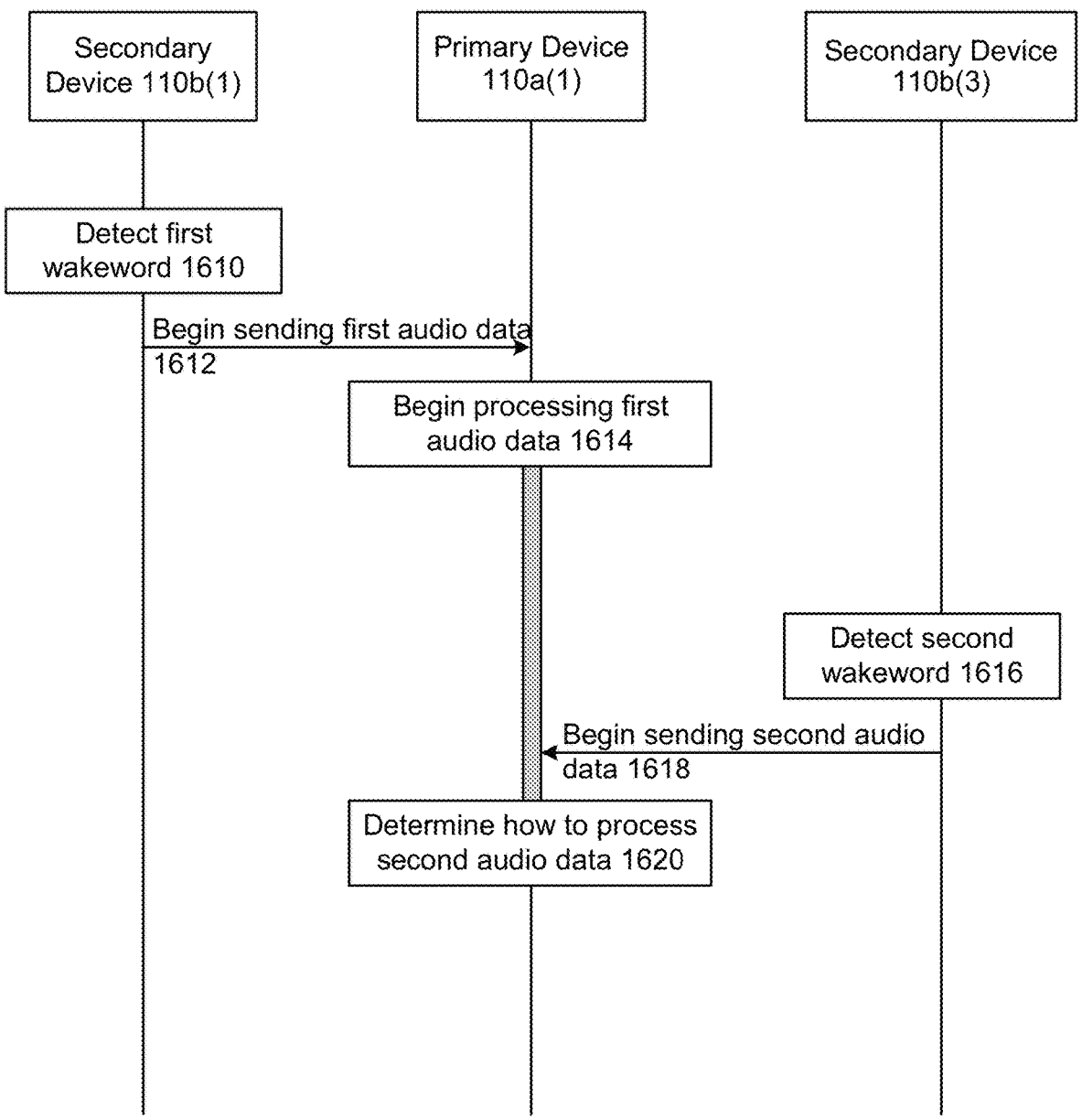
Figure 16B:
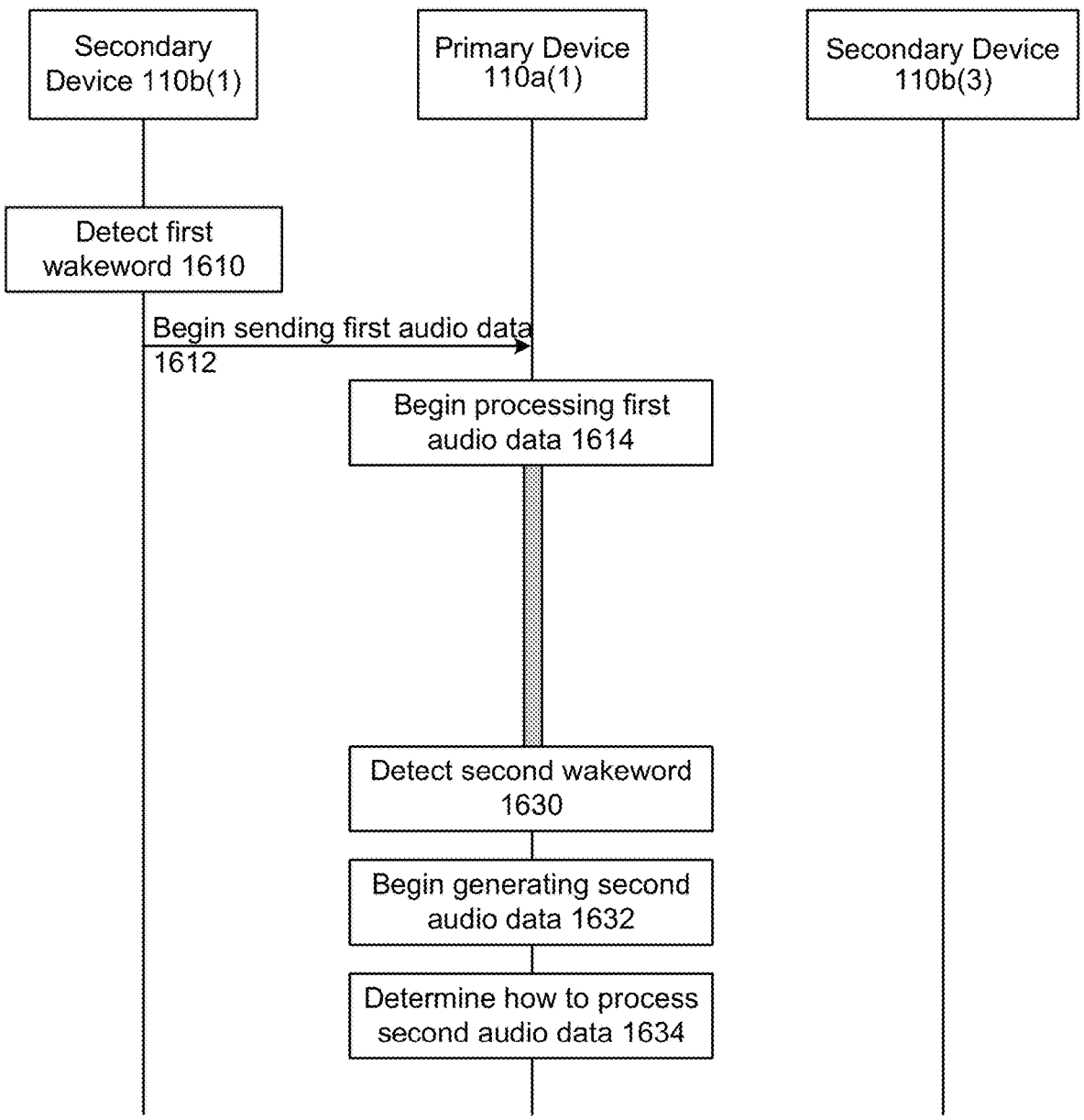

FIGS. 16A-16C illustrate examples of performing language processing for multiple utterances according to embodiments of the present disclosure. While the examples illustrated in FIGS. 14A-14C and 15A-15E illustrate the primary device 110*a*(1) processing the first audio data from the first secondary device 110*b*(1) and receiving the third audio data from the third secondary device 110*b*(3), this is intended to conceptually illustrate an example and the disclosure is not limited thereto. Instead, the steps described above with regard to FIGS. 14A-14C and/or 15A-15E may be extended to enable the system 100 to process the first audio data and the third audio data regardless of which device generates the first audio data and/or the third audio data without departing from the disclosure.

As illustrated in FIG. 16A, in some examples the first secondary device 110*b*(1) may detect (1610) a first wakeword, may begin (1612) sending first audio data to the primary device 110*a*(1), and the primary device 110*a*(1) may begin (1614) processing the first audio data. The third secondary device 110*b*(3) may then detect (1616) a second wakeword, begin (1618) sending the second audio data to the primary device 110*a*(1), and the primary device 110*a*(1)

may determine (1620) how to process the second audio data, as described above with regard to FIGS. 14A-14C and 15A-15E.

As illustrated in FIG. 16B, in some examples the first secondary device 110*b*(1) may detect (1610) a first wakeword, may begin (1612) sending first audio data to the primary device 110*a*(1), and the primary device 110*a*(1) may begin (1614) processing the first audio data. The primary device 110*a*(1) may then detect (1630) a second wakeword, begin (1632) generating the second audio data, and may determine (1634) how to process the second audio data, as described above with regard to FIGS. 14A-14C and 15A-15E.

As illustrated in FIG. 16C, in some examples the primary device 110*a*(1) may detect (1650) a first wakeword, may begin (1652) generating first audio data, and may begin (1654) processing the first audio data. The first secondary device 110*b*(1) may then detect (1656) a second wakeword and begin (1658) sending the second audio data to the primary device 110*a*(1), and the primary device 110*a*(1) may determine (1660) how to process the second audio data, as described above with regard to FIGS. 14A-14C and 15A-15E.

FIGS. 17A-17C illustrate examples of performing language processing using two or more language processing devices configured to process a specific language according to embodiments of the present disclosure. In some examples, each of the language processing devices 110*a* may be configured to process voice commands using a single language. For example, a first primary device 110*a*(1) may be configured to perform language processing in a first language (e.g., English), and may be unable to accurately process a voice command received in a second language (e.g., Spanish). To enable language processing of multiple languages, the system 100 may include a second primary device 110*a*(2) configured to perform language processing in the second language. Thus, the system 100 may route first voice commands associated with the first language to the first primary device 110*a*(1) and route second voice commands associated with the second language to the second primary device 110*a*(2).

In order to route the voice commands appropriately, the system 100 may perform language detection to identify a language associated with the voice command and may perform hub selection to identify a primary device 110*a* associated with the identified language. FIG. 17A illustrates an example in which a secondary device 110*b*(1) performs language detection and hub selection, FIG. 17B illustrates an example in which the secondary device 110*b*(1) performs language detection but the first primary device 110*a*(1) performs hub selection, and FIG. 17C illustrates an example in which the first primary device 110*a*(1) performs language detection and hub selection.

As illustrated in FIG. 17A, the first secondary device 110*b*(1) may detect (1710) a wakeword and may generate (1712) first audio data. The first secondary device 110*b*(1) may then detect (1714) a first language represented in the first audio data, may determine (1716) a plurality of devices associated with the private network 10 (and/or associated with the user profile), may identify (1718) a second primary device 110*a*(2) configured to perform speech processing using the first language, and may send (1720) the first audio data to the second primary device 110*a*(2). The second primary device 110*a*(2) may process (1722) the first audio data to determine a first action responsive to the first utterance and may cause (1724) the first action to be performed, as described in greater detail above.

As illustrated in FIG. 17B, the first secondary device 110*b*(1) may detect (1710) the wakeword, may generate (1712) the first audio data, and then detect (1714) the first language represented in the first audio data, as described above. However, the first secondary device 110*b*(1) may not perform hub selection and may instead send (1730) the first audio data to the first primary device 110*a*(1) and send (1732) an indication of the first language to the first primary device 110*a*(1).

The first primary device 110*a*(1) may determine (1734) a plurality of devices associated with the private network 10 (and/or associated with the user profile), may identify (1736) a second primary device 110*a*(2) configured to perform speech processing using the first language, and may send (1738) the first audio data to the second primary device 110*a*(2). The second primary device 110*a*(2) may process (1722) the first audio data to determine a first action responsive to the first utterance and may cause (1724) the first action to be performed, as described in greater detail above.

As illustrated in FIG. 17C, the first secondary device 110*b*(1) may detect (1710) the wakeword and may generate (1712) the first audio data. However, the first secondary device 110*b*(1) may not perform language detection and the first primary device 110*a*(1) may be configured to perform both language detection and hub selection. Thus, the first secondary device 110*b*(1) may send (1750) the first audio data to the first primary device 110*a*(1) and the first primary device 110*a*(1) may detect (1752) the first language represented in the first audio data, may determine (1754) a plurality of devices associated with the private network 10 (and/or associated with the user profile), may identify (1756) a second primary device 110*a*(2) configured to perform speech processing using the first language, and may send (1758) the first audio data to the second primary device 110*a*(2). The second primary device 110*a*(2) may process (1722) the first audio data to determine a first action responsive to the first utterance and may cause (1724) the first action to be performed, as described in greater detail above.

Figure 18:
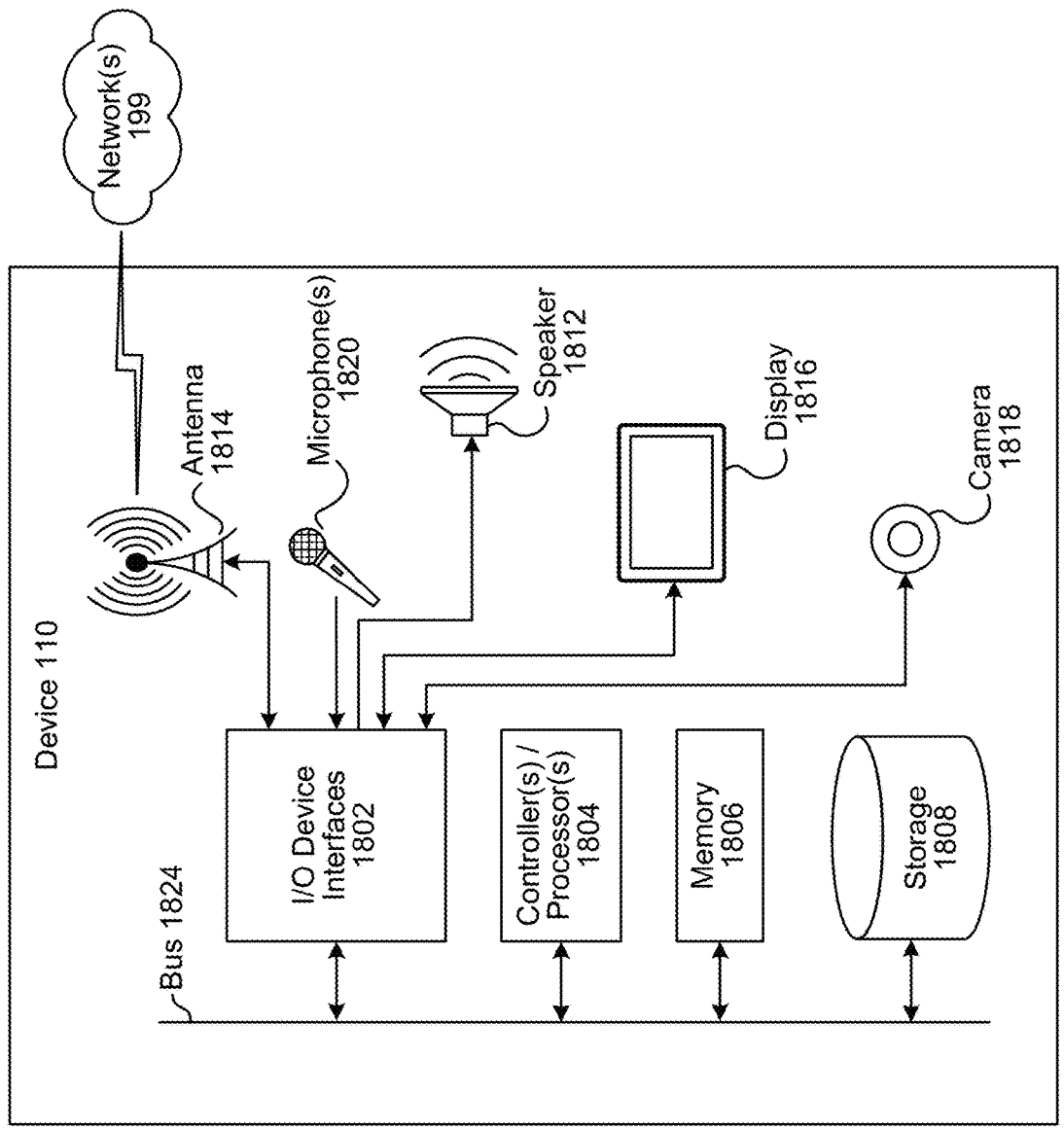
FIG. 18 is a block diagram conceptually illustrating example components of a device, according to embodiments of the present disclosure.

FIG. 18 is a block diagram conceptually illustrating a device 110 that may be used with the system. FIG. 19 is a block diagram conceptually illustrating example components of a remote device, such as the remote system 120, which may assist with ASR processing, NLU processing, etc.; and skill support 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more remote systems 120 for performing ASR processing, one or more remote systems 120 for performing NLU processing, and one or more skill support 125, etc. In operation, each of these systems (120/125) may include computer-readable and computer-executable instructions that reside on a respective device, as will be discussed further below.

Each of these devices/systems (110/120/125) may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive memory (MRAM), and/or other types of memory. Each device/system (110/120/125) may also include a data storage component (1808/1908) for storing data and controller/processor-executable instructions. Each data storage component (1808/1908) may individually include one or more non-volatile storage types such as magnetic storage, optical storage, solid-state storage, etc. Each device/system (110/120/125) may also be connected to removable or external non-volatile memory and/or storage (such as a removable memory card, memory key drive, networked storage, etc.) through respective input/output device interfaces (1802/1902).

Computer instructions for operating each device/system (110/120/125) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device/system (110/120/125) includes input/output device interfaces (1802/1902). A variety of components may be connected through the input/output device interfaces (1802/1902), as will be discussed further below. Additionally, each device/system (110/120/125) may include an address/data bus (1824/1924) for conveying data among components of the respective device. Each component within a device/system (110/120/125) may also be directly connected to other components in addition to (or instead of) being connected to other components across the bus (1824/1924).

Referring to FIG. 18, the device 110 may include input/output device interfaces 1802 that connect to a variety of components such as an audio output component such as a speaker 1812, a wired headset or a wireless headset (not illustrated), or other component capable of outputting audio. The device 110 may also include an audio capture component. The audio capture component may be, for example, a microphone 1820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1816 for displaying content. The device 110 may further include a camera 1818.

Via antenna(s) 1814, the input/output device interfaces 1802 may connect to one or more network(s) 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1802/1902) may also include communication components that allow data to be exchanged between devices such as different physical servers in a collection of servers or other components.

The components of the device 110, the remote system 120, and/or skill support 125 may include their own dedicated processors, memory, and/or storage. Alternatively, one or more of the components of the device 110, the remote system 120, and/or the skill support 125 may utilize the I/O interfaces (1802/1902), processor(s) (1804/1904), memory (1806/1906), and/or storage (1808/1908) of the device(s) 110, the remote system 120, or the skill support 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and the skill support 125, as described herein, are illustrative, and may be located as a stand-alone device or may be included, in whole or in part, as a component of a larger device or system.

As illustrated in FIG. 20, multiple devices (110a-110j) and/or systems (120, 125) may contain components of the system 100 and the devices may be connected over a network(s) 199. The network(s) 199 may include a local or private network or may include a wide network such as the Internet. While not illustrated in FIG. 20, the devices 110 may be connected to a private network 10 (e.g., local network) that is connected to the network(s) 199, as described in greater detail above. Devices may be connected to the network(s) 199 through either wired or wireless connections. For example, a speech-detection device 110a, a speech-detection device 110b, a smart phone 110c, a tablet computer 110d, a vehicle 110e, a display device 110f, a smart television 110g, a washer/dryer 110h, a refrigerator 110i, a microwave 110j, and/or earbuds 110k may be connected to the network(s) 199 through a wireless service provider, over a Wi-Fi access point or cellular network connection, or the like. Other devices are included as network-connected support devices, such as the remote system 120, the skill support 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first audio data representing a first utterance;
   beginning, by a first device, speech processing on the first audio data;
   receiving, by the first device, input data representing a second utterance captured by a second device;
   determining a processing capability of the first device;
   based at least in part on the processing capability of the first device, performing at least one operation that results in a third device performing speech processing corresponding to the second utterance;
   determining a first action responsive to the first utterance based on the speech processing of the first audio data; and
   causing the first action to be performed.

2. The computer-implemented method of claim 1, further comprising:
   determining, by the first device including at least one microphone and configured to perform speech processing, the first audio data representing the first utterance as captured by the first device.

3. The computer-implemented method of claim 1, wherein determining the processing capability of the first device comprises determining a period of time in which the first device is estimated to finish the speech processing on the first audio data.

4. The computer-implemented method of claim 1, wherein the input data comprises second audio data representing the second utterance and wherein the method further comprises:
   performing, by the first device, initial processing on the second audio data to determine preliminary results data,
   wherein performing the at least one operation is based at least in part on the preliminary results data.

5. The computer-implemented method of claim 4, wherein:
   the preliminary results data comprises an indication of a natural language used in the second utterance; and
   performing the at least one operation comprises selecting the third device based at least in part on the natural language.

6. The computer-implemented method of claim 1, wherein performing the at least one operation comprises:
   sending, from the first device to the third device, data representing the second utterance.

7. The computer-implemented method of claim 6, wherein the data representing the second utterance comprises second audio data representing the second utterance.

8. The computer-implemented method of claim 1, further comprising:
   determining a second processing capability corresponding to the third device; and
   selecting the third device based at least in part on the second processing capability.

9. The computer-implemented method of claim 1, wherein the third device corresponds to a natural language processing system, and the method further comprises:
   receiving, from the third device, a command to perform a second action responsive to the second utterance; and
   causing the second action to be performed.

10. The computer-implemented method of claim 1, wherein performing the at least one operation further comprises:
    determining a plurality of devices connected to a wireless network associated with the first device; and
    identifying, from the plurality of devices, the third device, the third device configured to perform speech processing.

11. A system comprising:
    at least one processor; and
    at least one memory comprising instructions that, when executed by the at least one processor, cause the system to:

receive first audio data representing a first utterance;

begin, by a first device, speech processing on the first audio data;

receive, by the first device, input data representing a second utterance captured by a second device;

determine a processing capability of the first device;

based at least in part on the processing capability of the first device, perform at least one operation that results in a third device performing speech processing corresponding to the second utterance;

determine a first action responsive to the first utterance based on the speech processing of the first audio data; and cause the first action to be performed.

12. The system of claim 11, wherein the at least one memory further comprises instructions that, when executed by the at least one processor, further cause the system to:

determine, by the first device including at least one microphone and configured to perform speech processing, the first audio data representing the first utterance as captured by the first device.

13. The system of claim 11, wherein the instructions that cause the system to determine the processing capability of the first device comprise instructions that, when executed by the at least one processor, cause the system to determine a period of time in which the first device is estimated to finish the speech processing on the first audio data.

14. The system of claim 11, the input data comprises second audio data representing the second utterance and wherein the at least one memory further comprises instructions that, when executed by the at least one processor, further cause the system to:

perform, by the first device, initial processing on the second audio data to determine preliminary results data, wherein performance of the at least one operation is based at least in part on the preliminary results data.

15. The system of claim 14, wherein:

the preliminary results data comprises an indication of a natural language used in the second utterance; and performance of the at least one operation comprises selection of the third device based at least in part on the natural language.

16. The system of claim 11, wherein the instructions that cause the system to perform the at least one operation comprise instructions that, when executed by the at least one processor, cause the system to:

send, from the first device to the third device, data representing the second utterance.

17. The system of claim 16, wherein the data representing the second utterance comprises second audio data representing the second utterance.

18. The system of claim 11, wherein the at least one memory further comprises instructions that, when executed by the at least one processor, further cause the system to:

determine a second processing capability corresponding to the third device; and select the third device based at least in part on the second processing capability.

19. The system of claim 11, wherein the third device corresponds to a natural language processing system, and wherein the at least one memory further comprises instructions that, when executed by the at least one processor, further cause the system to:

receive, from the third device, a command to perform a second action responsive to the second utterance; and cause the second action to be performed.

20. The system of claim 11, wherein the instructions that cause the system to perform the at least one operation comprise instructions that, when executed by the at least one processor, cause the system to:

determine a plurality of devices connected to a wireless network associated with the first device; and identify, from the plurality of devices, the third device, the third device configured to perform speech processing.

* * * * *